United States Patent
Yang et al.

(10) Patent No.: US 11,071,168 B2
(45) Date of Patent: Jul. 20, 2021

(54) MULTI-STATION ACCESS METHOD, APPARATUS, AND SYSTEM

(71) Applicant: Huawei Technologies Co., Ltd., Shenzhen (CN)

(72) Inventors: Mao Yang, Xi'an (CN); Zhongjiang Yan, Xi'an (CN); Yanchun Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 122 days.

(21) Appl. No.: 15/717,267

(22) Filed: Sep. 27, 2017

(65) Prior Publication Data
US 2018/0035488 A1 Feb. 1, 2018

Related U.S. Application Data

(63) Continuation of application No. PCT/CN2015/075294, filed on Mar. 27, 2015.

(51) Int. Cl.
*H04W 74/08* (2009.01)
*H04W 84/12* (2009.01)
*H04W 74/00* (2009.01)

(52) U.S. Cl.
CPC ......... *H04W 84/12* (2013.01); *H04W 74/004* (2013.01); *H04W 74/006* (2013.01);
(Continued)

(58) Field of Classification Search
CPC . H04W 84/12; H04W 74/08; H04W 74/0816; H04W 74/085; H04W 72/121;
(Continued)

(56) References Cited

U.S. PATENT DOCUMENTS

2004/0246937 A1 12/2004 Duong et al.
2011/0150004 A1 6/2011 Denteneer et al.
(Continued)

FOREIGN PATENT DOCUMENTS

CN 101668323 A 3/2010
CN 102404865 A 4/2012
(Continued)

OTHER PUBLICATIONS

Machine Translation and Abstract of Chinese Publication No. CN102932949, Feb. 13, 2013, 30 pages.
(Continued)

*Primary Examiner* — Jae Y Lee
*Assistant Examiner* — Aixa A Guadalupe Cruz
(74) *Attorney, Agent, or Firm* — Conley Rose, P.C.

(57) ABSTRACT

In the present disclosure, an access point obtains a current network feature and generates a matching rule and an access rule, so that a station performs uplink access according to the matching rule and the access rule. This resolves a prior-art problem of reduced quality of service of a high-priority service because in an EDCA protocol, when there are relatively many low-priority service nodes, the high-priority service has difficulty in obtaining a resource through contention, or a conflict occurs between a low-priority packet and a high-priority packet. Effects of ensuring quality of service and user experience are achieved.

18 Claims, 27 Drawing Sheets

(52) U.S. Cl.
CPC ... *H04W 74/0816* (2013.01); *H04W 74/0875* (2013.01); *H04W 74/0833* (2013.01)

(58) Field of Classification Search
CPC ......... H04W 74/0808; H04W 74/0875; H04W 72/02; H04W 72/0413; H04W 72/10; H04W 74/006; H04W 74/02; H04W 74/06; H04W 74/0825; H04W 88/08; H04L 47/14; H04L 47/27; H04L 5/0007; H04L 5/0023
See application file for complete search history.

(56) References Cited

U.S. PATENT DOCUMENTS

| | | | |
|---|---|---|---|
| 2011/0194644 A1* | 8/2011 | Liu | H04L 5/0023 375/295 |
| 2012/0063305 A1 | 3/2012 | Chiu et al. | |
| 2013/0070642 A1 | 3/2013 | Kim et al. | |
| 2014/0079046 A1 | 3/2014 | Yang et al. | |
| 2015/0003367 A1* | 1/2015 | Seok | H04W 74/006 370/329 |
| 2015/0063128 A1 | 3/2015 | Garikipati et al. | |
| 2015/0063318 A1* | 3/2015 | Merlin | H04W 72/12 370/336 |
| 2015/0071211 A1 | 3/2015 | Seok | |
| 2016/0174079 A1* | 6/2016 | Wang | H04W 16/14 455/454 |
| 2016/0192377 A1* | 6/2016 | Zhou | H04W 24/08 370/329 |
| 2016/0198500 A1* | 7/2016 | Merlin | H04W 74/08 370/329 |
| 2016/0227533 A1* | 8/2016 | Josiam | H04W 74/006 |
| 2017/0325266 A1* | 11/2017 | Kim | H04W 84/12 |

FOREIGN PATENT DOCUMENTS

| | | | |
|---|---|---|---|
| CN | 102802171 A | 11/2012 | |
| CN | 102932948 A | 2/2013 | |
| CN | 102932949 A | 2/2013 | |
| CN | 102948091 A | 2/2013 | |
| CN | 104272845 A | 1/2015 | |
| CN | 104469966 A | 3/2015 | |
| EP | 1484862 A3 | 6/2010 | |
| WO | 2011136508 A2 | 11/2011 | |
| WO | 2013166669 A1 | 11/2013 | |

OTHER PUBLICATIONS

"Part 11: Wireless LAN Medium Access Control (MAC) and Physical Layer (PHY) specifications, Amendment 8: Medium Access Control (MAC) Quality of Service Enhancements," 802.11, Nov. 11, 2005, 211 pages.

Foreign Communication From A Counterpart Application, PCT Application No. PCT/CN2015/075294, English Translation of International Search Report dated Dec. 31, 2015, 2 pages.

Foreign Communication From A Counterpart Application, PCT Application No. PCT/CN2015/075294, English Translation of Written Opinion dated Dec. 31, 2015, 6 pages.

Machine Translation and Abstract of Chinese Publication No. CN101668323, Mar. 10, 2010, 21 pages.

Foreign Communication From A Counterpart Application, Chinese Application No. 201580077373.1, Chinese Office Action dated Jun. 5, 2019, 8 pages.

Foreign Communication From A Counterpart Application, Chinese Application No. 201580077373.1, Chinese Search Report dated May 27, 2019, 2 pages.

Machine Translation and Abstract of Chinese Publication No. CN102932948, Feb. 13, 2013, 34 pages.

Foreign Communication From A Counterpart Application, Chinese Application No. 201580077373.1, Chinese Office Action dated Oct. 21, 2019, 5 pages.

Foreign Communication From A Counterpart Application, Chinese Application No. 201580077373.1, Chinese Search Report dated Oct. 10, 2019, 2 pages.

* cited by examiner

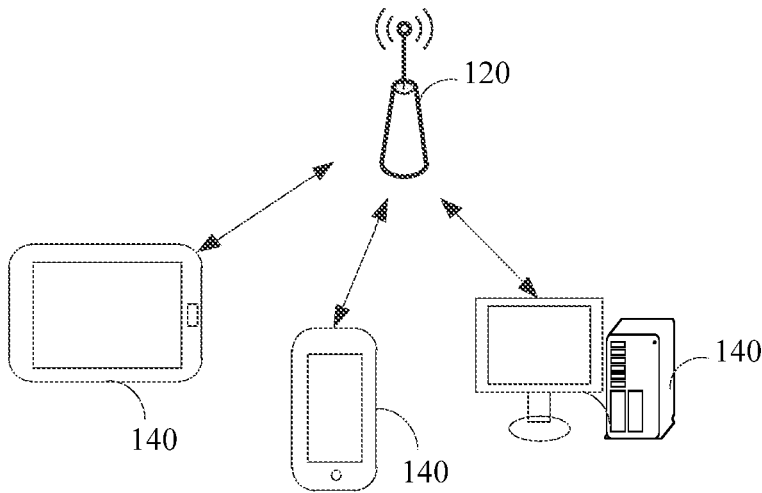

FIG. 1

Generate a matching rule and an access rule according to a current network feature, where the matching rule is used to restrict a station that is allowed to access a channel, and the access rule is used to restrict an access parameter of the station when the station accesses the channel in an access manner — 201

Send a trigger frame to the station, where the trigger frame carries the matching rule and the access rule — 202

FIG. 2

Receive a trigger frame sent by an access point, where the trigger frame carries a matching rule used to restrict a station that is allowed to access a channel, and an access rule used to restrict an access parameter of the station when the station accesses the channel — 301

Detect whether the station satisfies the matching rule — 302

When the station satisfies the matching rule, perform uplink access according to the access rule — 303

FIG. 3

| Trigger frame (Trigger) | Access request (RTX) | Trigger frame (Trigger) | Access request (RTX) | Acknowledgement response (CTX) | Data (Data) | Data reception response (BAs) |
|---|---|---|---|---|---|---|
| | | | Access request (RTX) | | Data (Data) | |
| | | | Access request (RTX) | | Data (Data) | |
| Voice service | | Best effort service and high channel quality | | | Data (Data) | |

| Trigger frame (Trigger) | | Access request (RTX) | | Acknowledgement response (CTX) | | Data (Data) | | Data reception response (BAs) |
|---|---|---|---|---|---|---|---|---|
| | | Access request (RTX) | | | | Data (Data) | | |
| | | Access request (RTX) | | | | Data (Data) | | |
| Signal strength P1 | | Access request (RTX) | | | | Data (Data) | | |

FIG. 7B

| Trigger frame (Trigger) | Access request (RTX) | Trigger frame (Trigger) | Access request (RTX) | Trigger frame (Trigger) | | Acknowledgement response (CTX) | Data (Data) | Data reception response (BAs) |
|---|---|---|---|---|---|---|---|---|
| | Access request (RTX) | | | | | | Data (Data) | |
| | Access request (RTX) | | | | Access request (RTX) | | Data (Data) | |
| CW=16 | Access request (RTX) | CW=20 | Access request (RTX) | CW=16 | | | Data (Data) | |

FIG. 11D

| Trigger frame (Trigger) | Access request (RTX) | Trigger frame (Trigger) | Access request (RTX) | Trigger frame (Trigger) | Access request (RTX) | Acknowledgement response (CTX) | Data (Data) | Data reception response (BAs) |
|---|---|---|---|---|---|---|---|---|
| | Access request (RTX) | | Access request (RTX) | | Access request (RTX) | | Data (Data) | |
| | Access request (RTX) | | Access request (RTX) | | Access request (RTX) | | Data (Data) | |
| Quantity of rounds being 3, CW | Access request (RTX) | | Access request (RTX) | | Access request (RTX) | | Data (Data) | |

FIG. 12B

| | | Access request (RTX) | Access request (RTX) | | Access request (RTX) | Access request (RTX) | | | Data (Data) | |
|---|---|---|---|---|---|---|---|---|---|---|---|
| Trigger frame (Trigger) | | Access request (RTX) | Access request (RTX) | Trigger frame (Trigger) | Access request (RTX) | Access request (RTX) | ... | Acknowledgement response (CTX) | Data (Data) | Data reception response (BAs) |
| | | Access request (RTX) | Access request (RTX) | | Access request (RTX) | Access request (RTX) | | | Data (Data) | |
| Quantity of rounds being 3, CW | | Access request (RTX) | Access request (RTX) | | Access request (RTX) | Access request (RTX) | | | Data (Data) | |

FIG. 13B

MULTI-STATION ACCESS METHOD, APPARATUS, AND SYSTEM

CROSS-REFERENCE TO RELATED APPLICATIONS

This application is a continuation of International Application No. PCT/CN2015/075294, filed on Mar. 27, 2015, the disclosure of which is hereby incorporated by reference in its entirety

TECHNICAL FIELD

The present disclosure relates to the field of network technologies, and in particular, to a multi-station access method, apparatus, and system.

BACKGROUND

A next-generation wireless local area network (WLAN) is to be oriented to a high-density complex scenario, and needs to support diversified user features and increasingly plentiful service features. In this case, in an uplink access technology of the next-generation WLAN, different uplink access policies need to be used according to different user features and network features.

An enhanced distributed coordination function (DCF) channel access (EDCA) protocol is an extended protocol supporting Quality of Service (QoS) based on a DCF protocol, so that different QoS services can be provided for services having different priorities. The IEEE 802.11e EDCA has defined eight traffic categories (TC) and four access categories (AC). The eight TCs are separately mapped onto queues of four ACs: AC_VO, AC_VI, AC_BE, and AC_BK, respectively representing a voice category, a video category, a best effort category, and a background category. Access categories corresponding to different traffic categories have different priorities.

A relatively small connection window (CW) [$CW_{min}$ $CW_{max}$] is allocated to a high-priority traffic category, and a relatively large [$CW_{min}$ $CW_{max}$] is allocated to a low-priority traffic category. Because a random number generated by using a relatively small time window for backoff is usually relatively small, a high-priority service can obtain a channel through contention with a relatively large probability.

During implementation of the present disclosure, it is found that some approaches have at least the following problems, in an EDCA protocol, a difference lies only in a time-domain contention window range, and when there are relatively many low-priority service nodes, random numbers generated by many low-priority service nodes may be less than a random number generated by a high-priority service. Consequently, the high-priority service has difficulty in obtaining a resource through contention, or a conflict occurs between a low-priority packet and a high-priority packet, reducing quality of service of the high-priority service.

SUMMARY

Embodiments of the present disclosure provide a multi-station access method, apparatus, and system, to resolve a prior-art problem of reduced quality of service of a high-priority service because in an EDCA protocol, when there are relatively many low-priority service nodes, the high-priority service has difficulty in obtaining a resource through contention, or a conflict occurs between a low-priority packet and a high-priority packet.

According to a first aspect, a multi-station access method is provided, where the method is applied to an access point, and includes generating a matching rule and an access rule according to a current network feature, where the matching rule is used to restrict a station that is allowed to access a channel, and the access rule is used to restrict an access parameter of the station when the station accesses the channel; and sending a trigger frame to the station, where the trigger frame carries the matching rule and the access rule.

In a first possible implementation of the first aspect, the matching rule is a rule defined by one matching element or a logical combination of at least two matching elements, and the matching element includes but is not limited to a station group identifier, a traffic category, channel quality, a service priority, a signal strength expected to be received, a data packet size, a distance between a station and the access point, or a time delay requirement.

With reference to the first aspect, in a second possible implementation, the method further includes receiving an access request that is sent by the station on a selected resource block, where the resource block is a resource block selected from a designated resource block according to the access rule after the station is matched successfully according to the matching rule, the designated resource block is a resource block that is provided by the access point for the station for access, when a channel is divided according to a time domain and a frequency domain, the resource block is a time-frequency resource block, and when a channel is divided only according to a frequency domain, the resource block is a sub-channel; and sending, to the station, an access response used to allow the station to perform access on the resource block.

With reference to the first aspect or the second possible implementation of the first aspect, in a third possible implementation, after the receiving an access request that is sent by the station on a selected resource block, the method further includes detecting whether the access point satisfies a sending condition of continuing to send a next trigger frame, where the sending condition includes at least one of the following the access point still has a receiving capability, a quantity of times of sending trigger frames is less than a predetermined quantity of times, or a quantity of stations sending access requests does not reach a predetermined quantity; if the access point satisfies the sending condition of continuing to send a next trigger frame, sending the next trigger frame; and if the access point does not satisfy the sending condition of continuing to send a next trigger frame, performing the step of sending, to the station, an access response used to allow the station to perform access on the resource block.

With reference to the first aspect, the first possible implementation of the first aspect, the second possible implementation of the first aspect, or the third possible implementation of the first aspect, in a fourth possible implementation, the method further includes obtaining a quantity of designated resource blocks having conflicts, a quantity of idle designated resource blocks, and a quantity of designated resource blocks on which the access request is received successfully in the designated resource block that are obtained when each station performs uplink access after a trigger frame is sent previously; and adjusting a contention window range carried in the previously sent trigger frame by using the quantity of the designated resource blocks having conflicts, the quantity of the idle designated resource blocks, and the quantity of the designated resource blocks on which the access request is received successfully, determining an adjusted contention window range as a contention window range carried in a trigger frame to be sent currently, and sending the current trigger frame to the station.

With reference to the fourth possible implementation of the first aspect, in a fifth possible implementation, the obtaining a quantity of designated resource blocks having conflicts, a quantity of idle designated resource blocks, and a quantity of designated resource blocks on which the access request is received successfully in the designated resource block that are obtained when each station performs uplink access after a trigger frame is sent previously includes for each designated resource block, detecting whether a physical layer using the access point receives, on the designated resource block, a start indication used to indicate that transmission of a payload part in an access request starts; and if the start indication is not received, determining the designated resource block as an idle designated resource block, and adding 1 to the quantity of the idle designated resource blocks; or if the start indication is received, detecting whether a reception completion indication corresponding to the start indication is received; if the reception completion indication corresponding to the start indication is received, continuing to detect whether a payload part in the access request is not received successfully on the designated resource block; and if the payload part in the access request is received successfully on the designated resource block, determining the designated resource block as a designated resource block on which the access request is received successfully, and adding 1 to the quantity of the designated resource blocks on which the access request is received successfully; or if the payload part in the access request is not received successfully on the designated resource block, determining the designated resource block as a designated resource block having a conflict, and adding 1 to the quantity of the designated resource blocks having conflicts.

According to a second aspect, a multi-station access method is provided, where the method is applied to a station, and includes receiving a trigger frame sent by an access point, where the trigger frame carries a matching rule used to restrict a station that is allowed to access a channel, and an access rule used to restrict an access parameter of the station when the station accesses the channel; detecting whether the station satisfies the matching rule; and when the station satisfies the matching rule, performing uplink access according to the access rule.

With reference to the second aspect, in a first possible implementation, the matching rule is a rule defined by one matching element or a logical combination of at least two matching elements, and the matching element includes but is not limited to a station group identifier, a traffic category, channel quality, a service priority, a signal strength expected to be received, a data packet size, a distance between a station and the access point, or a time delay requirement.

With reference to the second aspect, in a second possible implementation, an access manner is time-domain backoff access or time-frequency two-dimensional backoff access, and the performing uplink access according to the access rule includes backing off according to the access rule, and selecting one resource block from a designated resource block after backing off successfully; sending an access request to the access point on the selected resource block; and receiving an access response that is sent by the access point and that is used to instruct the station to perform access on the resource block, where the designated resource block is a resource block that is provided by the access point for the station for access, when a channel is divided according to a time domain and a frequency domain, the resource block is a time-frequency resource block, and when a channel is divided only according to a frequency domain, the resource block is a sub-channel.

With reference to the second aspect or the second possible implementation of the second aspect, in a third possible implementation, the access parameter defines a contention window range, and the backing off according to the access rule, and selecting one resource block from a designated resource block after backing off successfully includes generating a backoff random number that is within the contention window range, and backing off according to the backoff random number; and after the backoff ends, randomly selecting a resource block from the designated resource block.

With reference to the second aspect or the second possible implementation of the second aspect, in a fourth possible implementation, the access parameter defines a contention window range, and the backing off according to the access rule, and selecting one resource block from a designated resource block after backing off successfully includes backing off by using a backoff random number that is generated during previous backoff; and after the backoff ends, randomly selecting a resource block from the designated resource block.

With reference to the second aspect or the second possible implementation of the second aspect, in a fifth possible implementation, the backing off according to the access rule, and selecting one resource block from a designated resource block after backing off successfully includes if access fails when a resource block is accessed previously by using a backoff random number that is generated within a contention window range, increasing the contention window range, generating a backoff random number that is within the increased contention window range, backing off by using the backoff random number, and after the backoff ends, randomly selecting a resource block from the designated resource block.

With reference to the second aspect or the second possible implementation of the second aspect, in a sixth possible implementation, the access rule is the time-frequency two-dimensional backoff access, the access parameter defines a round marker and a contention window range, and the backing off according to the access rule, and selecting one resource block from a designated resource block after backing off successfully includes if the round marker is used to mark a total quantity of times that trigger frames need to be sent, generating a backoff random number that is within the contention window range, and if the backoff random number is less than a designated resource block quantity, selecting a resource block having a number the same as the backoff random number from the designated resource block; and if the round marker is used to mark that a current trigger frame is not a last trigger frame in a trigger frame needing to be sent, when a backoff random number generated during previous backoff access is greater than the designated resource block quantity, subtracting the designated resource block quantity from the backoff random number generated during previous backoff access, and when an obtained difference is less than the designated resource block quantity, selecting a resource block having a number the same as the obtained difference from the designated resource block; or generating a backoff random number that is within the contention window range, and if the backoff random number is less than the designated resource block quantity, selecting a resource block having a number the same as the backoff random number from the designated resource block, or if the backoff random number is greater than the designated resource block quantity, subtracting the designated resource block quantity from the backoff random number, and when an obtained difference is less than the designated resource block quantity, selecting a resource block having a number the same as the obtained difference from the designated resource block, where the designated resource block quantity is a quantity of the designated resource blocks.

With reference to the second aspect or the second possible implementation of the second aspect, in a seventh possible implementation, the access rule is the time-frequency two-dimensional backoff, and the access point requires the station to listen to a channel access status at a first time period and a second time period in duration used to send the access request, where the first time period corresponds to duration used to send a packet header in a data packet corresponding to the access request, and the second time period corresponds to duration used to send non-packet header content in the data packet corresponding to the access request, and the backing off according to the access rule, and selecting one resource block from a designated resource block after backing off successfully includes generating a backoff random number, and performing time-frequency two-dimensional backoff according to the backoff random number; listening to, at the first time period, whether a signal is transmitted on each designated resource block; and if it is detected at the first time period that no signal is transmitted, setting a difference of subtracting a quantity of the designated resource block from the backoff random number as an updated backoff random number; and at a starting moment of the second time period, if the updated backoff random number is less than the designated resource block quantity, selecting a resource block having a number the same as the backoff random number from the designated resource block; or if it is detected at the first time period that a signal is transmitted, setting a difference of subtracting a quantity of the designated resource block from the backoff random number as an updated backoff random number; and at an ending moment of the second time period, if the updated backoff random number is less than the designated resource block quantity, selecting a resource block having a number the same as the backoff random number from the designated resource block; or if it is detected at the first time period that no signal is transmitted and it is detected at the second time period that a signal is transmitted, setting a difference of subtracting a quantity of the designated resource block from the backoff random number as an updated backoff random number; and after predetermined duration from an ending moment of the second time period, if the updated backoff random number is less than the designated resource block quantity, selecting a resource block having a number the same as the backoff random number from the designated resource block, where the predetermined duration is the same as duration of the first time period, where the designated resource block quantity is a quantity of the designated resource blocks.

With reference to the second aspect or the second possible implementation of the second aspect, in an eighth possible implementation, the access manner is the time-frequency two-dimensional backoff access, and the method further includes if access fails during backoff access and a backoff random number obtained during current backoff is used as a backoff random number for next backoff access, after an access request sent by another station is detected, subtracting a designated value from the backoff random number, where when the access manner is the time-domain backoff access, the designated value is 1, and when the access manner is the time-frequency two-dimensional backoff access, the designated value is a quantity of the designated resource blocks.

With reference to the second aspect, in a ninth possible implementation, the access rule is P-probability access, the access parameter defines a probability range, and the performing uplink access according to the access rule includes generating a probability that is within the probability range, performing access contention by using the generated probability, and randomly selecting one resource block from a designated resource block after the contention succeeds; sending an access request to the access point on the selected resource block; and receiving an access response that is sent by the access point and that is used to instruct the station to perform access on the resource block, where the designated resource block is a resource block that is provided by the access point for the station for access, when a channel is divided according to a time domain and a frequency domain, the resource block is a time-frequency resource block, and when a channel is divided only according to a frequency domain, the resource block is a sub-channel.

With reference to the second aspect, in a tenth possible implementation, the access rule is P-probability access and a probability is adjustable, the access parameter defines a probability P, a value of the probability P is greater than 0 and less than 1, and the performing uplink access according to the access rule includes if the probability P is used to perform access contention previously and a sub-channel is accessed successfully, increasing the probability P, and performing access contention by using the increased probability P; if the probability P is used to perform access contention previously and a sub-channel is not accessed successfully, decreasing the probability P, and performing access contention by using the decreased probability P; and if the probability P is not used to perform access contention previously, performing access contention by using the probability P; after the contention succeeds, randomly selecting one resource block from a designated resource block; sending an access request to the access point on the selected resource block; and receiving an access response that is sent by the access point and that is used to instruct the station to perform access on the resource block, where the designated resource block is a resource block that is provided by the access point for the station for access, when a channel is divided according to a time domain and a frequency domain, the resource block is a time-frequency resource block, and when a channel is divided only according to a frequency domain, the resource block is a sub-channel.

With reference to any one of the second aspect or the second possible implementation of the second aspect to the tenth possible implementation, in an eleventh possible implementation, when the matching rule defines a designated service priority for which a bandwidth requirement needs to be reported, the sending an access request to the access point on the selected resource block includes when a service priority of data needing to be sent by the station includes the designated service priority, obtaining a bandwidth requirement of the designated service priority in the station, and adding the bandwidth requirement to the access request; or obtaining a bandwidth requirement of each service priority greater than or equal to the designated service priority in the station, and adding the bandwidth requirement of each service priority to the access request; or obtaining a bandwidth requirement of each service priority in the station, and adding the bandwidth requirement of each service priority to the access request; or obtaining a total bandwidth requirement of all service priorities in the station, and adding the total bandwidth requirement to the access request; and sending the access request to the access point on the selected resource block, where the designated service priority is at least one designated service priority.

With reference to any one of the second aspect or the second possible implementation of the second aspect to the tenth possible implementation, in a twelfth possible implementation, when the matching rule defines a designated service priority for which a bandwidth requirement needs to be reported, and the access parameter defines at least one resource block that is provided for a station having the designated service priority for access, the selecting one resource block from a designated resource block after backing off successfully includes after backing off successfully, selecting a resource block from the at least one resource block defined for the designated service priority.

With reference to any one of the second aspect or the second possible implementation of the second aspect to the tenth possible implementation, in a thirteenth possible implementation, the matching rule defines a signal strength that the access point expects to receive, and the detecting whether the station satisfies the matching rule includes determining, according to a loss of a channel during signal transmission, whether a signal strength when a signal sent by using an adjusted transmit power reaches the access point reaches the signal strength that the access point expects to receive, and whether the adjusted transmit power is less than a listening threshold of a neighboring station; and if a power of the signal strength when the signal sent by using the adjusted transmit power used to send a signal reaches the access point reaches a power of the signal strength that the access point expects to receive, and the adjusted transmit power is less than the listening threshold of the neighboring station, adjusting the transmit power used to send a signal.

According to a third aspect, a multi-station access apparatus is provided, where the apparatus is applied to an access point, and includes a generating module configured to generate a matching rule and an access rule according to a current network feature, where the matching rule is used to restrict a station that is allowed to access a channel, and the access rule is used to restrict an access parameter of the station when the station accesses the channel; and a first sending module configured to send a trigger frame to the station, where the trigger frame carries the matching rule and the access rule that are generated by the generating module.

In a first possible implementation of the third aspect, the matching rule is a rule defined by one matching element or a logical combination of at least two matching elements, and the matching element includes but is not limited to a station group identifier, a traffic category, channel quality, a service priority, a signal strength expected to be received, a data packet size, a distance between a station and the access point, or a time delay requirement.

With reference to the third aspect, in a second possible implementation, the apparatus further includes a receiving module configured to receive an access request that is sent by the station on a selected resource block, where the resource block is a resource block selected from a designated resource block according to the access rule after the station is matched successfully according to the matching rule, the designated resource block is a resource block that is provided by the access point for the station for access, when a channel is divided according to a time domain and a frequency domain, the resource block is a time-frequency resource block, and when a channel is divided only according to a frequency domain, the resource block is a sub-channel; and a second sending module configured to send, to the station, an access response used to allow the station to perform access on the resource block.

With reference to the second possible implementation of the third aspect, in a third possible implementation, the apparatus further includes a first detection module configured to detect whether the access point satisfies a sending condition of continuing to send a next trigger frame, where the sending condition includes at least one of the following the access point still has a receiving capability, a quantity of times of sending trigger frames is less than a predetermined quantity of times, or a quantity of stations sending access requests does not reach a predetermined quantity; and a third sending module configured to when the first detection module detects that the access point satisfies the sending condition of continuing to send a next trigger frame, send the next trigger frame, where the second sending module is further configured to when the first detection module detects that the access point does not satisfy the sending condition of continuing to send a next trigger frame, send, to the station, the access response that is used to allow the station to perform access on the resource block.

With reference to the second possible implementation of the third aspect, in a fourth possible implementation, the apparatus further includes an obtaining module configured to obtain a quantity of designated resource blocks having conflicts, a quantity of idle designated resource blocks, and a quantity of designated resource blocks on which the access request is received successfully in the designated resource block that are obtained when each station performs uplink access after a trigger frame is sent previously; and an adjustment module configured to adjust a contention window range carried in the previously sent trigger frame by using the quantity of the designated resource blocks having conflicts, the quantity of the idle designated resource blocks, and the quantity of the designated resource blocks on which the access request is received successfully that are obtained by the obtaining module, determine an adjusted contention window range as a contention window range carried in a trigger frame to be sent currently, and send the current trigger frame to the station.

With reference to the fourth possible implementation manner of the third aspect, in a fifth possible implementation manner, the obtaining module is further configured to for each designated resource block, detect whether a physical layer using the access point receives, on the designated resource block, a start indication used to indicate that transmission of a payload part in an access request starts; and if the start indication is not received, determine the designated resource block as an idle designated resource block, and add 1 to the quantity of the idle designated resource blocks; or if the start indication is received, detect whether a reception completion indication corresponding to the start indication is received; if the reception completion indication corresponding to the start indication is received, continue to detect whether a payload part in the access request is not received successfully on the designated resource block; and if the payload part in the access request is received successfully on the designated resource block, determine the designated resource block as a designated resource block on which the access request is received successfully, and add 1 to the quantity of the designated resource blocks on which the access request is received successfully; or if the payload part in the access request is not received successfully on the designated resource block, determine the designated resource block as a designated resource block having a conflict, and add 1 to the quantity of the designated resource blocks having conflicts.

According to a fourth aspect, a multi-station access apparatus is provided, where the apparatus is applied to a station, and includes a receiving module configured to receive a trigger frame sent by an access point, where the trigger frame carries a matching rule used to restrict a station that is allowed to access a channel, and an access rule used to restrict an access parameter of the station when the station accesses the channel; a detection module configured to detect whether the station satisfies the matching rule received by the receiving module; and an access module configured to when the detection module detects that the station satisfies the matching rule, perform uplink access according to the access rule.

With reference to the fourth aspect, in a first possible implementation, the matching rule is a rule defined by one matching element or a logical combination of at least two matching elements, and the matching element includes but is not limited to a station group identifier, a traffic category, channel quality, a service priority, a signal strength expected to be received, a data packet size, a distance between a station and the access point, or time sensitivity.

With reference to the fourth aspect, in a second possible implementation, the access rule is time-domain backoff access or time-frequency two-dimensional backoff access, and the access module is further configured to back off according to the access rule, and select a resource block from a designated resource block after backing off successfully; send an access request to the access point on the selected resource block; and receive an access response that is sent by the access point and that is used to instruct the station to perform access on the resource block, where the designated resource block is a resource block that is provided by the access point for the station for access, when a channel is divided according to a time domain and a frequency domain, the resource block is a time-frequency resource block, and when a channel is divided only according to a frequency domain, the resource block is a subchannel.

With reference to the fourth aspect or the second possible implementation of the fourth aspect, in a third possible implementation, the access parameter defines a contention window range, and the access module is further configured to generate a backoff random number that is within the contention window range, and back off according to the backoff random number; and after the backoff ends, randomly select a resource block from the designated resource block.

With reference to the fourth aspect or the second possible implementation of the fourth aspect, in a fourth possible implementation, the access parameter defines a contention window range, and the access module is further configured to back off by using a backoff random number that is generated during previous backoff; and after the backoff ends, randomly select a resource block from the designated resource block.

With reference to the fourth aspect or the second possible implementation manner of the fourth aspect, in a fifth possible implementation, the access module is further configured to if access fails when a resource block is accessed previously by using a backoff random number that is generated within a contention window range, increase the contention window range, generate a backoff random number that is within the increased contention window range, back off by using the backoff random number, and after the backoff ends, randomly select a resource block from the designated resource block.

With reference to the fourth aspect or the second possible implementation of the fourth aspect, in a sixth possible implementation, the access rule is the time-frequency two-dimensional backoff access, the access parameter defines a round marker and a contention window range, and the access module is further configured to if the round marker is used to mark a total quantity of times that trigger frames need to be sent, generate a backoff random number that is within the contention window range, and if the backoff random number is less than a designated resource block quantity, select a resource block having a number the same as the backoff random number from the designated resource block; and if the round marker is used to mark that a current trigger frame is not a last trigger frame in a trigger frame needing to be sent, when a backoff random number generated during previous backoff access is greater than the designated resource block quantity, subtract the designated resource block quantity from the backoff random number generated during previous backoff access, and when an obtained difference is less than the designated resource block quantity, select a resource block having a number the same as the obtained difference from the designated resource block; or generate a backoff random number that is within the contention window range, and if the backoff random number is less than the designated resource block quantity, select a resource block having a number the same as the backoff random number from the designated resource block, or if the backoff random number is greater than the designated resource block quantity, subtract the designated resource block quantity from the backoff random number, and when an obtained difference is less than the designated resource block quantity, select a resource block having a number the same as the obtained difference from the designated resource block, where the designated resource block quantity is a quantity of the designated resource blocks.

With reference to the fourth aspect or the second possible implementation of the fourth aspect, in a seventh possible implementation, the access rule is the time-frequency two-dimensional backoff, and the access point requires the station to listen to a channel access status at a first time period and a second time period in duration used to send the access request, where the first time period corresponds to duration used to send a packet header in a data packet corresponding to the access request, and the second time period corresponds to duration used to send non-packet header content in the data packet corresponding to the access request, and the access module is further configured to generate a backoff random number, and perform time-frequency two-dimensional backoff according to the backoff random number; listen to, at the first time period, whether a signal is transmitted on each designated resource block; and if it is detected at the first time period that no signal is transmitted, set a difference of subtracting a quantity of the designated resource block from the backoff random number as an updated backoff random number; and at a starting moment of the second time period, if the updated backoff random number is less than the designated resource block quantity, select a resource block having a number the same as the backoff random number from the designated resource block; or if it is detected at the first time period that a signal is transmitted, set a difference of subtracting a quantity of the designated resource block from the backoff random number as an updated backoff random number; and at an ending moment of the second time period, if the updated backoff random number is less than the designated resource block quantity, select a resource block having a number the same as the backoff random number from the designated resource block; or if it is detected at the first time period that no signal is transmitted and it is detected at the second time period that a signal is transmitted, set a difference of subtracting a quantity of the designated resource block from the backoff random number as an updated backoff random number; and after predetermined duration from an ending moment of the second time period, if the updated backoff random number is less than the designated resource block quantity, select a resource block having a number the same as the backoff random number from the designated resource block, where the predetermined duration is the same as duration of the first time period, where the designated resource block quantity is a quantity of the designated resource blocks.

With reference to the fourth aspect or and the second possible implementation of the fourth aspect, in an eighth possible implementation, the apparatus further includes a listening module configured to if access fails during backoff access and a backoff random number obtained during current backoff is used as a backoff random number for next backoff access, after an access request sent by another station is detected, subtract a designated value from the backoff random number, where when the access manner is the time-domain backoff access, the designated value is 1, and when the access manner is the time-frequency two-dimensional backoff access, the designated value is a quantity of the designated resource blocks.

With reference to the fourth aspect, in a ninth possible implementation, the access rule is P-probability access, the access parameter defines a probability range, and the access module is further configured to generate a probability that is within the probability range, perform access contention by using the generated probability, and randomly select a resource block from a designated resource block after the contention succeeds; send an access request to the access point on the selected resource block; and receive an access response that is sent by the access point and that is used to instruct the station to perform access on the resource block, where the designated resource block is a resource block that is provided by the access point for the station for access, when a channel is divided according to a time domain and a frequency domain, the resource block is a time-frequency resource block, and when a channel is divided only according to a frequency domain, the resource block is a sub-channel.

With reference to the fourth aspect, in a tenth possible implementation, the access rule is P-probability access and a probability is adjustable, the access parameter defines a probability P, a value of the probability P is greater than 0 and less than 1, and the access module is further configured to if the probability P is used to perform access contention previously and a sub-channel is accessed successfully, increase the probability P, and perform access contention by using the increased probability P; if the probability P is used to perform access contention previously and a sub-channel is not accessed successfully, decrease the probability P, and perform access contention by using the decreased probability P; and if the probability P is not used to perform access contention previously, perform access contention by using the probability P; after the contention succeeds, randomly select a resource block from a designated resource block; send an access request to the access point on the selected resource block; and receive an access response that is sent by the access point and that is used to instruct the station to perform access on the resource block, where the designated resource block is a resource block that is provided by the access point for the station for access, when a channel is divided according to a time domain and a frequency domain, the resource block is a time-frequency resource block, and when a channel is divided only according to a frequency domain, the resource block is a sub-channel.

With reference any one of the fourth aspect or the second possible implementation of the fourth aspect to the tenth possible implementation, in an eleventh possible implementation, when the matching rule defines a designated service priority for which a bandwidth requirement needs to be reported, the access module is further configured to when a service priority of data needing to be sent by the station includes the designated service priority, obtain a bandwidth requirement of the designated service priority in the station, and add the bandwidth requirement to the access request; or obtain a bandwidth requirement of each service priority greater than or equal to the designated service priority in the station, and add the bandwidth requirement of each service priority to the access request; or obtain a bandwidth requirement of each service priority in the station, and add the bandwidth requirement of each service priority to the access request; or obtain a total bandwidth requirement of all service priorities in the station, and add the total bandwidth requirement to the access request; and send the access request to the access point on the selected resource block, where the designated service priority is at least one designated service priority.

With reference to any one of the fourth aspect or the second possible implementation of the fourth aspect to the tenth possible implementation, in a twelfth possible implementation, when the matching rule defines a designated service priority for which a bandwidth requirement needs to be reported, and the access parameter defines at least one resource block that is provided for a station having the designated service priority for access, the access module is further configured to after backing off successfully, select a resource block from the at least one resource block defined for the designated service priority.

With reference to any one of the fourth aspect or the second possible implementation of the fourth aspect to the tenth possible implementation, in a thirteenth possible implementation, the matching rule defines a signal strength that the access point expects to receive, and the detection module is further configured to determine, according to a loss of a channel during signal transmission, whether a signal strength when a signal sent by using an adjusted transmit power reaches the access point reaches the signal strength that the access point expects to receive, and whether the adjusted transmit power is less than a listening threshold of a neighboring station; and if a power of the signal strength when the signal sent by using the adjusted transmit power used to send a signal reaches the access point reaches a power of the signal strength that the access point expects to receive, and the adjusted transmit power is less than the listening threshold of the neighboring station, adjust the transmit power used to send a signal.

According to a fifth aspect, an access point is provided, where the access point includes a processor and a transmitter, where the processor is configured to generate a matching rule and an access rule according to a current network feature, where the matching rule is used to restrict a station that is allowed to access a channel, and the access rule is used to restrict an access parameter of the station when the station accesses the channel; and the transmitter is configured to send a trigger frame to the station, where the trigger frame carries the matching rule and the access rule that are obtained by the processor.

In a first possible implementation of the fifth aspect, the matching rule is a rule defined by one matching element or a logical combination of at least two matching elements, and the matching element includes but is not limited to a station group identifier, a traffic category, channel quality, a service priority, a signal strength expected to be received, a data packet size, a distance between a station and the access point, or a time delay requirement.

With reference to the fifth aspect, in a second possible implementation, the access point further includes a receiver, where the receiver is configured to receive an access request that is sent by the station on a selected resource block, where the resource block is a resource block selected from a designated resource block according to the access rule after the station is matched successfully according to the matching rule, the designated resource block is a resource block that is provided by the access point for the station for access, when a channel is divided according to a time domain and a frequency domain, the resource block is a time-frequency resource block, and when a channel is divided only according to a frequency domain, the resource block is a sub-channel; and the transmitter is further configured to send, to the station, an access response used to allow the station to perform access on the resource block.

With reference to the fifth aspect or the second possible implementation of the fifth aspect, in a third possible implementation, the processor is further configured to detect whether the access point satisfies a sending condition of continuing to send a next trigger frame, where the sending condition includes at least one of the following the access point still has a receiving capability, a quantity of times of sending trigger frames is less than a predetermined quantity of times, or a quantity of stations sending access requests does not reach a predetermined quantity; and the transmitter is further configured to when the processor determines that the access point satisfies the sending condition of continuing to send a next trigger frame, send the next trigger frame; or the transmitter is further configured to when the processor determines that the access point does not satisfy the sending condition of continuing to send a next trigger frame, send, to the station, the access response that is used to allow the station to perform access on the resource block.

With reference to the fifth aspect or the third possible implementation of the fifth aspect, in a fourth possible implementation, the processor is further configured to obtain a quantity of designated resource blocks having conflicts, a quantity of idle designated resource blocks, and a quantity of designated resource blocks on which the access request is received successfully in the designated resource block that are obtained when each station performs uplink access after a trigger frame is sent previously; and the processor is further configured to adjust a contention window range carried in the previously sent trigger frame by using the quantity of the designated resource blocks, the quantity of the idle designated resource blocks, and the quantity of the designated resource blocks on which the access request is received successfully that are obtained by the obtaining module, determine an adjusted contention window range as a contention window range carried in a trigger frame to be sent currently, and send the current trigger frame to the station.

With reference to the fourth possible implementation of the fifth aspect, in a fifth possible implementation, the processor is further configured to for each designated resource block, detect whether a physical layer using the access point receives, on the designated resource block, a start indication used to indicate that transmission of a payload part in an access request starts; and the processor is further configured to if the start indication is not received, determine the designated resource block as an idle designated resource block, and add 1 to the quantity of the idle designated resource blocks; or the processor is further configured to if the start indication is received, detect whether a reception completion indication corresponding to the start indication is received; if the reception completion indication corresponding to the start indication is received, continue to detect whether a payload part in the access request is not received successfully on the designated resource block; and if the payload part in the access request is received successfully on the designated resource block, determine the designated resource block as a designated resource block on which the access request is received successfully, and add 1 to the quantity of the designated resource blocks on which the access request is received successfully; or if the payload part in the access request is not received successfully on the designated resource block, determine the designated resource block as a designated resource block having a conflict, and add 1 to the quantity of the designated resource blocks having conflicts.

According to a sixth aspect, a station is provided, where the station includes a receiver and a processor, where the receiver is configured to receive a trigger frame sent by an access point, where the trigger frame carries a matching rule used to restrict a station that is allowed to access a channel, and an access rule used to restrict an access parameter of the station when the station accesses the channel; the processor is configured to detect whether the station satisfies the matching rule; and the processor is further configured to when the station satisfies the matching rule, perform uplink access according to the access rule.

With reference to the sixth aspect, in a first possible implementation, the matching rule is a rule defined by one matching element or a logical combination of at least two matching elements, and the matching element includes but is not limited to a station group identifier, a traffic category, channel quality, a service priority, a signal strength expected to be received, a data packet size, a distance between a station and the access point, or time sensitivity.

With reference to the sixth aspect, in a second possible implementation, the access rule is time-domain backoff access or time-frequency two-dimensional backoff access, and the station further includes a transmitter, where the processor is further configured to back off according to the access rule, and select a resource block from a designated resource block after backing off successfully; the transmitter is configured to send an access request to the access point on the selected resource block; and the receiver is further configured to receive an access response that is sent by the access point and that is used to instruct the station to perform access on the resource block, where the designated resource block is a resource block that is provided by the access point for the station for access, when a channel is divided according to a time domain and a frequency domain, the resource block is a time-frequency resource block, and when a channel is divided only according to a frequency domain, the resource block is a sub-channel.

With reference to the sixth aspect or the second possible implementation of the sixth aspect, in a third possible implementation, the access parameter defines a contention window range, the processor is further configured to generate a backoff random number that is within the contention window range, and back off according to the backoff random number; and the processor is further configured to after the backoff ends, randomly select a resource block from the designated resource block.

With reference to the sixth aspect or the second possible implementation of the sixth aspect, in a fourth possible implementation, the access parameter defines a contention window range, the processor is further configured to back off by using a backoff random number that is generated during previous backoff; and the processor is further configured to after the backoff ends, randomly select a resource block from the designated resource block.

With reference to the sixth aspect or the second possible implementation of the sixth aspect, in a fifth possible implementation, the processor is further configured to if access fails when a resource block is accessed previously by using a backoff random number that is generated within a contention window range, increase the contention window range, generate a backoff random number that is within the increased contention window range, back off by using the backoff random number, and after the backoff ends, randomly select a resource block from the designated resource block.

With reference to the sixth aspect or the second possible implementation of the sixth aspect, in a sixth possible implementation, the access rule is the time-frequency two-dimensional backoff access, the access parameter defines a round marker and a contention window range, and the processor is further configured to if the round marker is used to mark a total quantity of times that trigger frames need to be sent, generate a backoff random number that is within the contention window range, and if the backoff random number is less than a designated resource block quantity, select a resource block having a number the same as the backoff random number from the designated resource block; and the processor is further configured to if the round marker is used to mark that a current trigger frame is not a last trigger frame in a trigger frame needing to be sent, when a backoff random number generated during previous backoff access is greater than the designated resource block quantity, subtract the designated resource block quantity from the backoff random number generated during previous backoff access, and when an obtained difference is less than the designated resource block quantity, select a resource block having a number the same as the obtained difference from the designated resource block; or generate a backoff random number that is within the contention window range, and if the backoff random number is less than the designated resource block quantity, select a resource block having a number the same as the backoff random number from the designated resource block, or if the backoff random number is greater than the designated resource block quantity, subtract the designated resource block quantity from the backoff random number, and when an obtained difference is less than the designated resource block quantity, select a resource block having a number the same as the obtained difference from the designated resource block, where the designated resource block quantity is a quantity of the designated resource blocks.

With reference to the sixth aspect or the second possible implementation of the sixth aspect, in a seventh possible implementation, the access rule is the time-frequency two-dimensional backoff, and the access point requires the station to listen to a channel access status at a first time period and a second time period in duration used to send the access request, where the first time period corresponds to duration used to send a packet header in a data packet corresponding to the access request, and the second time period corresponds to duration used to send non-packet header content in the data packet corresponding to the access request, and the processor is further configured to generate a backoff random number, and perform time-frequency two-dimensional backoff according to the backoff random number; the processor is further configured to listen to, at the first time period, whether a signal is transmitted on each designated resource block; and the processor is further configured to if it is detected at the first time period that no signal is transmitted, set a difference of subtracting a quantity of the designated resource block from the backoff random number as an updated backoff random number; and at a starting moment of the second time period, if the updated backoff random number is less than the designated resource block quantity, select a resource block having a number the same as the backoff random number from the designated resource block; or the processor is further configured to if it is detected at the first time period that a signal is transmitted, set a difference of subtracting a quantity of the designated resource block from the backoff random number as an updated backoff random number; and at an ending moment of the second time period, if the updated backoff random number is less than the designated resource block quantity, select a resource block having a number the same as the backoff random number from the designated resource block; or the processor is further configured to if it is detected at the first time period that no signal is transmitted and it is detected at the second time period that a signal is transmitted, set a difference of subtracting a quantity of the designated resource block from the backoff random number as an updated backoff random number; and after predetermined duration from an ending moment of the second time period, if the updated backoff random number is less than the designated resource block quantity, select a resource block having a number the same as the backoff random number from the designated resource block, where the predetermined duration is the same as duration of the first time period, where the designated resource block quantity is a quantity of the designated resource blocks.

With reference to the sixth aspect or the second possible implementation of the sixth aspect, in an eighth possible implementation, the processor is further configured to if access fails during backoff access and a backoff random number obtained during current backoff is used as a backoff random number for next backoff access, after an access request sent by another station is detected, subtract a designated value from the backoff random number, where when the access manner is the time-domain backoff access, the designated value is 1, and when the access manner is the time-frequency two-dimensional backoff access, the designated value is a quantity of the designated resource blocks.

With reference to the sixth aspect, in a ninth possible implementation, the access rule is P-probability access, the access parameter defines a probability range, and the station further includes a transmitter, where the processor is further configured to generate a probability that is within the probability range, perform access contention by using the generated probability, and randomly select a resource block from a designated resource block after the contention succeeds; the transmitter is configured to send an access request to the access point on the selected resource block; and the receiver is further configured to receive an access response that is sent by the access point and that is used to instruct the station to perform access on the resource block, where the designated resource block is a resource block that is provided by the access point for the station for access, when a channel is divided according to a time domain and a frequency domain, the resource block is a time-frequency resource block, and when a channel is divided only according to a frequency domain, the resource block is a sub-channel.

With reference to the sixth aspect, in a tenth possible implementation, the access rule is P-probability access and a probability is adjustable, the access parameter defines a probability P, a value of the probability P is greater than 0 and less than 1, and the station further includes a transmitter, where the processor is further configured to if the probability P is used to perform access contention previously and a sub-channel is accessed successfully, increase the probability P, and perform access contention by using the increased probability P; if the probability P is used to perform access contention previously and a sub-channel is not accessed successfully, decrease the probability P, and perform access contention by using the decreased probability P; and if the probability P is not used to perform access contention previously, perform access contention by using the probability P; the processor is further configured to after the contention succeeds, randomly select a resource block from a designated resource block; the transmitter is configured to send an access request to the access point on the selected resource block; and the receiver is further configured to receive an access response that is sent by the access point and that is used to instruct the station to perform access on the resource block, where the designated resource block is a resource block that is provided by the access point for the station for access, when a channel is divided according to a time domain and a frequency domain, the resource block is a time-frequency resource block, and when a channel is divided only according to a frequency domain, the resource block is a sub-channel.

With reference any one of the sixth aspect or the second possible implementation of the sixth aspect to the tenth possible implementation, in an eleventh possible implementation, when the matching rule defines a designated service priority for which a bandwidth requirement needs to be reported, the processor is further configured to when a service priority of data needing to be sent by the station includes the designated service priority, obtain a bandwidth requirement of the designated service priority in the station, and add the bandwidth requirement to the access request; or obtain a bandwidth requirement of each service priority greater than or equal to the designated service priority in the station, and add the bandwidth requirement of each service priority to the access request; or obtain a bandwidth requirement of each service priority in the station, and add the bandwidth requirement of each service priority to the access request; or obtain a total bandwidth requirement of all service priorities in the station, and add the total bandwidth requirement to the access request; and the transmitter is further configured to send the access request to the access point on the selected resource block, where the designated service priority is at least one designated service priority.

With reference to any one of the sixth aspect or the second possible implementation of the sixth aspect to the tenth possible implementation, in a twelfth possible implementation, when the matching rule defines a designated service priority for which a bandwidth requirement needs to be reported, and the access parameter defines at least one resource block that is provided for a station having the designated service priority for access, the processor is further configured to after backing off successfully, select a resource block from the at least one resource block defined for the designated service priority.

With reference to any one of the sixth aspect or the second possible implementation of the sixth aspect to the tenth possible implementation, in a thirteenth possible implementation, the matching rule defines a signal strength that the access point expects to receive, and the processor is further configured to determine, according to a loss of a channel during signal transmission, whether a signal strength when a signal sent by using an adjusted transmit power reaches the access point reaches the signal strength that the access point expects to receive, and whether the adjusted transmit power is less than a listening threshold of a neighboring station; and the processor is further configured to if a power of the signal strength when the signal sent by using the adjusted transmit power used to send a signal reaches the access point reaches a power of the signal strength that the access point expects to receive, and the adjusted transmit power is less than the listening threshold of the neighboring station, adjust the transmit power used to send a signal.

According to a seventh aspect, an access point is provided, where the access point includes the multi-station access apparatus described in the third aspect or each possible implementation of the third aspect, or the access point is the access point described in the fifth aspect or each possible implementation of the fifth aspect.

According to an eighth aspect, a station is provided, where the station includes the multi-station access apparatus described in the fourth aspect or each possible implementation of the fourth aspect, or the station is the station described in the sixth aspect or each possible implementation of the sixth aspect.

According to a ninth aspect, a multi-station access system is provided, where the system includes the access point described in the seventh aspect and at least two stations described in the eighth aspect.

In the present disclosure, an access point obtains a current network feature and generates a matching rule and an access rule, so that a station performs uplink access according to the matching rule and the access rule. Because the access point may generate the matching rule and the access rule according to the current network feature and a service feature, an accessing station and an access manner can be controlled flexibly. This resolves a prior-art problem of reduced quality of service of a high-priority service because in an EDCA protocol, when there are relatively many low-priority service nodes, the high-priority service has difficulty in obtaining a resource through contention, or a conflict occurs between a low-priority packet and a high-priority packet. Effects of ensuring quality of service and user experience are achieved.

BRIEF DESCRIPTION OF DRAWINGS

To describe the technical solutions in the embodiments of the present disclosure more clearly, the following briefly describes the accompanying drawings for describing the embodiments. The accompanying drawings in the following description show merely some embodiments of the present disclosure, and a person of ordinary skill in the art may still derive other drawings from these accompanying drawings without creative efforts.

FIG. 1 is a schematic diagram of a network architecture used in a multi-station access method according to some embodiments of the present disclosure;

FIG. 2 is a flowchart of a multi-station access method according to an embodiment of the present disclosure;

FIG. 3 is a flowchart of a multi-station access method according to another embodiment of the present disclosure;

FIG. 7B is a schematic diagram showing that matching and access are performed according to a signal strength that is expected to be received and that is defined in a matching rule according to an embodiment of the present disclosure;

FIG. 11D is a schematic diagram showing that access is performed each time a contention window range is adjusted according to an embodiment of the present disclosure;

FIG. 12B is a schematic diagram showing that access is performed according to a backoff random number according to an embodiment of the present disclosure;

FIG. 13B is a schematic diagram showing that access is performed according to a backoff random number according to another embodiment of the present disclosure;

DESCRIPTION OF EMBODIMENTS

Figure 4:
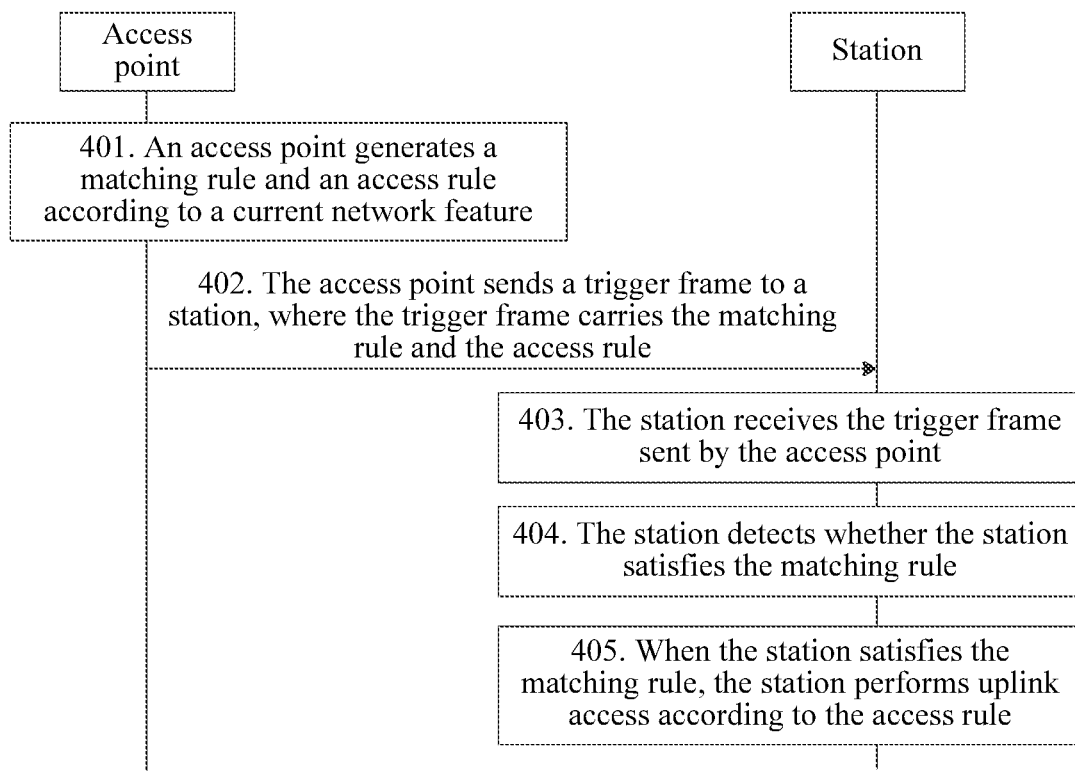
FIG. 4 is a flowchart of a multi-station access method according to still another embodiment of the present disclosure.

To make the objectives, technical solutions, and advantages of the present disclosure clearer, the following further describes the embodiments of the present disclosure in detail with reference to the accompanying drawings.

As shown in FIG. 1, FIG. 1 is a schematic diagram of a network architecture used in a multi-station access method according to some embodiments of the present disclosure. The network architecture includes an access point 120 and at least two stations 140.

The access point 120 (AP) is connected to each station 140 (STA) by using a wireless network, and the access point 120 and each station 140 may be located in a same local area network.

For example, the access point 120 may be a wireless router in the local area network, and the station 140 may be a wireless device in the local area network. For example, the station 140 may be a smartphone, a smart television, a tablet computer, an e-reader, or a multimedia player.

The access point 120 may listen to a channel status in the entire local area network and a service feature of data to be sent by each station 140.

As shown in FIG. 2, FIG. 2 is a flowchart of a multi-station access method according to an embodiment of the present disclosure. The multi-station access method is applied to the access point 120 in the network architecture shown in FIG. 1. The multi-station access method includes the following steps.

Step 201. Generate a matching rule and an access rule according to a current network feature, where the matching rule is used to restrict a station that is allowed to access a channel, and the access rule is used to restrict an access parameter of the station when the station accesses the channel in an access manner.

The network feature may include at least one of a network usage status, a network idle status, or quality of service of a network.

Optionally, the access point may further learn, according to information related to a historical service feature, a service feature of data that the station expects to send. The service feature herein may include at least one of a traffic category, a service priority, or a data size. The access point may further generate the matching rule and the access rule according to the current network feature and the service feature of the station.

The matching rule herein may be used to restrict the station that is allowed to access the channel. Because there may be relatively many stations that are to send data, to reduce access conflicts, a matching rule may be configured for a station that is allowed to perform access preferentially, according to the current network feature and a service feature of data to be sent by the station.

The access rule herein may be used to restrict the access parameter of the station when the station accesses the channel in an access manner. Because there may be many stations satisfying the matching rule, to avoid conflicts and collisions when the stations perform access, an access rule may be set for the stations, so that the conflicts and the collisions during access are reduced, and when an access capability of the access point is ensured, as many stations as possible occupy allocated resource blocks, to increase utilization of the resource blocks. The access manner herein may be an access manner pre-agreed by the access point and the station. For example, the access manner may be P-probability access, time-domain backoff access, or time-frequency two-dimensional backoff access. The time-frequency two-dimensional backoff access may further include time-frequency two-dimensional backoff access with carrier sense and time-frequency two-dimensional backoff access without carrier sense.

The access point may define, in a trigger frame according to the pre-agreed access manner, an access parameter of the station when the station performs uplink access.

The access point may configure the matching rule and the access rule according to the current network feature and the service feature of the data to be sent by the station, to flexibly control an accessing station (that is, an accessing user group) and an access manner.

Step 202. Send a trigger frame to the station, where the trigger frame carries the matching rule and the access rule.

The access point sends the trigger frame to the station. The trigger frame may carry the matching rule and the access rule that are generated in step 201.

The trigger frame may be used to trigger the station to perform matching according to the matching rule, and perform access according to the access rule after the matching succeeds.

In conclusion, in the multi-station access method provided in this embodiment of the present disclosure, an access point obtains a current network feature and generates a matching rule and an access rule, so that a station performs uplink access according to the matching rule and the access rule. Because the access point may generate the matching rule and the access rule according to the current network feature and a service feature, an accessing station and an access manner can be controlled flexibly. This resolves a prior-art problem of reduced quality of service of a high-priority service because in an EDCA protocol, when there are relatively many low-priority service nodes, the high-priority service has difficulty in obtaining a resource through contention, or a conflict occurs between a low-priority packet and a high-priority packet. Effects of ensuring quality of service and user experience are achieved.

As shown in FIG. 3, FIG. 3 is a flowchart of a multi-station access method according to another embodiment of the present disclosure. The multi-station access method is applied to the station 140 in the network architecture shown in FIG. 1. The multi-station access method includes the following steps.

Step 301. Receive a trigger frame sent by an access point, where the trigger frame carries a matching rule used to restrict a station that is allowed to access a channel, and an access rule used to restrict an access parameter of the station when the station accesses the channel.

Step 302. Detect whether the station satisfies the matching rule.

When the station receives the trigger frame sent by the access point, if the station is to send data, it may be determined according to the matching rule in the trigger frame whether the station itself satisfies an access condition of the access point.

Step 303. When the station satisfies the matching rule, perform uplink access according to the access rule.

In conclusion, in the multi-station access method provided in this embodiment of the present disclosure, a trigger frame sent by an access point is received, and uplink access is performed according to a matching rule and an access rule in the trigger frame. Because the matching rule and the access rule are generated by the access point according to a current network feature, the access point can control the stations flexibly. This resolves a prior-art problem of reduced quality of service of a high-priority service because in an EDCA protocol, when there are relatively many low-priority service nodes, the high-priority service has difficulty in obtaining a resource through contention, or a conflict occurs between a low-priority packet and a high-priority packet. Effects of ensuring quality of service and user experience are achieved.

As shown in FIG. 4, FIG. 4 is a flowchart of a multi-station access method according to still another embodiment of the present disclosure. The multi-station access method is applied to the network architecture shown in FIG. 1. The multi-station access method includes the following steps.

Step 401. An access point generates a matching rule and an access rule according to a current network feature.

The network feature may include at least one of a network usage status, a network idle status, or quality of service of a network.

Optionally, the access point may further learn, according to information related to a historical service feature, a service feature of data that the station expects to send. The service feature herein may include at least one of a traffic category, a service priority, or a data size. Optionally, when the station is to send data, the station may further send a service feature of the to-be-sent data to the access point. Correspondingly, the access point receives the service feature that is sent by the station and is of the data to be sent by the station. Optionally, the access point may further generate the matching rule and the access rule according to the current network feature and the service feature of the station.

The matching rule herein may be used to restrict a station that is allowed to access a channel. Because there may be relatively many stations that are to send data, to reduce access conflicts, a matching rule may be configured for a station that is allowed to perform access preferentially, according to the current network feature and a service feature of data to be sent by the station.

The matching rule may be a rule defined by one matching element or a logical combination of at least two matching elements, and the matching element includes but is not limited to a station group identifier, a traffic category, channel quality, a service priority, a signal strength expected to be received, a data packet size, a distance between a station and the access point, or a time delay requirement. The data packet size may be used to limit a quantity of data bits included in a data packet, or may be used to limit duration required to send a data packet.

The station group identifier is used to restrict a group a station in which may perform access. The traffic category is used to restrict a traffic category for which a station may perform access. The channel quality is used to restrict that a station having required channel quality may perform access. The service priority is used to restrict that a station whose to-be-sent data belongs to a designated priority may perform access. The signal strength expected to be received is used to restrict that a station whose signal has a strength satisfying the signal strength that the access point expects to receive may perform access. The data packet size is used to restrict that a station whose data packet satisfies the data packet size may perform access. The distance between the station and the access point is used to restrict that a station located within a required distance range of the access point may perform access. The time delay requirement is used to restrict that a station having a time delay requirement satisfying the required time delay requirement may perform access.

Different values, or value ranges, or parameters may be assigned to the matching elements, to restrict a station that is allowed to perform access. After a matching element is assigned with a value or parameter, the matching element may be combined with at least one other matching element assigned with a value or parameter, and an obtained logical combination may be used as the matching rule.

For example, the matching rule is data packet less than 50 kb && signal-to-noise ratio greater than 20 dB && voice service. The data packet size is assigned with a value range "less than 50 kb", the signal-to-noise ratio is assigned with a value range "greater than 20 dB", the traffic category is assigned with a parameter of a voice service, and "&&" is an AND logical operation.

For another example, the matching rule is (buffer size >30 bits||video service) && distance between a geographical location and the access point is within 20 meters. The buffer size is assigned with a value range "greater than 30 bits", the traffic category is assigned with a parameter of a video service, a distance to the access point is assigned with a value range "within 20 meters", "&&" is an AND logical operation, and "||" is an OR logical operation.

After a matching element is assigned with a value or a parameter, the matching element may be used as a matching rule independently.

In some embodiments, in addition to the foregoing matching elements, another matching element may be included. A type of a matching element is not specifically limited in this embodiment.

The access rule herein may be used to restrict an access parameter of the station when the station accesses the channel. Because there may be many stations satisfying the matching rule, to avoid conflicts and collisions when the stations perform access, an access rule may be set for the stations, so that the conflicts and the collisions during access are reduced, and when an access capability of the access point is ensured, as many stations as possible occupy allocated resource blocks, to increase utilization of the resource blocks.

The access manner herein may be an access manner pre-agreed by the access point and the station. The access manner may include at least P-probability access, time-domain backoff access, or time-frequency two-dimensional backoff access. The time-frequency two-dimensional backoff access includes time-frequency two-dimensional backoff access with carrier sense and time-frequency two-dimensional backoff access without carrier sense. In some embodiments, there may be another access manner. A type of an access manner is not specifically limited in this embodiment.

The access point may configure the matching rule and the access rule according to the current network feature and the service feature of the data to be sent by the station, to flexibly control an accessing station (that is, an accessing user group) to perform uplink access.

Step 402. The access point sends a trigger frame to a station, where the trigger frame carries the matching rule and the access rule.

The access point sends the trigger frame to the station. The trigger frame may carry the matching rule and the access rule that are generated in step 402.

The trigger frame may be used to trigger the station to perform matching according to the matching rule, and perform access according to the access rule after the matching succeeds.

Step 403. The station receives the trigger frame sent by the access point.

Step 404. The station detects whether the station satisfies the matching rule.

For each matching element in the matching rule, the station detects whether a feature corresponding to the matching element in the station satisfies a limitation to the matching element in the matching rule, if all features satisfy all limitations, the station detects whether the matching elements in the station satisfy logical limitations to the matching elements in the matching rule, and if the matching elements satisfy the logical limitations, it indicates that the station satisfies the matching rule.

Step 405. When the station satisfies the matching rule, the station performs uplink access according to the access rule.

When performing uplink access according to the access rule, if the station successfully selects a resource block from a designated resource block, the station may send an access request to the access point on the resource block. Correspondingly, the access point receives the access request that is sent by the station on the selected resource block, and the access point sends, to the station, an access response used to allow the station to perform access on the resource block.

Optionally, the station receives the access response sent by the access point, and after receiving the access response, sends data by using the resource block on which access is performed.

The designated resource block herein is a resource block that is provided by the access point for the station for access. The designated resource block may be all or a part of a resource block provided by the access point. When a channel is divided according to a time domain and a frequency domain, the designated resource block is a time-frequency resource block, and when a channel is divided only according to a frequency domain, the designated resource block is a sub-channel.

It should be noted that, unless otherwise specified, the designated resource block in the following embodiments has a meaning the same as that of the designated resource block described herein. Therefore, the designated resource block will not be defined repeatedly in the following embodiments.

Optionally, a channel division manner may be notified by the access point to the station, or may be set in a network structure by default. When the channel division manner is notified by the access point to the station, the channel division manner and a quantity of divided resource blocks may be carried in the matching rule in the trigger frame, or may be carried in another data packet.

When the selected resource block is a sub-channel, the station may send the access request on the selected sub-channel. When the selected resource block is a time-frequency resource block, the station may send the access request on the selected time-frequency resource block.

In conclusion, in the multi-station access method provided in this embodiment of the present disclosure, an access point obtains a current network feature and generates a matching rule and an access rule, so that a station performs uplink access according to the matching rule and the access rule. Because the access point may generate the matching rule and the access rule according to the current network feature, an accessing station and an access manner can be controlled flexibly. This resolves a prior-art problem of reduced quality of service of a high-priority service because in an EDCA protocol, when there are relatively many low-priority service nodes, the high-priority service has difficulty in obtaining a resource through contention, or a conflict occurs between a low-priority packet and a high-priority packet. Effects of ensuring quality of service and user experience are achieved.

In a possible implementation, after the access point sends the trigger frame once and receives the access request sent by the station, to improve utilization of a network as much as possible, the access point may further detect whether to allow more stations to perform access. That is, after receiving the access request sent by the station, the access point may further detect whether the access point satisfies a sending condition of continuing to send a next trigger frame. The sending condition herein may include at least one of the following, the access point still has a receiving capability, a quantity of times of sending trigger frames is less than a predetermined quantity of times, or a quantity of stations sending access requests does not reach a predetermined quantity. If the access point has the sending condition of continuing to send a next trigger frame, it indicates that the access point may further allow another station to perform access. In this case, the access point sends the next trigger frame. When sending the next trigger frame, the access point may continue to generate a matching rule and an access rule for the next trigger frame according to a current network status, a service feature of data to be sent by the station, and the like.

If the access point does not satisfy the sending condition of continuing to send a next trigger frame, it indicates that the access point does not allow another station to perform access. In this case, the access point performs the step of sending, to the station, an access response used to allow the station to perform access on the resource block.

In the multi-station access method provided in this embodiment of the present disclosure, after sending a trigger frame once, if an access point determines that more stations can be allowed to perform access, the access point may continue to send a trigger frame to a station, so that more stations perform uplink access, thereby improving network use efficiency.

In some embodiments, an access point may determine different matching rules and access rules according to network features. Correspondingly, stations may perform uplink access according to the matching rules and the access rules. Because the matching rules and the access rules are different, the stations may perform matching and access in different manners. The following gives a description by using an example.

In a possible implementation, the access point may impose, by using multi-dimensional matching, a requirement on a station that is allowed to perform access. That is, the matching rule may be a rule defined by one matching element or a logic combination of at least two matching elements. For example, the matching rule may be that a traffic category is a designated service, or the matching rule may be that a traffic category is a designated service and channel quality is high channel quality (this may be defined by setting a channel quality threshold), or the matching rule may be that a data packet satisfies a designated range.

Figure 5A:
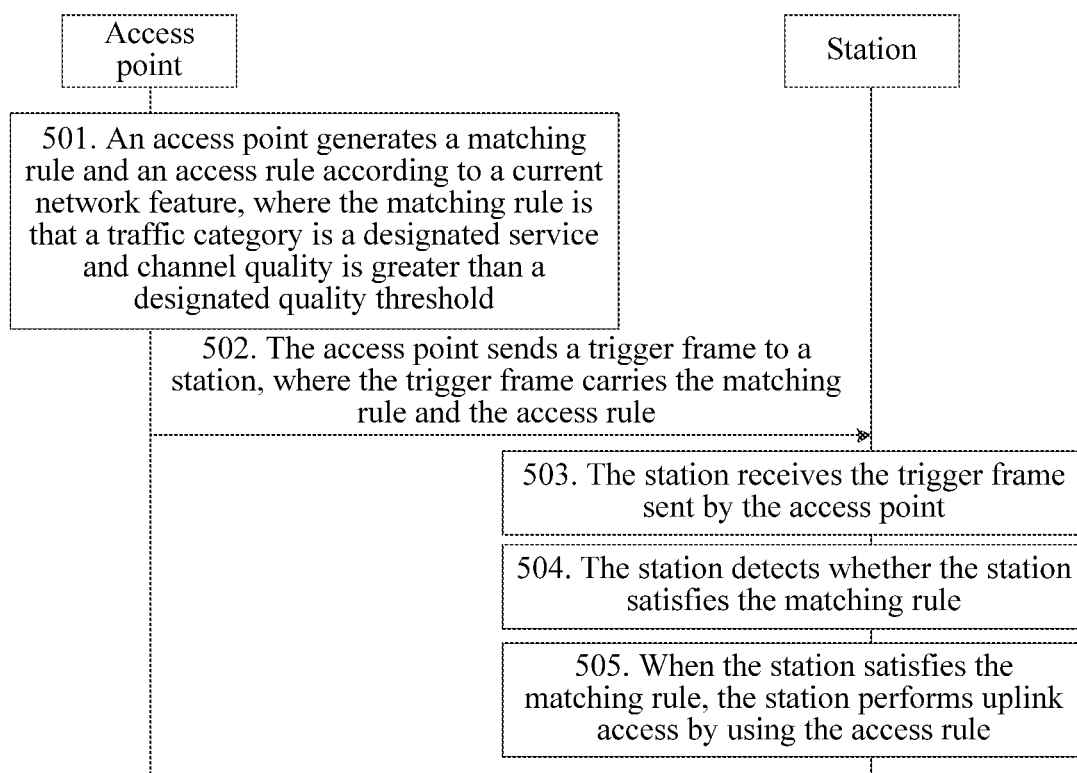
FIG. 5A is a flowchart of a multi-station access method according to still another embodiment of the present disclosure.

The following gives a description with reference to FIG. 5A by using an example in which a matching rule is that a traffic category is a designated service, or a matching rule is that a traffic category is a designated service and channel quality is high channel quality.

As shown in FIG. 5A, FIG. 5A is a flowchart of a multi-station access method according to still another embodiment of the present disclosure. The multi-station access method is applied to the network architecture shown in FIG. 1. The multi-station access method includes the following steps.

Step 501. An access point generates a matching rule and an access rule according to a current network feature, where the matching rule is that a traffic category is a designated service and channel quality is greater than a designated quality threshold.

The matching rule is used to restrict a station that is allowed to access a channel.

In some embodiments, the designated service may be at least one of a voice service, a video service, a best effort service, or a background service, and the designated quality threshold is a specific value.

Step 502. The access point sends a trigger frame to a station, where the trigger frame carries the matching rule and the access rule.

Step 503. The station receives the trigger frame sent by the access point.

Step 504. The station detects whether the station satisfies the matching rule.

When the station obtains the matching rule, the station may detect whether a traffic category of data to be sent by the station is the designated service required in the matching rule, if the traffic category is the designated traffic category, the station further detects whether channel quality of the station reaches the designated quality threshold required in the matching rule, and if the channel quality reaches the designated quality threshold, the station satisfies the matching rule.

For example, when the matching rule that the traffic category needs to be a voice service, and channel quality needs to be greater than A, when the station satisfies the matching rule, the station needs to satisfy that the to-be-sent data is the voice service and the channel quality is greater than A.

Step 505. When the station satisfies the matching rule, the station performs uplink access by using the access rule.

Figures 5B, 6A:
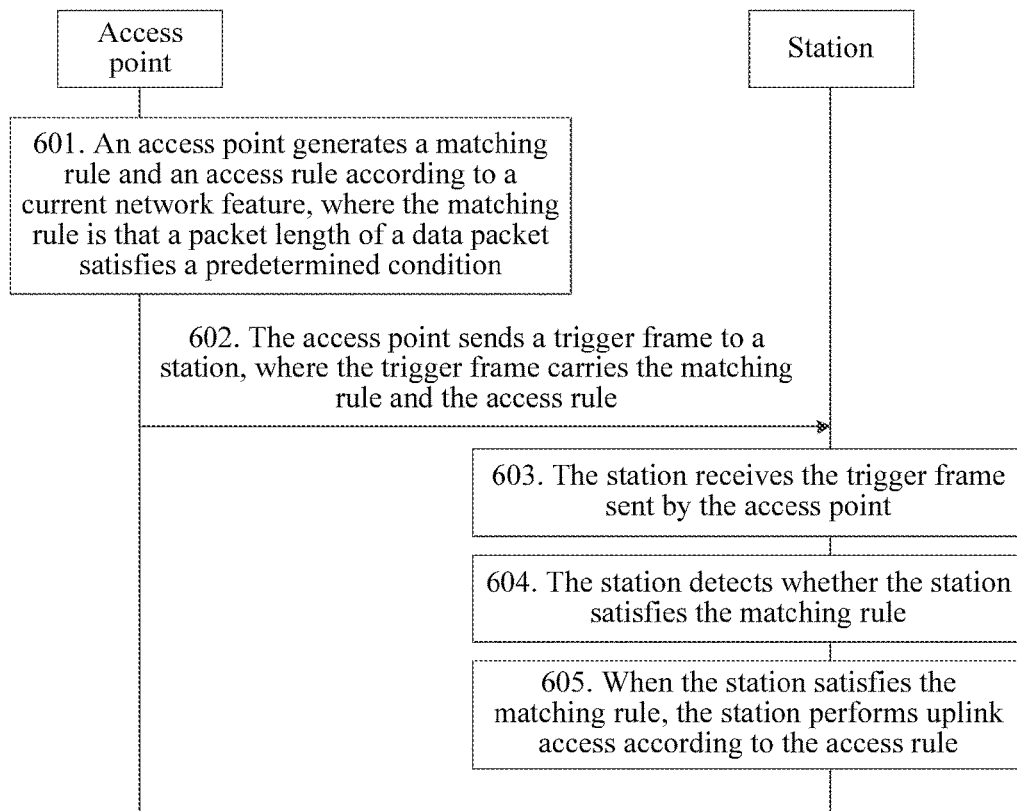
FIG. 5B is a schematic diagram showing that multiple stations perform access according to an embodiment of the present disclosure.
FIG. 6A is a flowchart of a multi-station access method according to still another embodiment of the present disclosure.

For example, as shown in FIG. 5B, FIG. 5B is a schematic diagram showing that multiple stations perform access according to an embodiment of the present disclosure. A matching rule in the first trigger frame is that a traffic category is a voice service. When one station satisfies the matching rule the station performs uplink access by using the access rule. For example, the station selects a sub-channel according to the access rule, and sends an access request RTX to the access point on the sub-channel. When the access point receives the RTX, if the access point determines that another station is allowed to perform access, the access point sends the second trigger frame to the station. A matching rule in the second trigger frame is that a traffic category is a best effort service and channel quality is high channel quality (for example, it is defined that the channel quality is greater than a predetermined quality threshold). If three stations satisfy the matching rule carried in the second trigger frame, the stations perform uplink access by using the access rule. For example, each station selects a sub-channel according to the access rule, and sends an access request RTX to the access point on the sub-channel. In this case, if the access point determines that no other station is allowed to perform access, the access point sends an acknowledgement response CTX. The accessing stations start to send data. After receiving the data data, the access point sends, to the station, a data reception response BAs used to indicate that data is received.

In conclusion, in the multi-station access method provided in this embodiment of the present disclosure, an access point obtains a current network feature and generates a matching rule and an access rule, so that a station performs uplink access according to the matching rule and the access rule. Because the access point may generate the matching rule and the access rule according to the current network feature, an accessing station and an access manner can be controlled flexibly, so that a problem in the prior that because in an EDCA protocol, when there are relatively many low-priority service nodes, a high-priority service has difficulty in obtaining a resource through contention, or a conflict occurs between a low-priority packet and a high-priority packet, quality of service of a high-priority service is reduced is resolved, and effects of ensuring quality of service and user experience are achieved.

In addition, because multi-dimensional matching is used, a station that can perform access can be controlled more flexibly.

Because trigger frames may be sent for multiple times to allow more stations to perform access, and the trigger frames may have different matching conditions and access rules, a station that can perform access can be controlled more flexibly, and network utilization can be improved.

In a possible implementation, the access point may impose, by using the multi-dimensional matching, a requirement on a station that is allowed to perform access. For example, the access point may limit, by limiting a packet length of a data packet sent by a station, a station that is allowed to perform access. For example, the matching rule may be that a data volume in a sent data packet needs to satisfy a specified data volume range. For another example, the matching rule may be that expected duration of sending a data packet needs to satisfy a designated sending duration range. That is, it is ensured that accessing stations can be aligned as much as possible when sending data packets, thereby avoiding relatively long padding, and improving channel utilization.

As shown in FIG. 6A, FIG. 6A is a flowchart of a multi-station access method according to still another embodiment of the present disclosure. The multi-station access method is applied to the network architecture shown in FIG. 1. The multi-station access method includes the following steps.

Step 601. An access point generates a matching rule and an access rule according to a current network feature, where the matching rule is that a packet length of a data packet satisfies a predetermined condition.

The predetermined condition may be that a data volume in a data packet satisfies a specified data volume range, or expected duration of sending a data packet satisfies a specified sending duration range.

Step 602. The access point sends a trigger frame to a station, where the trigger frame carries the matching rule and the access rule.

Step 603. The station receives the trigger frame sent by the access point.

Step 602 and step 603 are similar to step 402 and step 403. For details, refer to descriptions of step 402 and step 403, and details are not described herein again.

Step 604. The station detects whether the station satisfies the matching rule.

The station detects whether a data packet corresponding to data to be sent by the station satisfies a predetermined condition. For example, when the specified data volume range is less than 50 Bytes, the station detects whether the data packet corresponding to the data to be sent by the station is less than 50 Bytes, and if the data volume is less than 50 Bytes, it is determined that the station satisfies the matching rule.

Step 605. When the station satisfies the matching rule, the station performs uplink access according to the access rule.

Figures 6B, 7A:
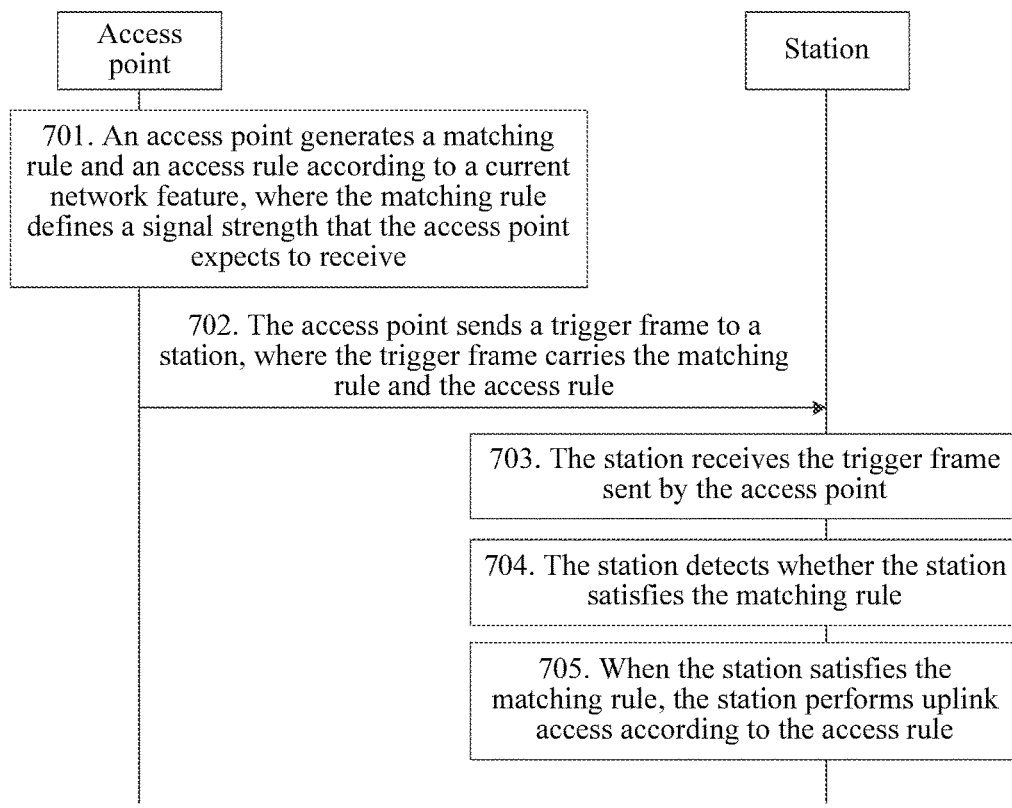
FIG. 6B is a schematic diagram showing that access is performed according to a data packet size defined in a matching rule according to an embodiment of the present disclosure.
FIG. 7A is a flowchart of a multi-station access method according to still another embodiment of the present disclosure.

For example, as shown in FIG. 6B, FIG. 6B is a schematic diagram showing that access is performed according to a data packet size defined in a matching rule according to an embodiment of the present disclosure. The matching rule in the trigger frame is a small packet (a packet length is less than 50 Bytes). If packet lengths of data to be sent by four stations are less than 50 Bytes, the stations perform uplink access, that is, send access requests RTXs to the access point. When the access point receives the RTXs, if the access point determines that the access point does not satisfy a sending condition of continuing to send a next trigger frame, the access point sends an acknowledgement response CTX to the stations. The four stations start to send data data. After receiving the data data, the access point sends, to the stations, a data reception response BAs used to indicate that the data is received. Small differences exist between the packet lengths of the data packets sent by the four stations in FIG. 6B, thereby avoiding relatively long padding and improving channel utilization.

In conclusion, in the multi-station access method provided in this embodiment of the present disclosure, an access point obtains a current network feature and generates a matching rule and an access rule, so that a station performs uplink access according to the matching rule and the access rule. Because the access point may generate the matching rule and the access rule according to the current network feature, an accessing station and an access manner can be controlled flexibly. This resolves a prior-art problem of reduced quality of service of a high-priority service because in an EDCA protocol, when there are relatively many low-priority service nodes, the high-priority service has difficulty in obtaining a resource through contention, or a conflict occurs between a low-priority packet and a high-priority packet. Effects of ensuring quality of service and user experience are achieved.

Because a data packet size may be restricted according to the matching rule, to avoid a problem of relatively large Padding overheads caused by a fact that stations having greatly different data transmission amounts start transmission at the same time, channel utilization is improved.

In a possible implementation, because geographical locations of stations are different, statuses of channels from the stations to the access point are different. Therefore, when the stations transmit signals to the access point, powers of the stations received by the access point are different. In this way, because a demodulation range of the access point is fixed, if strength differences between received signals of the stations exceed the range, strong signals may drown weak signals. Consequently, an access request RTX sent by an edge user cannot be demodulated, and the edge user cannot access a channel, leading to a problem of unfairness. Therefore, a solution of performing matching and access according to a received signal strength is proposed. In this solution, the access point may impose a requirement on a received signal strength. For example, the matching rule may be a signal strength that the access point expects to receive. The signal strength is a particular designated strength.

As shown in FIG. 7A, FIG. 7A is a flowchart of a multi-station access method according to still another embodiment of the present disclosure. The multi-station access method is applied to the network architecture shown in FIG. 1. The multi-station access method includes the following steps.

Step 701. An access point generates a matching rule and an access rule according to a current network feature, where the matching rule defines a signal strength that the access point expects to receive.

In some embodiments, the signal strength defined in the matching rule may be a strength value defined in a trigger frame by the access point. For example, the strength value is −30 dBm. Alternatively, the signal strength defined in the matching rule may be a strength range defined in a trigger frame by the access point. For example, the strength range is (−30 dBm, −40 dBm), or a range greater than −30 dBm, or a range less than −40 dBm.

Step 702. The access point sends a trigger frame to a station, where the trigger frame carries the matching rule and the access rule.

Step 703. The station receives the trigger frame sent by the access point.

Step 702 and step 703 are similar to step 402 and step 403. For details, refer to descriptions of step 402 and step 403, and details are not described herein again.

Step 704. The station detects whether the station satisfies the matching rule.

When detecting whether the station satisfies the matching rule, the station determines, according to a loss of a channel during signal transmission, whether a signal strength when a signal sent by using an adjusted transmit power reaches the access point satisfies the signal strength that the access point expects to receive, and whether the adjusted transmit power is less than a listening threshold of a neighboring station. If a power of the signal strength when the signal sent by using the adjusted transmit power for sending a signal reaches the access point satisfies a power of the signal strength that the access point expects to receive, and the adjusted transmit power is less than the listening threshold of the neighboring station, the station adjusts the transmit power for sending a signal.

It is considered that a very strong transmit power may affect a listening threshold of another neighboring station, leading to that the other neighboring station cannot normally receive a signal. Therefore, to avoid an effect on the other neighboring station, the adjusted transmit power needs to be defined.

Step 705. When the station satisfies the matching rule, the station performs uplink access according to the access rule.

For example, as shown in FIG. 7B, FIG. 7B is a schematic diagram showing that matching and access are performed according to a signal strength that is expected to be received and that is defined in a matching rule according to an embodiment of the present disclosure. The matching rule in the trigger frame is that the signal strength expected to be received is P 1. If there are four stations, and the stations estimate that signal strengths when signals transmitted according to adjusted transmit powers reach the access point satisfy the signal strength expected by the access point, the stations perform uplink access, that is, the stations send access requests RTXs to the access point. When the access point receives the RTXs, if the access point determines that the access point does not satisfy a sending condition of continuing to send a next trigger frame, the access point sends an acknowledgement response CTX to the stations. The four stations start to send data data. After receiving the data data, the access point sends, to the stations, a data reception response BAs used to indicate that the data is received.

In conclusion, in the multi-station access method provided in this embodiment of the present disclosure, an access point obtains a current network feature and generates a matching rule and an access rule, so that a station performs uplink access according to the matching rule and the access rule. Because the access point may generate the matching rule and the access rule according to the current network feature, an accessing station and an access manner can be controlled flexibly. This resolves a prior-art problem of reduced quality of service of a high-priority service because in an EDCA protocol, when there are relatively many low-priority service nodes, the high-priority service has difficulty in obtaining a resource through contention, or a conflict occurs between a low-priority packet and a high-priority packet. Effects of ensuring quality of service and user experience are achieved.

It should be noted that the foregoing merely describes the matching rule by using an example. In some embodiments, content of the matching rule may be defined according to needs.

When access manners pre-agreed by the access point and the station are different, processes in which the station performs uplink access according to an access parameter of an access rule in the foregoing embodiment are different. The following gives a description by using an example in which the access manner is P probability access, time-domain backoff access, and time-frequency two-dimensional backoff access.

In a possible implementation, an access manner pre-agreed on between an access point and a station may be P-probability access. When P-probability access is used, the access point may still impose, by using multi-dimensional matching, a requirement on a station that is allowed to perform access. For example, a description is provided by using an example in which the access manner is P-probability access, and a matching rule defined in a trigger frame is that a traffic category is a designated service, and an access parameter in an access rule defines a probability range. That is, an access probability is configured for a designated service, to ensure that a high-priority service can perform access with a relatively large probability, and ensure quality of service of a network.

Figure 8A:
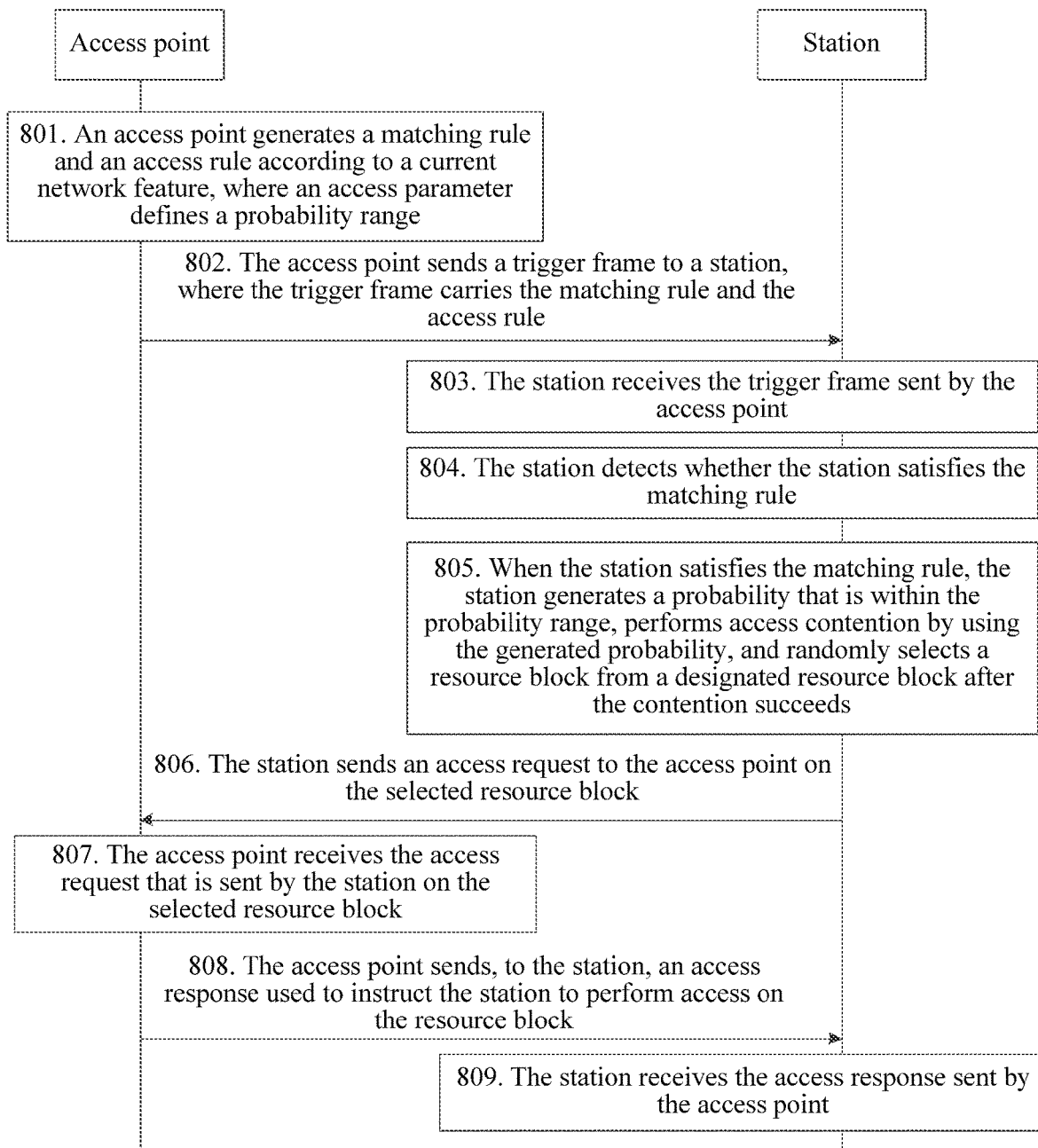
FIG. 8A is a flowchart of a multi-station access method according to still another embodiment of the present disclosure.

As shown in FIG. 8A, FIG. 8A is a flowchart of a multi-station access method according to still another embodiment of the present disclosure. The multi-station access method is applied to the network architecture shown in FIG. 1. The multi-station access method includes the following steps.

Step 801. An access point generates a matching rule and an access rule according to a current network feature, where an access parameter defines a probability range.

The probability range may be that P is equal to 1, or P is greater than 0.7, or P is less than 0.6. A probability range may be determined according to a quantity of stations needing to send data and a quantity of resource blocks provided for access.

Step 802. The access point sends a trigger frame to a station, where the trigger frame carries the matching rule and the access rule.

Step 803. The station receives the trigger frame sent by the access point.

Step 804. The station detects whether the station satisfies the matching rule.

Step 802 to step 804 are similar to step 402 to step 404. For details, refer to descriptions of step 402 to step 404, and details are not described herein again.

When the station satisfies the matching rule, the station may perform uplink access according to the access rule. For details, refer to step 805 to step 809.

Step 805. When the station satisfies the matching rule, the station generates a probability that is within the probability range, performs access contention by using the generated probability, and randomly selects a resource block from a designated resource block after the contention succeeds.

Access contention is performed by using the generated probability within the probability range. After the contention succeeds, it indicates that the station currently needs to perform access. Then, during access, the station may randomly select a resource block from the designated resource block to perform access.

In a possible implementation, the trigger frame carries a channel division manner. For example, the trigger frame indicates that a channel is divided according to a time domain and a frequency domain. Correspondingly, when randomly selecting a resource block, the station selects a time-frequency resource block from the designated resource block. For another example, the trigger frame indicates that a channel is divided according to a frequency domain. Correspondingly, when randomly selecting a resource block, the station selects one sub-channel from the designated resource block.

Optionally, the access parameter in the trigger frame sent by the access point may further define a contention window range. In this way, when multiple stations succeed in access contention, to avoid conflicts caused by a fact that multiple stations perform access at the same time, a backoff random number may be generated according to the contention window range, and backoff access is performed by using the contention random number.

Step 806. The station sends an access request to the access point on the selected resource block.

Step 807. The access point receives the access request that is sent by the station on the selected resource block.

Step 808. The access point sends, to the station, an access response used to instruct the station to perform access on the resource block.

Step 809. The station receives the access response sent by the access point.

Figure 8B:
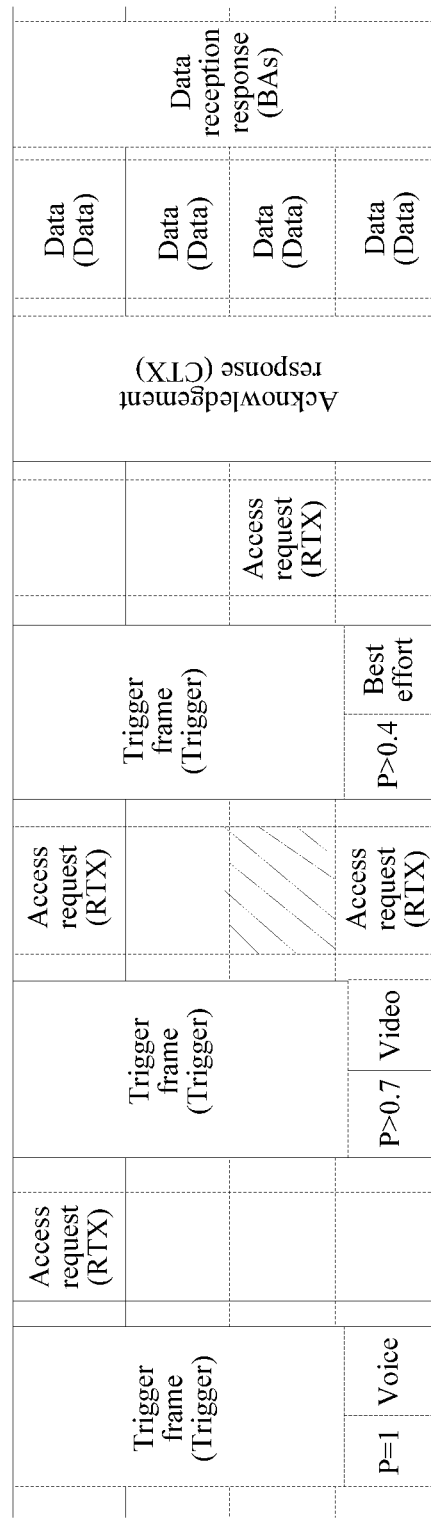
FIG. 8B is a schematic diagram showing that access is performed by using a probability P according to an embodiment of the present disclosure.

For example, as shown in FIG. 8B, FIG. 8B is a schematic diagram showing that access is performed by using a probability P according to an embodiment of the present disclosure. A matching rule in the first trigger frame is that a traffic category is a voice service, an access manner is P-probability access, and an access parameter is P=1. One station satisfies the matching condition, and performs access contention by using the probability P, and after the access contention succeeds, the station randomly selects a sub-channel to perform access, that is, sends an access request RTX to the access point. When the access point receives the RTX, if the access point determines that another station is allowed to perform access, the access point delivers the second trigger frame to the station. A matching rule in the second trigger frame is that a traffic category is a video service, an access manner is P-probability access, and an access parameter is P>0.7. In this case, two stations satisfy the matching rule carried in the second trigger frame, generate probabilities greater than 0.7, and perform access contention by using the generated probabilities. After the access contention succeeds, each station randomly selects a sub-channel to perform access, that is, sends an access request RTX to the access point. Similarly, a matching rule in the third trigger frame is that a traffic category is a best effort service, an access manner is P-probability access, and a probability P is greater than 0.4. In this case, one station satisfies the matching rulecarried in the third trigger frame, generates a probability greater than 0.4, performs access contention by using the generated probability, and after the access contention succeeds, randomly selects a sub-channel to perform access, that is, sends an access request RTX to the access point. In this case, the access point determines that no other station is allowed to perform access, the access point sends an acknowledgement response CTX. The access stations start to send data data. After receiving the data data, the access point sends, to the stations, a data reception response BAs used to indicate that the data is received.

In conclusion, in the multi-station access method provided in this embodiment of the present disclosure, an access point obtains a current network feature and generates a matching rule and an access rule, so that a station performs uplink access according to the matching rule and the access rule. Because the access point may generate the matching rule and the access rule according to the current network feature, an accessing station and an access manner can be controlled flexibly. This resolves a prior-art problem of reduced quality of service of a high-priority service because in an EDCA protocol, when there are relatively many low-priority service nodes, the high-priority service has difficulty in obtaining a resource through contention, or a conflict occurs between a low-priority packet and a high-priority packet. Effects of ensuring quality of service and user experience are achieved.

First, the matching rule is used, so that a station having a high-priority voice service performs access. Then, the matching rule is used, so that a station having a high-priority video service performs access, and if the access point still has an access capability, the matching rule is used, so that a station having a low-priority best effort service performs access. Therefore, it is ensured that when a high-priority service performs access, when the access point still has an access capability, a low-priority service can further perform access together, thereby improving network utilization.

Because different access probabilities may be set according to service priorities, for example, a relatively large access probability may be set for a high-priority service, a probability that a high-priority service accesses a channel is relatively large, thereby ensuring quality of service of a network.

In a possible implementation, a process in which a station performs uplink access by using an access rule is described by using an example in which an access manner pre-agreed on between an access point and a station is P-probability access and a probability is adjustable.

Figure 9A:
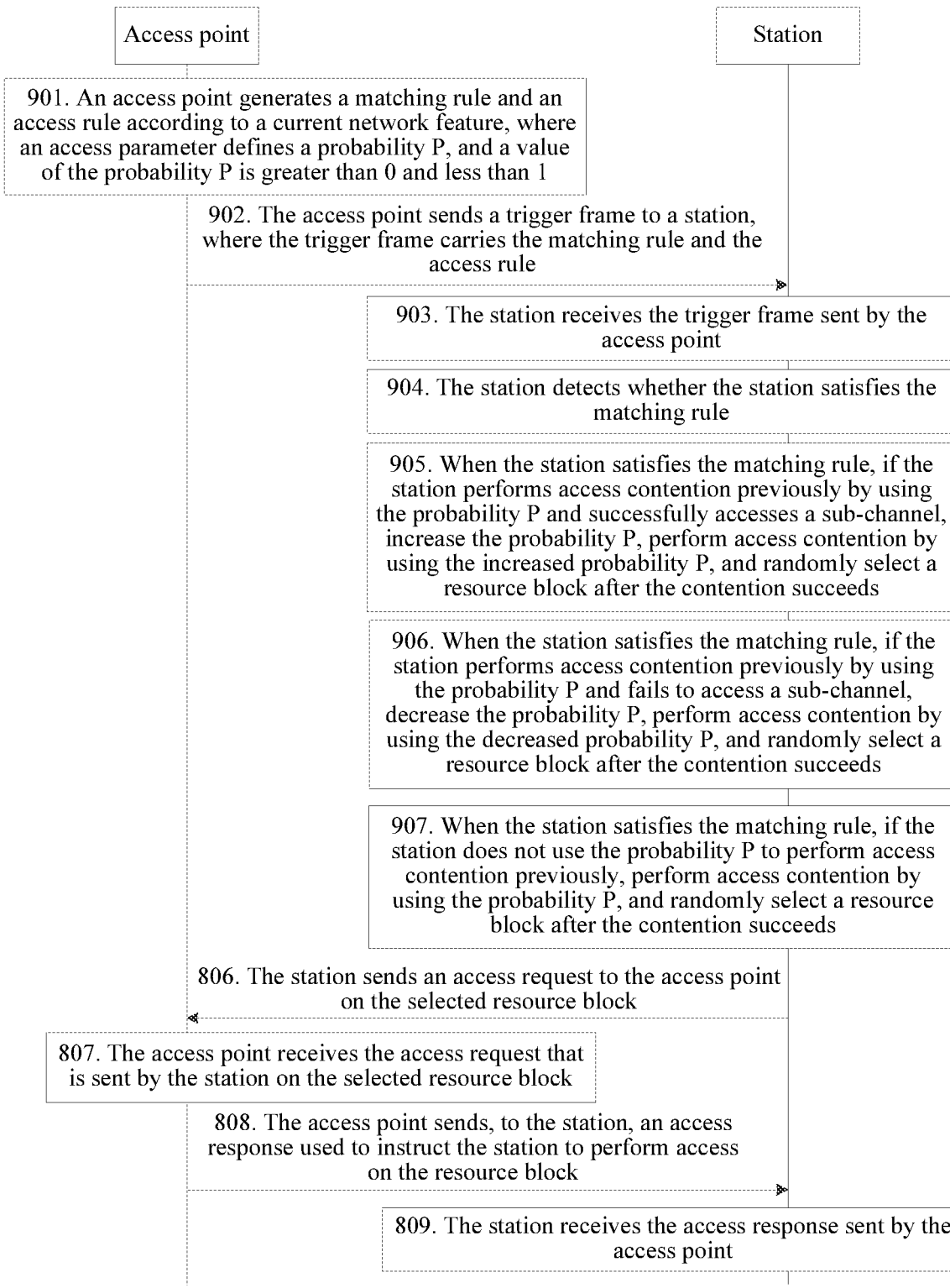
FIG. 9A is a flowchart of a multi-station access method according to still another embodiment of the present disclosure.

As shown in FIG. 9A, FIG. 9A is a flowchart of a multi-station access method according to still another embodiment of the present disclosure. The multi-station access method is applied to the network architecture shown in FIG. 1. The multi-station access method includes the following steps.

Step 901. An access point generates a matching rule and an access rule according to a current network feature, where an access parameter defines a probability P, and a value of the probability P is greater than 0 and less than 1.

Step 902. The access point sends a trigger frame to a station, where the trigger frame carries the matching rule and the access rule.

Step 903. The station receives the trigger frame sent by the access point.

Step 904. The station detects whether the station satisfies the matching rule.

Step 902 to step 904 are similar to step 402 to step 404. For details, refer to descriptions of step 402 to step 404, and details are not described herein again.

When the station satisfies the matching rule, the station may perform uplink access according to the access rule. For details, refer to step 905 to step 907 and step 806 to step 809 in FIG. 8A.

Step 905. When the station satisfies the matching rule, if the station performs access contention previously by using the probability P and successfully accesses a sub-channel, increase the probability P, perform access contention by using the increased probability P, and randomly select a resource block after the contention succeeds.

Optionally, a manner of increasing the probability P may be change P to $P^{(1/\alpha)}$, where $\alpha>1$; or multiply p by a value greater than 1.

In some embodiments, another manner may be used to increase the probability P. This embodiment does not specifically limit a manner of increasing the probability P.

Step 906. When the station satisfies the matching rule, if the station performs access contention previously by using the probability P and fails to access a sub-channel, decrease the probability P, perform access contention by using the decreased probability P, and randomly select a resource block after the contention succeeds.

Optionally, a manner of decreasing the probability P may be change P to $P^{\alpha}$, where $\alpha>1$; or multiply p by a value greater than 0 and less than 1.

In some embodiments, another manner may be used to decrease the probability P. This embodiment does not specifically limit a manner of decreasing the probability P.

Step 907. When the station satisfies the matching rule, if the station does not use the probability P to perform access contention previously, perform access contention by using the probability P, and randomly select a resource block after the contention succeeds.

Optionally, the access parameter in the trigger frame sent by the access point may further define a contention window range. In this way, when multiple stations succeed in access contention, to avoid conflicts caused by a fact that multiple stations perform access at the same time, a contention random number may be generated according to the contention window range, and backoff access is performed by using the contention random number.

For a step of performing, after a resource block is selected, uplink access by using the resource block, refer to step 806 to step 809 in FIG. 8A, and details are not described herein again.

Figure 9B:
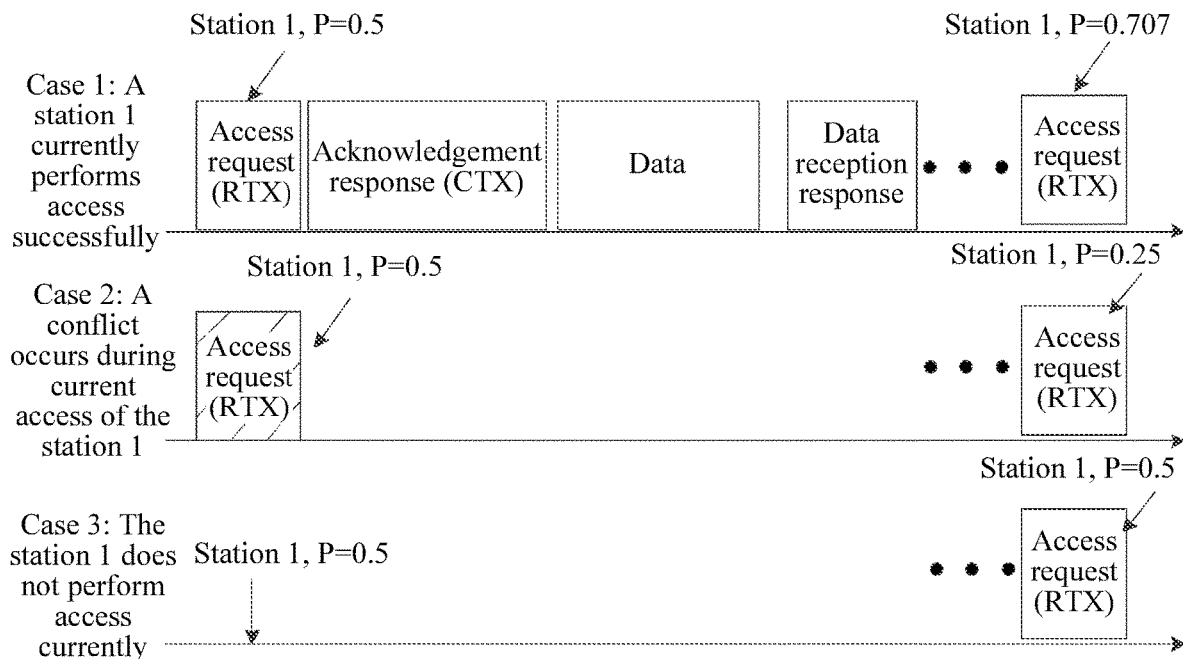
FIG. 9B is a schematic diagram showing that a station adjusts a probability P according to historical access according to an embodiment of the present disclosure.

For example, as shown in FIG. 9B, FIG. 9B is a schematic diagram showing that a station adjusts a probability P according to historical access according to an embodiment of the present disclosure. For example, $\alpha=2$, if P=0.5 currently, if the access succeeds, a value of P is increased when access contention is performed next time, that is, P=0.707 (as shown in case 1 in FIG. 9B). If access fails, a value of P is decreased when access contention is performed next time, that is, P=0.25 (as shown in case 2 in FIG. 9B). If access is not performed currently, a value of P remains unchanged when access contention is performed next time, that is, P=0.5 (as shown in case 3 in FIG. 9B).

It should also be noted that a probability in an access manner being adjustable may be pre-agreed by the access point and the station according to a protocol, or may be defined by the access point in the trigger frame.

In conclusion, in the multi-station access method provided in this embodiment of the present disclosure, an access point obtains a current network feature and generates a matching rule and an access rule, so that a station performs uplink access according to the matching rule and the access rule. Because the access point may generate the matching rule and the access rule according to the current network feature, an accessing station and an access manner can be controlled flexibly. This resolves a prior-art problem of reduced quality of service of a high-priority service because in an EDCA protocol, when there are relatively many low-priority service nodes, the high-priority service has difficulty in obtaining a resource through contention, or a conflict occurs between a low-priority packet and a high-priority packet. Effects of ensuring quality of service and user experience are achieved.

In addition, when the station performs P-probability access according to the probability P, according to success or failure information of a historical access, the station may determine to increase a probability used for current P-probability access, to improve an access success rate, or determine to decrease a probability used for current P-probability access, to balance the station with other stations on access success probabilities.

In a possible implementation, a process in which a station performs uplink access by using an access rule is described by using an example in which an access manner is time-domain backoff access and time-frequency two-dimensional backoff access. To avoid conflicts caused by a fact that multiple stations perform access at the same time, the stations may perform backoff access, so that access opportunities of the stations are different, to reduce conflicts. In this case, an access parameter defines a contention window range.

Figure 10:
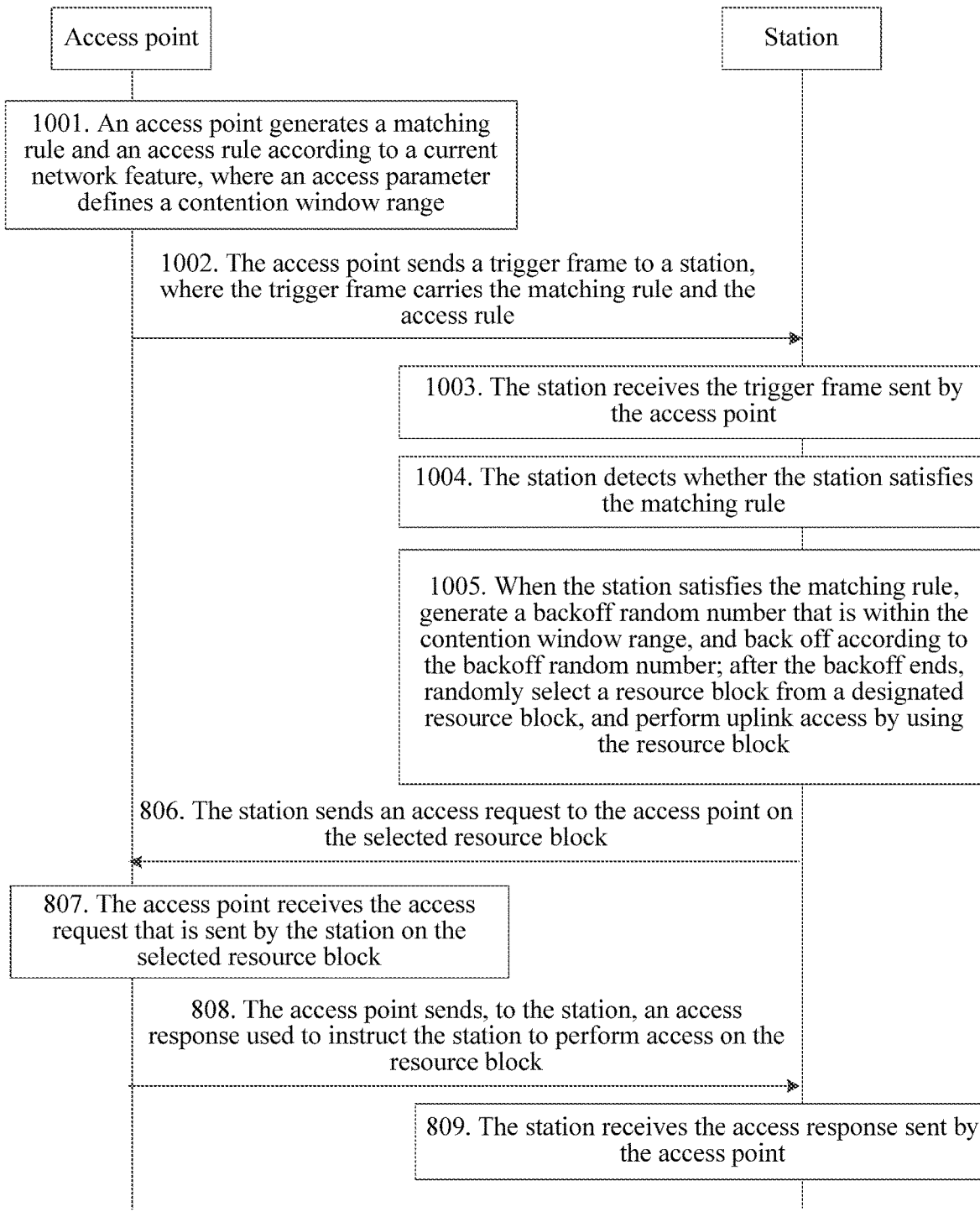
FIG. 10 is a flowchart of a multi-station access method according to still another embodiment of the present disclosure.

As shown in FIG. 10, FIG. 10 is a flowchart of a multi-station access method according to still another embodiment of the present disclosure. The multi-station access method is applied to the network architecture shown in FIG. 1. The multi-station access method includes the following steps.

Step 1001. An access point generates a matching rule and an access rule according to a current network feature, where an access parameter defines a contention window range.

Step 1002. The access point sends a trigger frame to a station, where the trigger frame carries the matching rule and the access rule.

Step 1003. The station receives the trigger frame sent by the access point.

Step 1004. The station detects whether the station satisfies the matching rule.

Step 1002 to step 1004 are similar to step 402 to step 404. For details, refer to descriptions of step 402 to step 404, and details are not described herein again.

When the station satisfies the matching rule, the station may perform uplink access by using the access rule, that is, perform step 1005.

Step 1005. When the station satisfies the matching rule, generate a backoff random number that is within the contention window range, and back off according to the backoff random number; after the backoff ends, randomly select a resource block from a designated resource block, and perform uplink access by using the resource block.

For example, when a size of a contention window CW is 16, a backoff random number within [0, 15] may be generated.

Optionally, when the station performs uplink access by using the access rule, the station may back off according to a pre-agreed protocol by using a backoff random number generated during previous backoff. That is, in another implementation, step 1005 may be replaced with backing off by using the backoff random number generated during previous backoff, and after the backoff ends, randomly selecting a resource block from the designated resource block and performing uplink access by using the resource block.

Optionally, in still another implementation, when the station performs uplink access by using the access rule, step 1005 may be replaced, according to a pre-agreed protocol or rule, with if access fails when a resource block is accessed previously by using the backoff random number generated within the contention window range, increasing the contention window range, generating a backoff random number that is within the increased contention window range, and backing off by using the backoff random number, and when the backoff ends, randomly selecting a resource block from the designated resource block, and performing uplink access by using the resource block.

There may be multiple manners of increasing the contention window range. For example, boundary values of the contention window range may be multiplied with a designated value greater than 1, and two obtained designated values are used as boundary values of the increased contention window range. For example, when the contention window range is [0, 16] and the designated value is 2, the increased contention window range is [0, 32]. The designated value may be 2, 3, or the like. This embodiment does not limit the designated value. In addition, in this embodiment, the contention window range may be increased in another manner. This embodiment does not limit a specific manner of increasing the contention window range.

Optionally, when backoff is performed according to a backoff random number, backoff may be performed in a manner defined in an access manner in the trigger frame. For example, when the access manner defines that the manner is time-frequency two-dimensional backoff, time-frequency two-dimensional backoff may be performed according to the backoff random number.

For a step of performing, after a resource block is selected, uplink access by using the resource block, refer to step 806 to step 809 in FIG. 8A, and details are not described herein again.

In conclusion, in the multi-station access method provided in this embodiment of the present disclosure, a contention window range is limited, so that it is ensured that when a station performs uplink access according to the contention window range, conflicts can be reduced as much as possible.

In addition, the station may perform uplink access by using a previous backoff random number, to reduce a time required for successful access. The station may further adjust the contention window range according to an access status of the station, to adjust the backoff random number, and increase an access success probability.

Figure 11A:
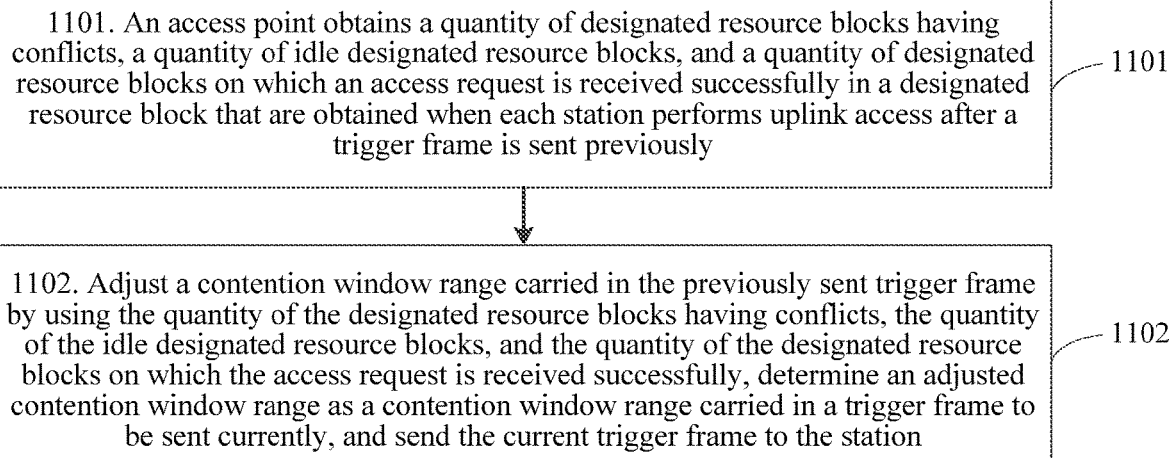
FIG. 11A is a flowchart showing that an access point adjusts a contention window range according to an embodiment of the present disclosure.

In a possible implementation, an access point may adjust a contention window range according to statuses of occupying, by stations, resource blocks after a previous trigger frame, to better adapt to access of the stations, and improve uplink access efficiency of the stations. As shown in FIG. 11A, FIG. 11A is a flowchart showing that an access point adjusts a contention window range according to an embodiment of the present disclosure. When the access point adjusts the contention window range, the following steps may be included.

Step 1101. The access point obtains a quantity of designated resource blocks having conflicts, a quantity of idle designated resource blocks, and a quantity of designated resource blocks on which an access request is received successfully in a designated resource block that are obtained when each station performs uplink access after a trigger frame is sent previously.

In a possible implementation, the obtaining, by the access point, a quantity of designated resource blocks having conflicts, a quantity of idle designated resource blocks, and a quantity of designated resource blocks on which an access request is received successfully in a designated resource block that are obtained when each station performs uplink access after a trigger frame is sent previously may include the following steps.

First, for each designated resource block, detect whether a physical layer using the access point receives, on the designated resource block, a start indication used to indicate that transmission of a payload part in an access request starts.

Second, if the start indication is not received, determine the designated resource block as an idle designated resource block, and add 1 to the quantity of the idle designated resource blocks.

Third, if the start indication is received, detect whether a reception completion indication corresponding to the start indication is received; if the reception completion indication corresponding to the start indication is received, continue to detect whether a payload part in the access request is not received successfully on the designated resource block; and if the payload part in the access request is received successfully on the designated resource block, determine the designated resource block as a designated resource block on which the access request is received successfully, and add 1 to the quantity of the designated resource blocks on which the access request is received successfully; or if the payload part in the access request is not received successfully on the designated resource block, determine the designated resource block as a designated resource block having a conflict, and add 1 to the quantity of the designated resource blocks having conflicts.

Figure 11B:
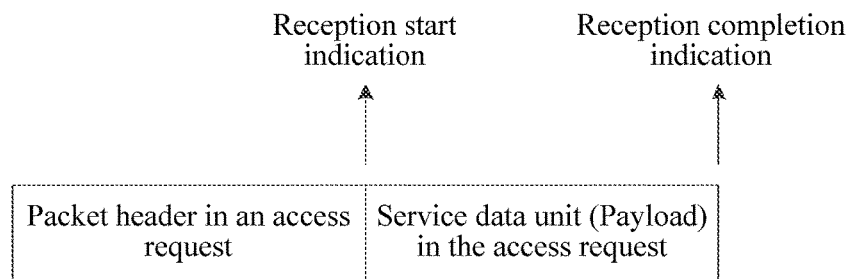
FIG. 11B is a schematic diagram of opportunities of receiving a start indication and a completion indication according to an embodiment of the present disclosure.

For example, as shown in FIG. 11B, FIG. 11B is a schematic diagram of opportunities of receiving a start indication and a completion indication according to an embodiment of the present disclosure. As can be known from FIG. 11B, a data packet corresponding to the access request includes a packet header and a non-packet header part. The non-packet header part is a service data unit part in the access request in FIG. 11B. Generally, the service data unit may be referred to as a payload of the data packet of the access request. When the station sends the access request on a particular designated resource block (a designated sub-channel or a designated time-frequency resource block), when transmission of the payload in the access request starts, the station sends, to the access point, a start indication used to indicate that transmission of the payload part in the access request starts. Correspondingly, the access point may receive the start indication on the physical layer. When the station ends transmission of the access request on the resource block, the station sends, to the access point, a completion indication used to indicate that transmission of the access request ends. That is, the station sends the completion indication corresponding to the start indication to the access point. Correspondingly, the access point may receive the completion indication on the physical layer.

If the access point receives the reception completion indication corresponding to the start indication, the access point continues to detect whether the payload part in the access request is not successfully received on the resource block. When it is detected that the payload part in the access request is not successfully received on the resource block, it may indicate that a packet conflict occurs on the resource block, and the payload part transmitted in the access request cannot be parsed out correctly.

When it is detected that the payload part in the access request is successfully received on the resource block, it may indicate that the resource block is idle or no conflict occurs, and the payload part transmitted in the access request can be parsed out correctly.

Figure 11C:
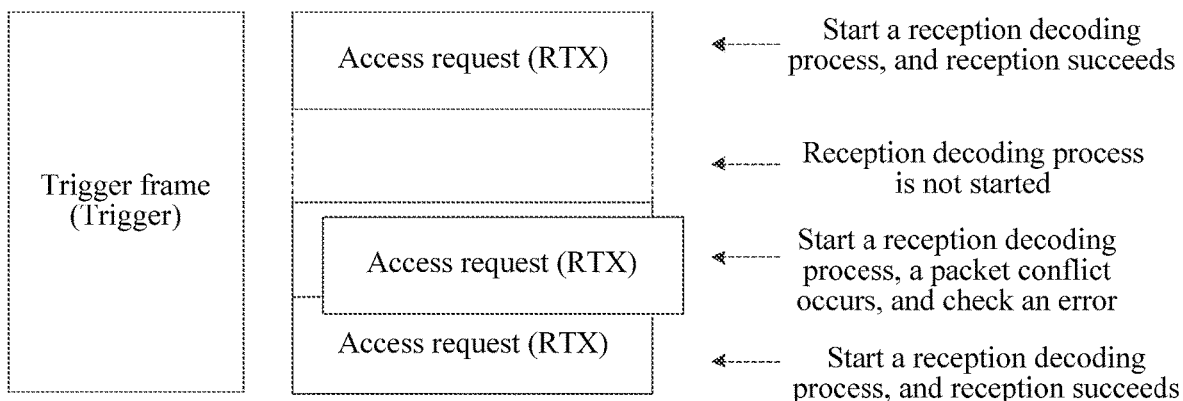
FIG. 11C is a schematic diagram showing that access requests are sent on multiple resource blocks according to an embodiment of the present disclosure.

As shown in FIG. 11C, FIG. 11C is a schematic diagram showing that access requests are sent on multiple resource blocks according to an embodiment of the present disclosure. As shown in FIG. 11C, only one station sends an access request on the resource block at the top, and correspondingly, the access point may receive the access request successfully. As shown in FIG. 11C, at least two stations send access requests simultaneously on the resource block in the middle, and correspondingly, the access point cannot successfully receive the access requests. That is, a packet conflict occurs on the resource block, and the access point checks an error when receiving the access request on the resource block. As shown in FIG. 11C, only one station sends an access request on the resource block at the bottom, and correspondingly, the access point may receive the access request successfully.

The access point may perform conflict control according to a quantity of resource blocks on which packets are successfully received, a quantity of idle resource blocks, and a quantity of resource blocks having conflicts, and then perform step 1102.

Step 1102. Adjust a contention window range carried in the previously sent trigger frame by using the quantity of the designated resource blocks having conflicts, the quantity of the idle designated resource blocks, and the quantity of the designated resource blocks on which the access request is received successfully, determine an adjusted contention window range as a contention window range carried in a trigger frame to be sent currently, and send the current trigger frame to the station.

In a possible implementation, a contention window range CW indicated in a new trigger frame may be determined by using a quantity I of idle designated resource blocks, a quantity S of designated resource blocks on which access requests are successfully received, and a quantity C of designated resource blocks having access conflicts. The new CW may be S+alpha*C. During application, the CW may be S+2C, or may be S+2.39C. Alternatively, another function using I, S, and C as input to optimize access efficiency is used to calculate the CW.

In another possible implementation, if a conflict occurs when the stations perform uplink access after the trigger frame is sent previously, it indicates that a contention window range defined in the previously sent trigger frame is too small. Therefore, the contention window range needs to be increased, for example, a quantity of resource blocks is added to a right boundary value of the original contention window range, and an obtained sum is determined as the right boundary value of the updated contention window range. If no conflict occurs when the stations perform uplink access after the trigger frame is sent previously, the access point subtracts the quantity of the resource blocks from the right boundary value of the contention window range carried in the previously sent trigger frame, and determine an obtained difference as the right boundary value of the updated contention window range. The access point determines the updated contention window range as the access parameter carried in the trigger frame to be sent currently, and sends the current trigger frame to the station.

For example, as shown in FIG. 11D, FIG. 11D is a schematic diagram showing that access is performed each time after a contention window range is adjusted according to an embodiment of the present disclosure. An access parameter in the first trigger frame is a contention window CW=16, and when multiple stations perform access according to the contention window, conflicts occur on the second sub-channel to the fourth sub-channel. In this case, the access point increases the contention window to CW=20, and sends the second trigger frame carrying the contention window to the stations. No conflict occurs when the stations perform access according to the contention window, and no station accesses the second sub-channel and the third sub-channel. In this case, the access point decreases the contention window to CW=16, and sends the third trigger frame carrying the contention window to the stations. The stations perform access on the second sub-channel. In this case, if the access point determines that a largest quantity of times of rounds (that is, a largest quantity of times of sending trigger frames) is reached, the access point sends an acknowledgement response CTX. The accessing stations start to send data data. After receiving the data data, the access point sends, to the stations, a data reception response BAs used to indicate that the data is received.

It should be noted that the resource block herein is one of the designated resource block. That is, the station selects one resource block from the designated resource block during uplink access.

In some embodiments, the access point may adjust the contention window range in another manner. This embodiment does not specifically limit a manner of adjusting, by the access point, the contention window range.

In conclusion, in the multi-station access method provided in this embodiment of the present disclosure, an access point may set, according to a conflict status when stations access a channel historically, a contention window range defined in a next trigger frame, thereby better ensuring access of the stations, and improving the access efficiency.

In a possible implementation, a process in which a station performs uplink access by using an access rule is described by using an example in which an access manner is time-frequency two-dimensional backoff access. In this case, an access point defines in a trigger frame that the access manner is the time-frequency two-dimensionally backoff access, and defines a round marker and a contention window range by using an access parameter.

In a first case, a channel is divided into two sub-channels according to a time domain, the access point provides a sub-channel for a station for access. A multi-station access process is shown in FIG. 12A.

Figure 12A:
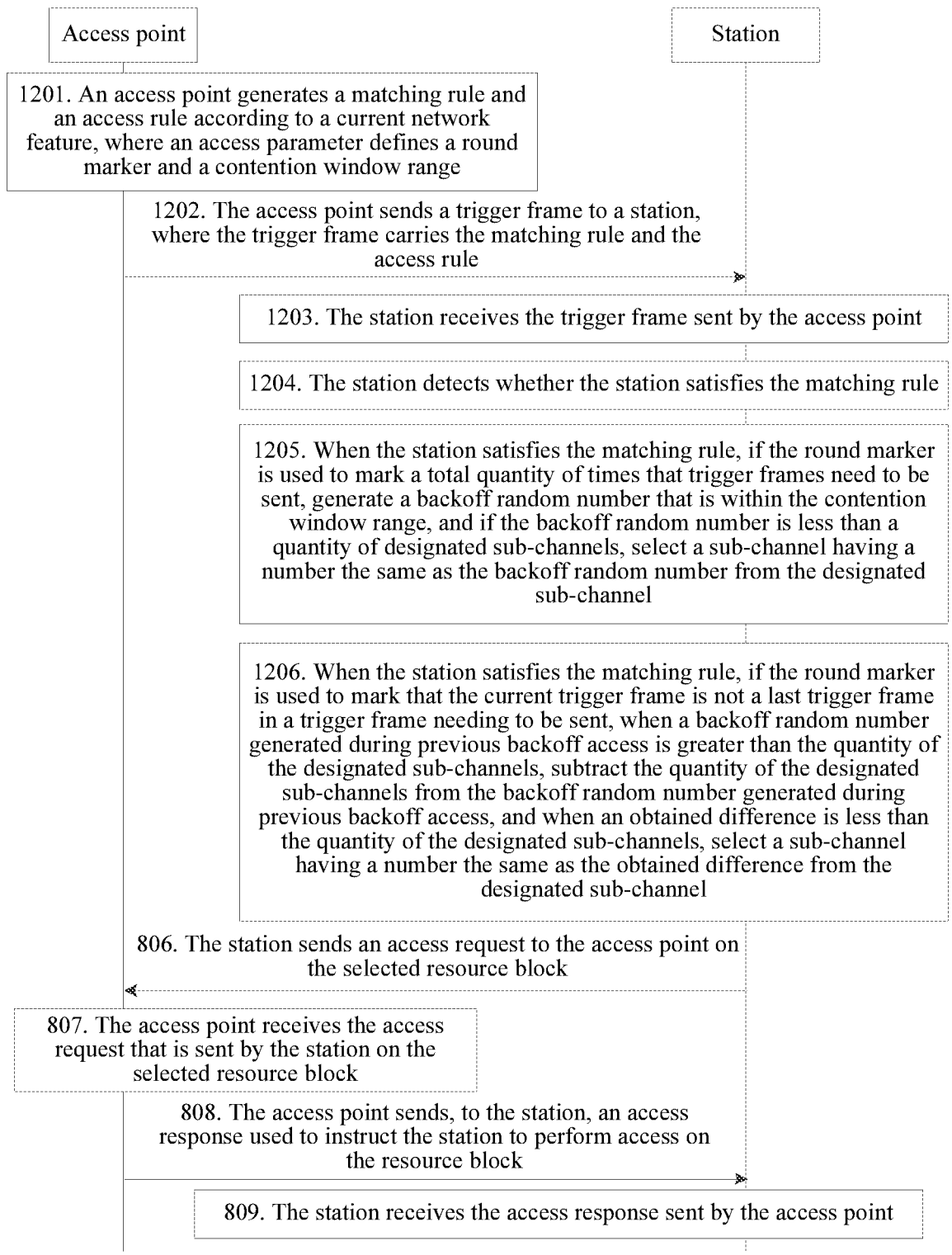
FIG. 12A is a flowchart of a multi-station access method according to still another embodiment of the present disclosure.

As shown in FIG. 12A, FIG. 12A is a flowchart of a multi-station access method according to still another embodiment of the present disclosure. The multi-station access method is applied to the network architecture shown in FIG. 1. The multi-station access method includes the following steps.

Step 1201. The access point generates a matching rule and an access rule according to a current network feature, where an access parameter defines a round marker and a contention window range.

Optionally, the round marker is used to mark a total quantity of times that trigger frames need to be sent, or the round marker is used to mark that a current trigger frame is not a last trigger frame in trigger frames needing to be sent.

It should be noted that the access point defines the round marker to notify the station of whether a trigger frame is to be delivered subsequently when the station receives a trigger frame. If no trigger frame is to be sent subsequently, it indicates that the access point does not allocate a resource block individually, to require multiple stations to perform access at the same time. In this case, the station may select another resource block to perform access.

Step 1202. The access point sends a trigger frame to a station, where the trigger frame carries the matching rule and the access rule.

Step 1203. The station receives the trigger frame sent by the access point.

Step 1204. The station detects whether the station satisfies the matching rule.

Step 1202 to step 1204 are similar to step 402 to step 404. For details, refer to descriptions of step 402 to step 404, and details are not described herein again.

When the station satisfies the matching rule, the station may perform uplink access according to the access rule. For details, refer to step 1205 and step 1206.

Step 1205. When the station satisfies the matching rule, if the round marker is used to mark a total quantity of times that trigger frames need to be sent, generate a backoff random number that is within the contention window range, and if the backoff random number is less than a quantity of designated sub-channels, select a sub-channel having a number the same as the backoff random number from the designated sub-channel.

Step 1206. When the station satisfies the matching rule, if the round marker is used to mark that the current trigger frame is not a last trigger frame in a trigger frame needing to be sent, when a backoff random number generated during previous backoff access is greater than the quantity of the designated sub-channels, subtract the quantity of the designated sub-channels from the backoff random number generated during previous backoff access, and when an obtained difference is less than the quantity of the designated sub-channels, select a sub-channel having a number the same as the obtained difference from the designated sub-channel.

The designated sub-channel is a sub-channel that is provided by the access point for the station for access. After the quantity of the designated sub-channels is subtracted from the backoff random number generated during previous backoff access, the backoff random number is updated with a difference of subtracting the quantity of the designated sub-channels from the backoff random number, and it is determined whether the updated backoff random number is less than the quantity of the designated sub-channels. When the updated backoff random number is less than the quantity of the designated sub-channels, a sub-channel having a number the same as the updated backoff random number is selected from the designated sub-channel.

Optionally, the station may not use the backoff random number obtained previously, but re-generate a backoff random number by using the contention window range, and perform backoff access by using the re-generated backoff random number. That is, the station generates a backoff random number that is within the contention window range, and if the backoff random number is less than the quantity of the designated sub-channels, selects a sub-channel having a number the same as the backoff random number from the designated sub-channel, or if the backoff random number is greater than the quantity of the designated sub-channels, subtracts the quantity of the designated sub-channels from the backoff random number, and when an obtained difference is less than the quantity of the designated sub-channels, selects a sub-channel having a number the same as the obtained difference from the designated sub-channel.

For a step of performing, after a sub-channel is selected, uplink access by using the sub-channel, refer to step 806 to step 809 in FIG. 8A, and details are not described herein again.

For example, as shown in FIG. 12B, FIG. 12B is a schematic diagram showing that access is performed according to a backoff random number according to an embodiment of the present disclosure. A time-frequency two-dimensional backoff process is described by using an example in which a quantity of rounds is 3 and a backoff random number is 9. After the first trigger frame, the quantity of the designated sub-channels is subtracted from the backoff random number, to obtain a difference 5. After the second trigger frame, the quantity of the designated sub-channels is subtracted from the backoff random number, to obtain a difference 1. After the third trigger frame, subtraction is performed to obtain a difference 0, then, an access request RTX is sent on the channel. After the access point determines that a largest quantity of rounds is reached, the access point sends an acknowledgement response CTX to the station, and the accessing station performs uplink data transmission. Numbers of the four sub-channels respectively are 0, 1, 2, and 3 from top to bottom.

In conclusion, in the multi-station access method provided in this embodiment of the present disclosure, an access point obtains a current network feature and generates a matching rule and an access rule, so that a station performs uplink access according to the matching rule and the access rule. Because the access point may generate the matching rule and the access rule according to the current network feature, an accessing station and an access manner can be controlled flexibly. This resolves a prior-art problem of reduced quality of service of a high-priority service because in an EDCA protocol, when there are relatively many low-priority service nodes, the high-priority service has difficulty in obtaining a resource through contention, or a conflict occurs between a low-priority packet and a high-priority packet. Effects of ensuring quality of service and user experience are achieved.

In a second case, a channel is divided into time-frequency resource blocks according to a time domain and a frequency domain, an access point provides a time-frequency resource block for a station for access. A multi-station access process is shown in FIG. 13A.

Figure 13A:
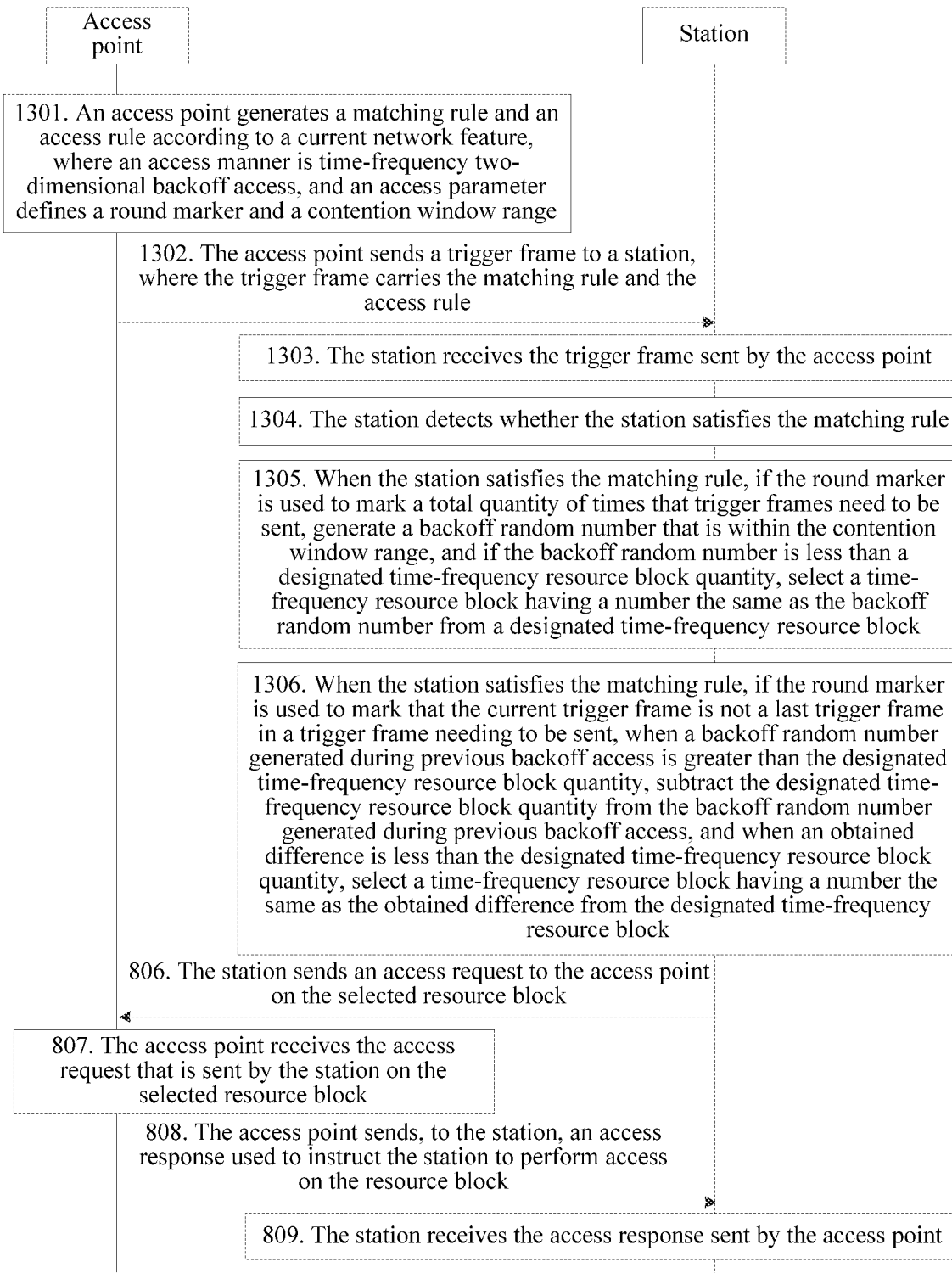
FIG. 13A is a flowchart of a multi-station access method according to still another embodiment of the present disclosure.

As shown in FIG. 13A, FIG. 13A is a flowchart of a multi-station access method according to still another embodiment of the present disclosure. The multi-station access method is applied to the network architecture shown in FIG. 1. The multi-station access method includes the following steps.

Step 1301. The access point generates a matching rule and an access rule according to a current network feature, where an access manner is time-frequency two-dimensional backoff access, and an access parameter defines a round marker and a contention window range.

It should be noted that the access point defines a quantity of rounds to notify the station of whether a trigger frame is to be delivered subsequently when the station receives a trigger frame. If no trigger frame is to be sent subsequently, it indicates that the access point does not allocate a resource block individually, to require multiple stations to perform access at the same time. In this case, the station may select another resource block to perform access.

Step 1302. The access point sends a trigger frame to a station, where the trigger frame carries the matching rule and the access rule.

Step 1303. The station receives the trigger frame sent by the access point.

Step 1304. The station detects whether the station satisfies the matching rule.

Step 1302 to step 1304 are similar to step 402 to step 404. For details, refer to descriptions of step 402 to step 404, and details are not described herein again.

When the station satisfies the matching rule, the station may perform uplink access according to the access rule. For details, refer to step 1305 and step 1306.

Step 1305. When the station satisfies the matching rule, if the round marker is used to mark a total quantity of times that trigger frames need to be sent, generate a backoff random number that is within the contention window range, and if the backoff random number is less than a designated time-frequency resource block quantity, select a time-frequency resource block having a number the same as the backoff random number from a designated time-frequency resource block.

Optionally, the designated time-frequency resource block is a time-frequency resource block provided by the access point for the station for access, the designated time-frequency resource block quantity is a quantity of designated time-frequency resource blocks, and the time-frequency resource block quantity may be carried in the trigger frame, and is notified to the station. Optionally, the time-frequency resource block indicated by the access point for random access may be all or a part of the time-frequency resource block.

Step 1306. When the station satisfies the matching rule, if the round marker is used to mark that the current trigger frame is not a last trigger frame in a trigger frame needing to be sent, when a backoff random number generated during previous backoff access is greater than the designated time-frequency resource block quantity, subtract the designated time-frequency resource block quantity from the backoff random number generated during previous backoff access, and when an obtained difference is less than the designated time-frequency resource block quantity, select a time-frequency resource block having a number the same as the obtained difference from the designated time-frequency resource block.

After the designated time-frequency resource block quantity is subtracted from the backoff random number generated during previous backoff access, the backoff random number is updated with a difference of subtracting the designated time-frequency resource block quantity from the backoff random number, and it is determined whether the updated backoff random number is less than the designated time-frequency resource block quantity. When the updated backoff random number is less than the designated time-frequency resource block quantity, a time-frequency resource block having a number the same as the updated backoff random number is selected from the designated time-frequency resource block.

Optionally, the station may not use the backoff random number obtained previously, but re-generate a backoff random number by using the contention window range, and perform backoff access by using the re-generated backoff random number. That is, the station generates a backoff random number that is within the contention window range, and if the backoff random number is less than the designated time-frequency resource block quantity, selects a time-frequency resource block having a number the same as the backoff random number from the designated time-frequency resource block, or if the backoff random number is greater than the designated time-frequency resource block quantity, subtracts the designated time-frequency resource block quantity from the backoff random number, and when an obtained difference is less than the designated time-frequency resource block quantity, selects a time-frequency resource block having a number the same as the obtained difference from the designated time-frequency resource block.

A difference between step 1305/step 1306 and step 1205/step 1206 lies in the sub-channel in step 1205 and step 1206 is replaced with the time-frequency resource block.

For a step of performing, after a resource block is selected, uplink access by using the resource block, refer to step 806 to step 809 in FIG. 8A, and details are not described herein again.

For example, as shown in FIG. 13B, FIG. 13B is a schematic diagram showing that access is performed according to a backoff random number according to another embodiment of the present disclosure. A time-frequency two-dimensional backoff process is described by using an example in which a quantity of times that trigger frames need to be sent is 3 and a backoff random number is 19. After the first trigger frame, a time-frequency resource block quantity 8 is subtracted from the backoff random number 19, and an obtained difference is 11. After the second trigger frame, the time-frequency resource block quantity 8 is subtracted from the backoff random number 11, and an obtained difference is 3, and the station performs uplink access on a time-frequency resource block numbered 3. After the access point determines that the total quantity 3 of times is reached, the access point sends an acknowledgement response CTX to the station, and the accessing station performs uplink data transmission. Numbers of the time-frequency resource blocks in the first row respectively are 0, 1, 2, and 3, and numbers of the time-frequency resource blocks in the second row adjacent to the first row respectively are 4, 5, 6, and 7. In some embodiments, the time-frequency resource blocks may be numbered according to another sequence. A sequence of numbers should not be used to limit the protection scope of the present disclosure.

Optionally, a guard interval may be set between two neighboring time-frequency resource blocks in a same frequency domain. That is, after a first station performs uplink access on a first time-frequency resource block, the second stations needs to perform uplink access in the same frequency domain of the first time-frequency resource block and on the second time-frequency resource block adjacent to the first time-frequency resource block after the guard interval.

In conclusion, in the multi-station access method provided in this embodiment of the present disclosure, an access point obtains a current network feature and generates a matching rule and an access rule, so that a station performs uplink access according to the matching rule and the access rule. Because the access point may generate the matching rule and the access rule according to the current network feature, an accessing station and an access manner can be controlled flexibly. This resolves a prior-art problem of reduced quality of service of a high-priority service because in an EDCA protocol, when there are relatively many low-priority service nodes, the high-priority service has difficulty in obtaining a resource through contention, or a conflict occurs between a low-priority packet and a high-priority packet. Effects of ensuring quality of service and user experience are achieved.

In a possible implementation, to avoid a case of conflicts during access caused by a fact that multiple stations all back off successfully or all succeed in contention, the access rule further is time-frequency two-dimensional backoff access with a listening capability, and an access point requires a station to listen to a channel access status at a first time period and a second time period in duration used to send an access request. The first time period corresponds to duration used to send a packet header in a data packet corresponding to the access request, and the second time period corresponds to duration used to send non-packet header content in the data packet corresponding to the access request. In this case, when a station performs uplink access, the station needs to listen to whether another station is transmitting a signal on a resource block. For details, refer to FIG. 14A.

Figure 14A:
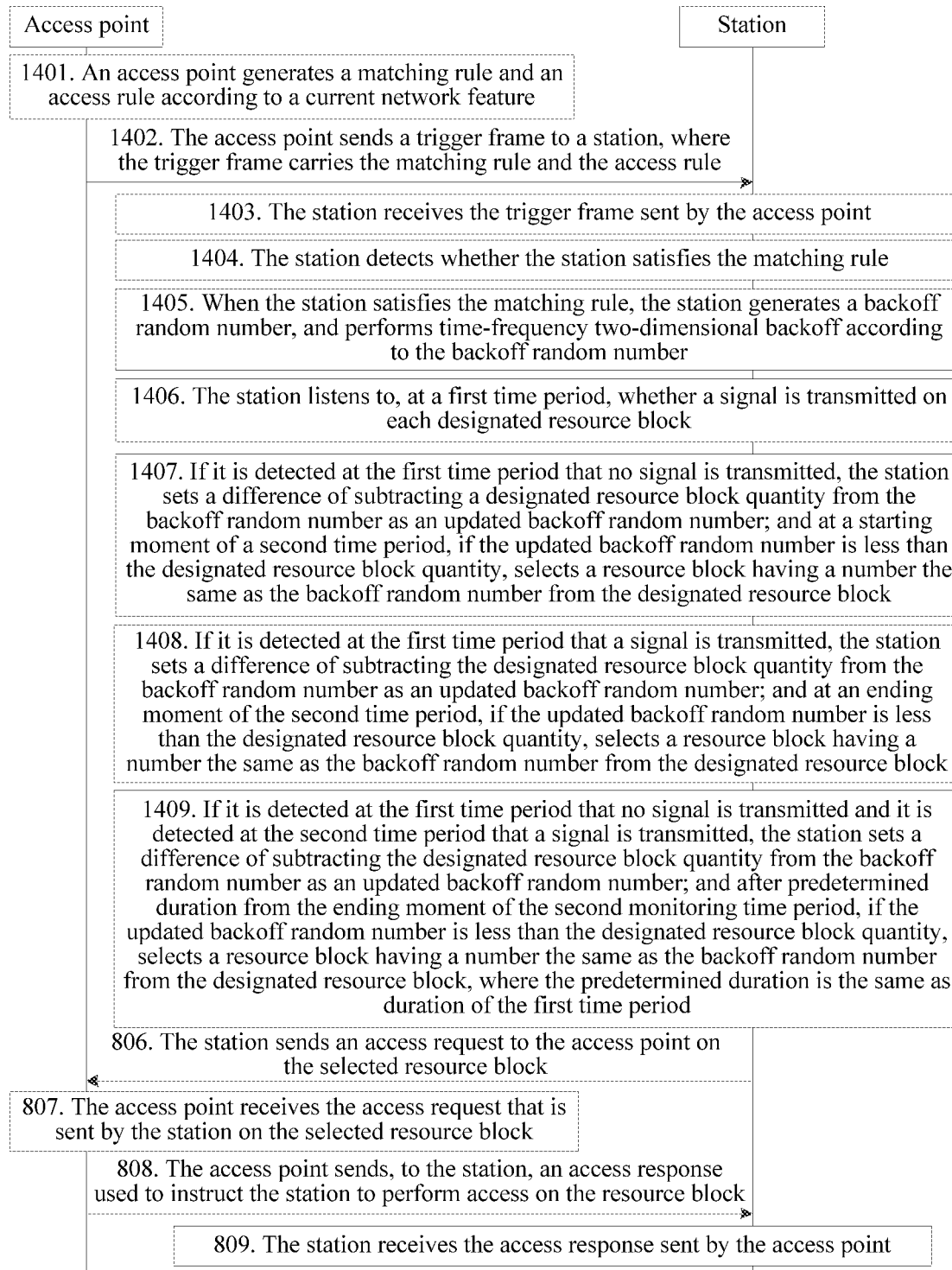
FIG. 14A is a flowchart of a multi-station access method according to still another embodiment of the present disclosure.

As shown in FIG. 14A, FIG. 14A is a flowchart of a multi-station access method according to still another embodiment of the present disclosure. The multi-station access method is applied to the network architecture shown in FIG. 1. The multi-station access method includes the following steps.

Step 1401. An access point generates a matching rule and an access rule according to a current network feature.

Step 1402. The access point sends a trigger frame to a station, where the trigger frame carries the matching rule and the access rule.

Step 1403. The station receives the trigger frame sent by the access point.

Step 1404. The station detects whether the station satisfies the matching rule.

Step 1402 to step 1404 are similar to step 402 to step 404. For details, refer to descriptions of step 402 to step 404, and details are not described herein again.

When the station satisfies the matching rule, the station may perform uplink access according to the access rule. For details, refer to step 1405 to step 1409.

Step 1405. When the station satisfies the matching rule, the station generates a backoff random number, and performs time-frequency two-dimensional backoff according to the backoff random number.

Step 1406. The station listens to, at a first time period, whether a signal is transmitted on each designated resource block.

Step 1407. If it is detected at the first time period that no signal is transmitted, the station sets a difference of subtracting a designated resource block quantity from the backoff random number as an updated backoff random number; and at a starting moment of a second time period, if the updated backoff random number is less than the designated resource block quantity, selects a resource block having a number the same as the backoff random number from the designated resource block.

Figure 14B:
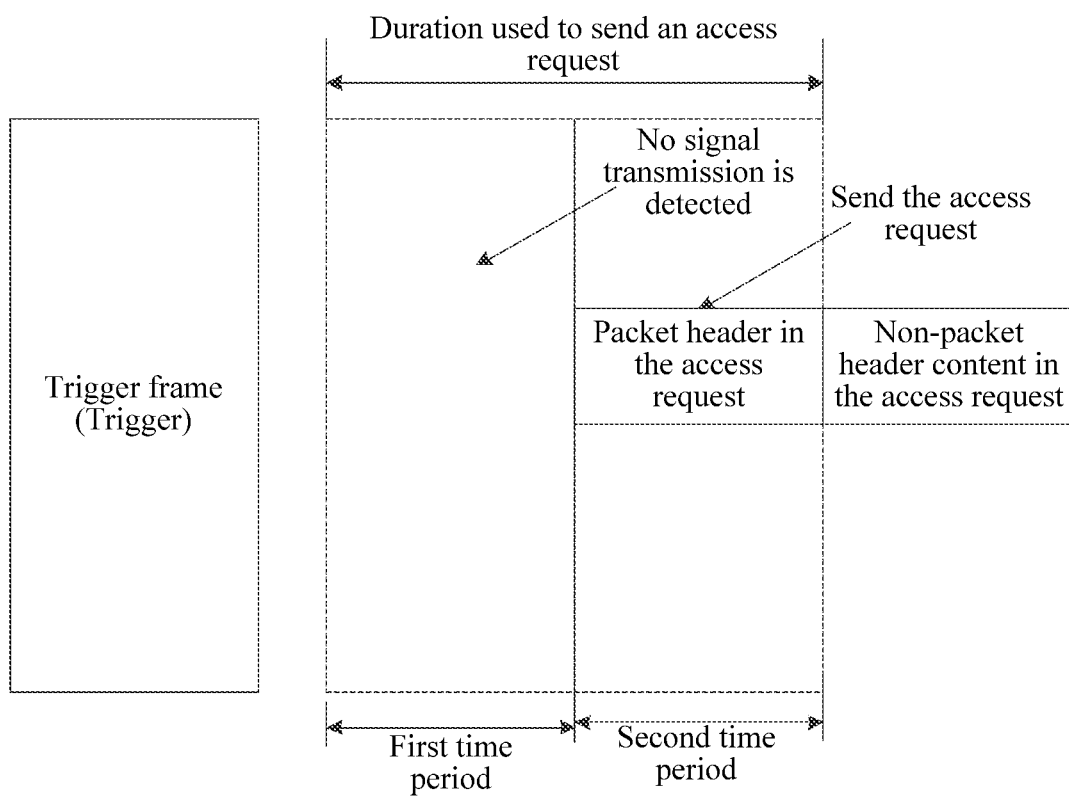
FIG. 14B is a schematic diagram showing that a station performs time-frequency two-dimensional backoff access when having a listening capability according to an embodiment of the present disclosure.

As shown in FIG. 14B, FIG. 14B is a schematic diagram showing that a station performs time-frequency two-dimensional backoff access when having a listening capability according to an embodiment of the present disclosure. If the station detects at the first time period that no signal is transmitted, it indicates that no station performs access at the first time period. In this case, in order that the detection station performs access as soon as possible, the designated resource block quantity may be subtracted from the backoff random number of the station. At the starting moment of the second time period, if the updated backoff random number is less than the designated resource block quantity, it indicates that the station may perform access directly. In this case, a resource block having a number the same as the backoff random number is selected from the designated resource block, and uplink access is performed by using the resource block.

Optionally, the designated resource block quantity is a quantity of resource blocks that are indicated by the access point for random access. The designated resource block quantity may be carried in the trigger frame, and is notified to the station. Optionally, the designated resource block indicated by the access point for random access may be all or a part of the resource block.

Step 1408. If it is detected at the first time period that a signal is transmitted, the station sets a difference of subtracting a quantity of the designated resource block from the backoff random number as an updated backoff random number; and at an ending moment of the second time period, if the updated backoff random number is less than the designated resource block quantity, selects a resource block having a number the same as the backoff random number from the designated resource block.

Figure 14C:
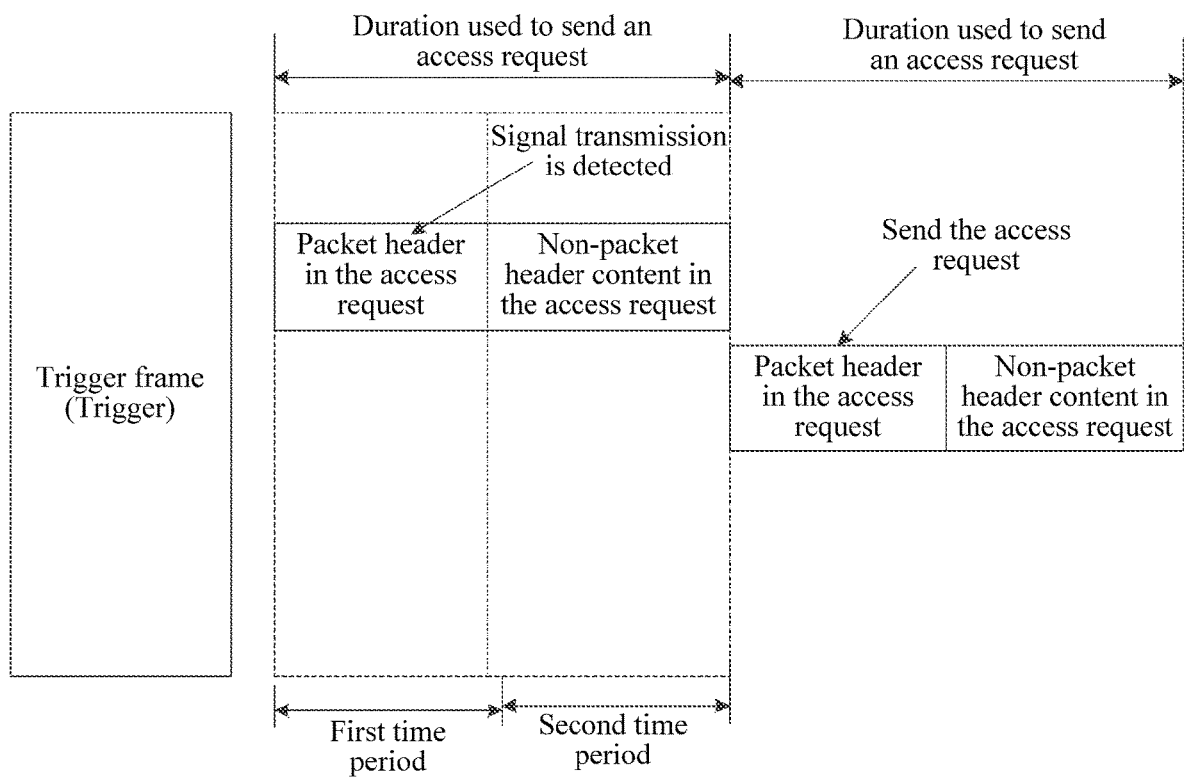
FIG. 14C is a schematic diagram showing that a station performs time-frequency two-dimensional backoff access when having a listening capability according to another embodiment of the present disclosure.

As shown in FIG. 14C, FIG. 14C is a schematic diagram showing that a station performs time-frequency two-dimensional backoff access when having a listening capability according to another embodiment of the present disclosure. If the station detects at the first time period that a signal is transmitted, it indicates that a station performs access at the first time period. In this case, in order that the detection station performs access as soon as possible, the designated resource block quantity may be subtracted from the backoff random number of the station. To avoid conflicts, the station cannot perform access before the detected signal is transmitted completely. Therefore, the station at least needs to wait until the ending moment of the second time period, and if the updated backoff random number is less than the designated resource block, it indicates that the station can perform access directly. In this case, the station selects a resource block having a number the same as the backoff random number from the designated resource block, and performs uplink access on the resource block.

Step 1409. If it is detected at the first time period that no signal is transmitted and it is detected at the second time period that a signal is transmitted, the station sets a difference of subtracting a quantity of the designated resource block from the backoff random number as an updated backoff random number; and after predetermined duration from an ending moment of the second time period, if the updated backoff random number is less than the designated resource block quantity, selects a resource block having a number the same as the backoff random number from the designated resource block, where the predetermined duration is the same as duration of the first time period.

Figure 14D:
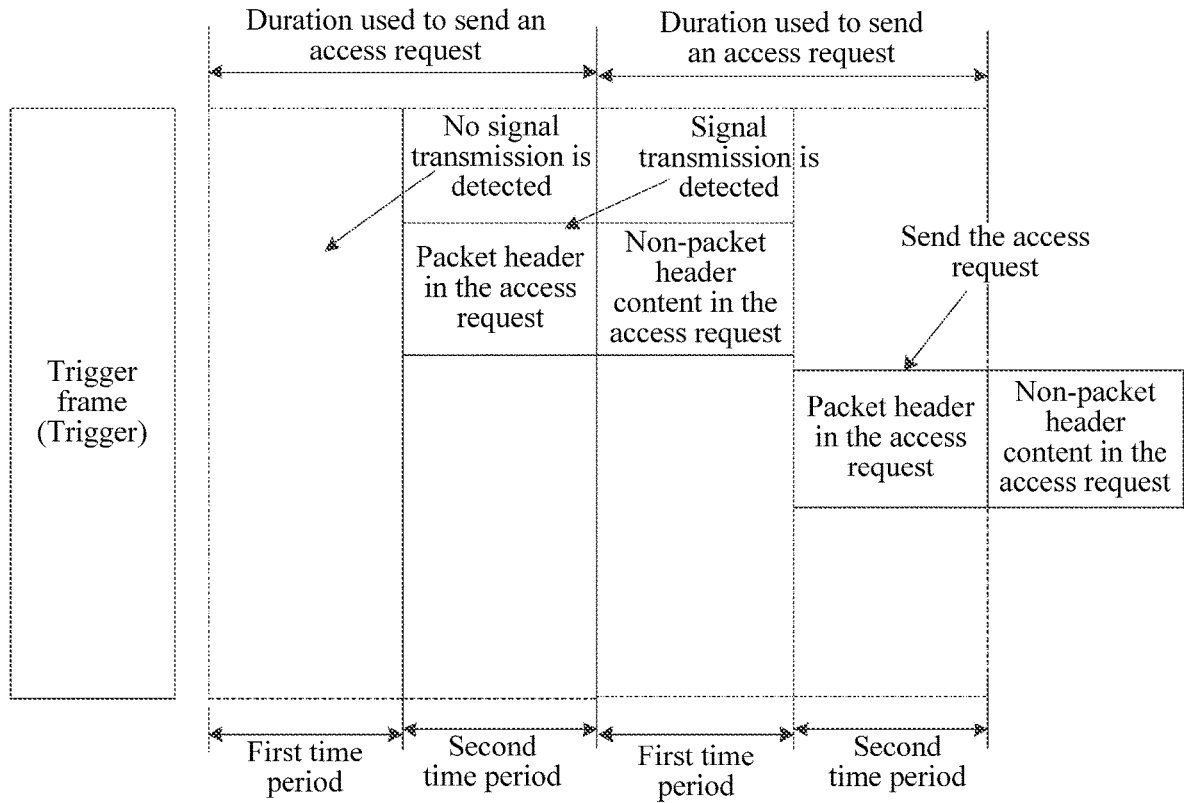
FIG. 14D is a schematic diagram showing that a station performs time-frequency two-dimensional backoff access when having a listening capability according to still another embodiment of the present disclosure.

As shown in FIG. 14D, FIG. 14D is a schematic diagram showing that a station performs time-frequency two-dimensional backoff access when having a listening capability according to still another embodiment of the present disclosure. If the station detects, at the first time period, that no signal is transmitted, and detects, at the second time period, that a signal is transmitted, it indicates that no station performs access at the first time period and a station performs access at the second time period. In this case, in order that the detection station performs access as soon as possible, the designated resource block quantity may be subtracted from the backoff random number of the station. To avoid conflicts, the station cannot perform access before the detected signal is transmitted completely. Therefore, the station at least needs to wait until the predetermined duration after the ending moment of the second time period, and the predetermined duration is the same as the duration of the first time period. If the updated backoff random number is less than the designated resource block quantity in this case, it indicates that the station can perform access directly. In this case, the station selects a resource block having a number the same as the backoff random number the designated resource block, and performs uplink access by using the resource block.

For a step of performing, after a resource block is selected, uplink access by using the resource block, refer to step 806 to step 809 in FIG. 8A, and details are not described herein again.

Optionally, listening content when the access point requires the station to listen to a channel access status at the first time period and the second time period in the duration used to send the access request may be pre-agreed between the access point and the station according to a protocol, or may be defined by the access point in the trigger frame.

In conclusion, in the multi-station access method provided in this embodiment of the present disclosure, an access point obtains a current network feature and generates a matching rule and an access rule, so that a station performs uplink access according to the matching rule and the access rule. Because the access point may generate the matching rule and the access rule according to the current network feature and a service feature, an accessing station and an access manner can be controlled flexibly. This resolves a prior-art problem of reduced quality of service of a high-priority service because in an EDCA protocol, when there are relatively many low-priority service nodes, the high-priority service has difficulty in obtaining a resource through contention, or a conflict occurs between a low-priority packet and a high-priority packet. Effects of ensuring quality of service and user experience are achieved.

In a possible implementation, in order that an access point allocates a suitable resource to the station, the access point may further request to obtain a bandwidth requirement of each station for a service priority. In this case, when the access point sets a matching rule in a trigger frame, the matching rule may define a designated service priority for which a bandwidth requirement needs to be reported. Correspondingly, after the station successfully obtains a resource block for access, when the station sends an access request to the station on the selected resource block, at least the following several cases may be included.

In a first case, when a service priority of data needing to be sent by a station includes the designated service priority, a bandwidth requirement of the designated service priority in the station is obtained, and the bandwidth requirement is added to an access request. Then, the station sends the access request to the access point on a selected resource block. The designated service priority is at least one designated service priority.

Figure 15A:
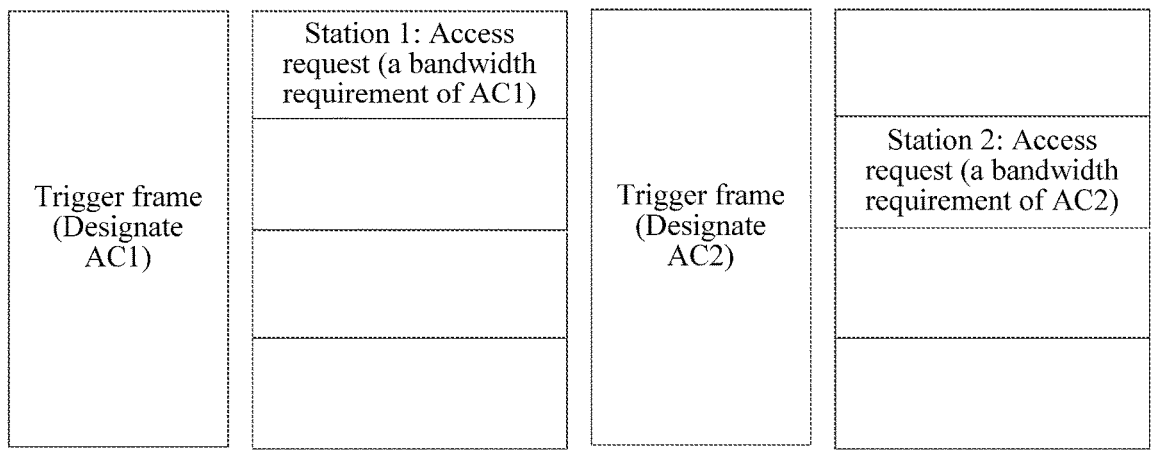
FIG. 15A to FIG. 15E are schematic diagrams of obtaining a bandwidth requirement of a designated service priority according to some embodiments of the present disclosure.

When the access point designates one designated service priority, as shown in FIG. 15A, when the first trigger frame defines that the station needs to feed back a bandwidth requirement of a service priority AC1, an access request sent by a station 1 having the service priority AC1 to the access point carries a bandwidth requirement of the station 1 for the service priority AC1. When the second trigger frame defines that the station needs to feed back a bandwidth requirement of a service priority AC2, an access request sent by a station 2 having the service priority AC2 carries a bandwidth requirement of the station 2 for the service priority AC2.

Figure 15B:
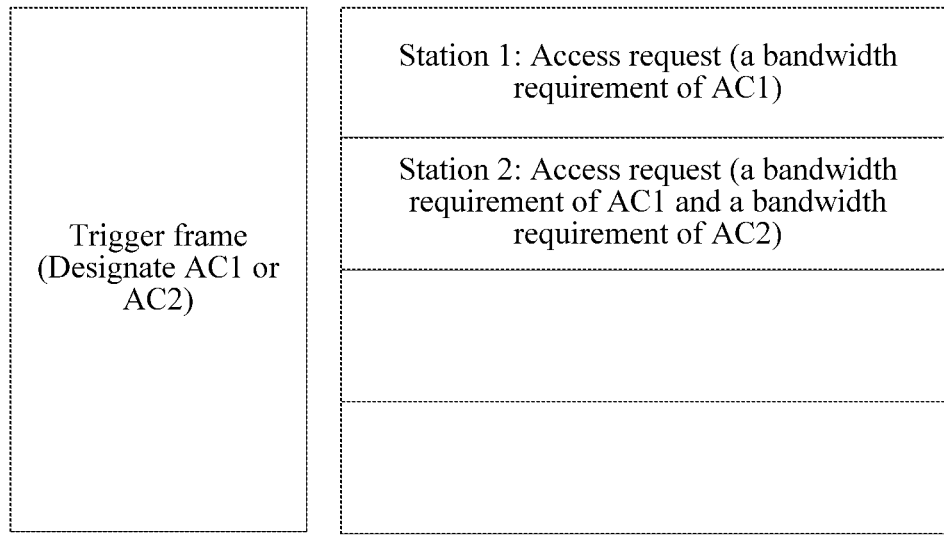

When the access point designates two designated service priorities, as shown in FIG. 15B, when a trigger frame defines that a station needs to feed back a bandwidth requirement of a service priority AC1 or AC2, an access request sent by a station 1 having the service priority AC1 to the access point carries a bandwidth requirement of the station for the service priority AC1, and an access request sent by a station 2 having the service priorities AC1 and AC2 carries bandwidth requirements of the station for the service priorities AC1 and AC2.

In a second case, when a service priority of data needing to be sent by a station includes the designated service priority, a bandwidth requirement of each service priority greater than or equal to the designated service priority in the station is obtained, and the bandwidth requirement of the service priority is added to an access request. Then, the station sends the access request to the access point on a selected resource block.

Figure 15C:
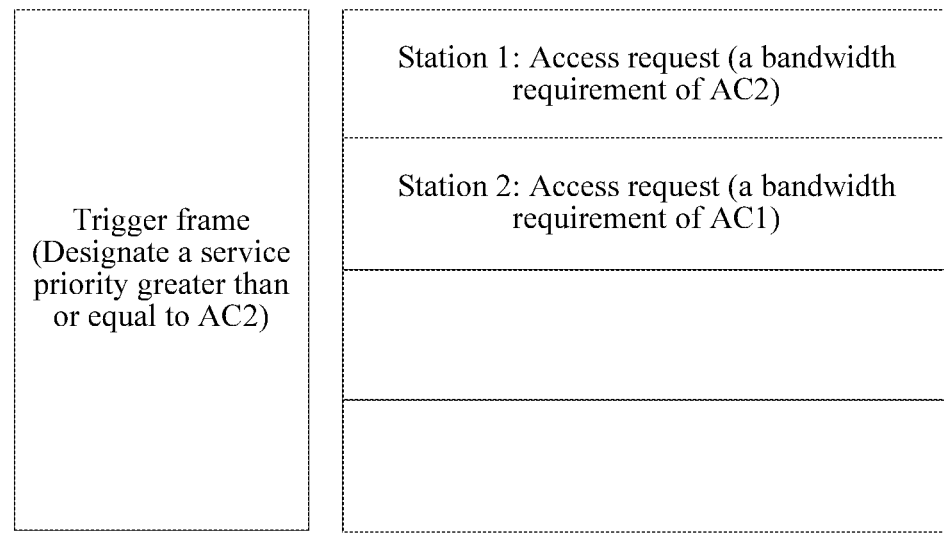

As shown in FIG. 15C, when a trigger frame defines that a service priority for which a station needs to feed back a bandwidth requirement is greater than or equal to AC2, an access request sent by a station 1 having the service priority AC2 to the access point carries the bandwidth requirement of the station for the service priority AC2, and an access request sent by a station 2 having a service priority AC1 (greater than the service priority AC2) carries a bandwidth requirement of the station for the service priority AC1.

In a third case, when a service priority of data needing to be sent by a station includes the designated service priority, a bandwidth requirement of each service priority in the station is obtained, and the bandwidth requirement of each service priority is added to an access request. Then, the station sends the access request to the access point on a selected resource block.

Figure 15D:
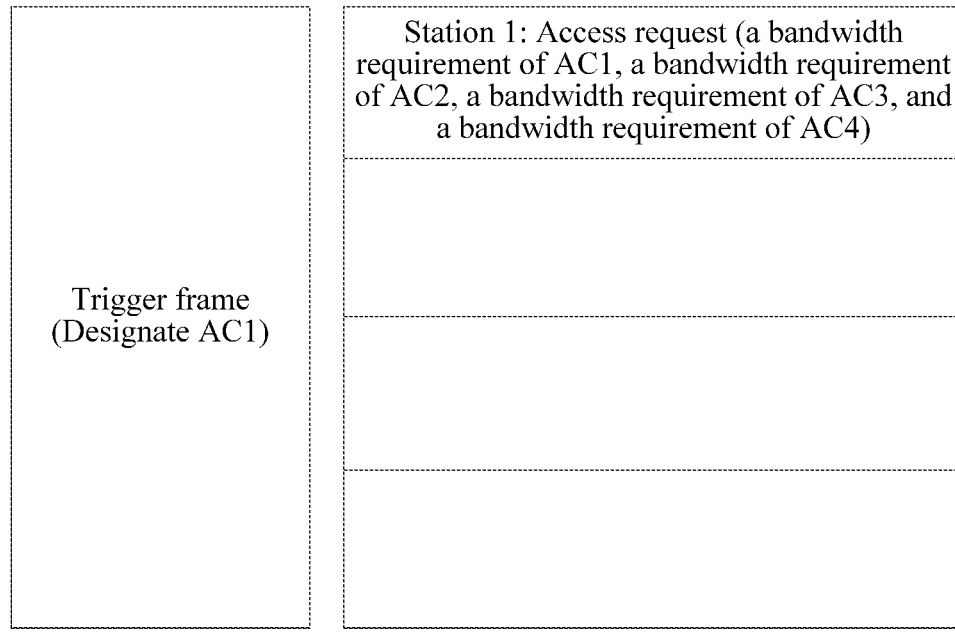

As shown in FIG. 15D, when a trigger frame defines that a station needs to feed back a bandwidth requirement of a service priority AC1, an access request send by a station having the service priority AC1 to the access point carries a bandwidth requirement of the station for the service priority AC1. In addition, if the station further has a service of another service priority, the station may report a bandwidth requirement of the another service priority. For example, when reporting the bandwidth requirement of the service priority AC1, a station 1 also reports bandwidth requirements of service priorities AC2, AC3, and AC4.

In a fourth case, a total bandwidth requirement of service priorities in a station is obtained, and the total bandwidth requirement is added to an access request. Then, the station sends the access request to the access point on a selected resource block. The designated service priority is at least one designated service priority.

Figure 15E:
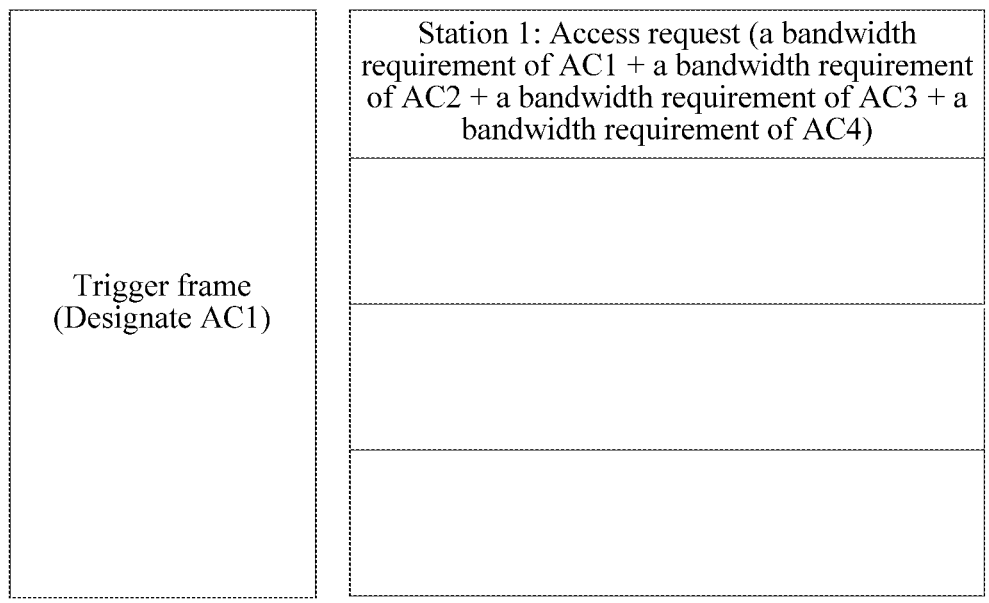

As shown in FIG. 15E, when a trigger frame defines that a station needs to feed back a bandwidth requirement of a service priority AC1, an access request sent by a station having the service priority AC1 to the access point carries a total bandwidth requirement of the station for all service priorities. For example, the station 1 reports a total bandwidth requirement of service priorities AC1, AC2, AC3, and AC4.

In a fifth case, when a service priority of data needing to be sent by a station includes a designated service priority, a bandwidth requirement of the designated service priority in the station is obtained, a total bandwidth requirement of other service priorities in the station is obtained, and the bandwidth requirement of the designated service priority and the total bandwidth requirement of the other service priorities are added to an access request. Then, the station sends the access request to the access point on a selected resource block.

When the access point receives the bandwidth requirements, fed back by the stations during access, for the service priorities, the access point may allocate corresponding resources to the stations appropriately.

In a possible implementation, an access point may designate a resource block for a service priority of a station. In this case, when the access point sets a matching rule in a trigger frame, the matching rule may define a designated service priority for which a bandwidth requirement needs to be reported, and an access parameter defines at least one resource block provided for a station having the designated service priority for access. That is, for any designated service priority for which a bandwidth requirement needs to be reported, a resource block allocated to a station having the designated service priority during access may be at least one resource block designated by the access point from a provided accessible resource block.

For example, the access point defines in the trigger frame that a station needs to report a bandwidth requirement of a video service, and the station having the bandwidth requirement of the video service may perform access on a resource block 1 and a resource block 2. Correspondingly, if a station has a video service, when selecting a resource block according to an access rule to send an access request, the station needs to send the access request on the resource block 1 or the resource block 2, and the access request carries the bandwidth requirement of the video service.

Figure 16:
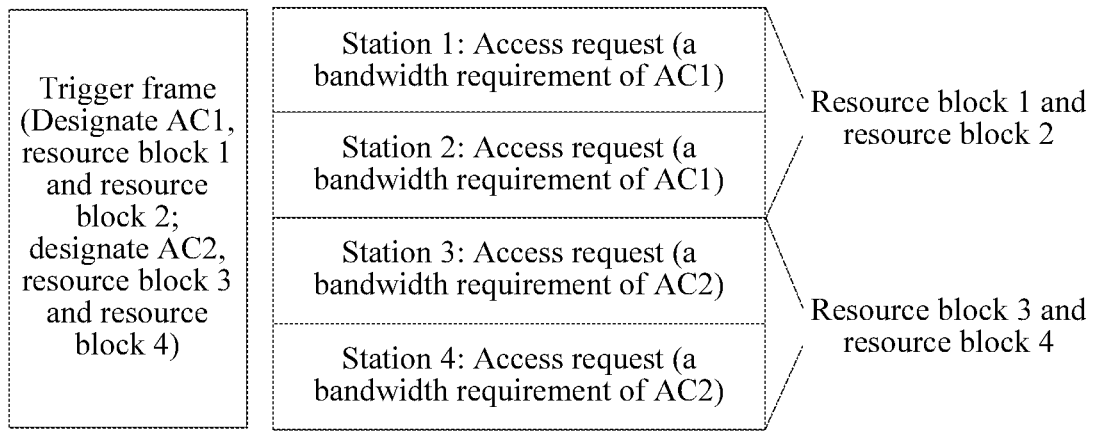
FIG. 16 is a schematic diagram of obtaining a bandwidth requirement of a designated service priority according to some other embodiments of the present disclosure.

As shown in FIG. 16, when the trigger frame defines that a station needs to feed back a bandwidth requirement of a service priority AC1, and further defines that a resource block on which a station having the service priority AC1 performs access is one of the resource block 1 or the resource block 2. In addition, the trigger frame further defines that a station needs to feed back a bandwidth requirement of a service priority AC2, and further defines that a resource block on which a station having the service priority AC2 performs access is one of a resource block 3 or a resource block 4. A station 1 and a station 2 that have the service priority AC1 perform access on the resource block 1 and the resource block 2 respectively, and a station 3 and a station 4 that have the service priority AC2 performs access on the resource block 3 and the resource block 4 respectively.

In an optional implementation, when a resource block is not selected successfully during backoff access and a backoff random number obtained during current backoff is used as a backoff random number for next backoff access, if access fails after a trigger frame is received, to reduce an access delay as much as possible, a station that fails to access and whose backoff random number is not 0 after backoff may subtract a designated value from the backoff random number after detecting an access request. When an access manner is time-frequency backoff access, the designated value is 1, and when the access manner is time-frequency two-dimensional backoff access, the designated value is a quantity of designated resource blocks. In this way, backoff random numbers of some stations may be 0 after subtraction. When receiving a trigger frame next time, a station whose backoff random number is 0 after subtraction may directly perform access according to the backoff random number of 0, and does not need to wait or back off.

Figure 17:
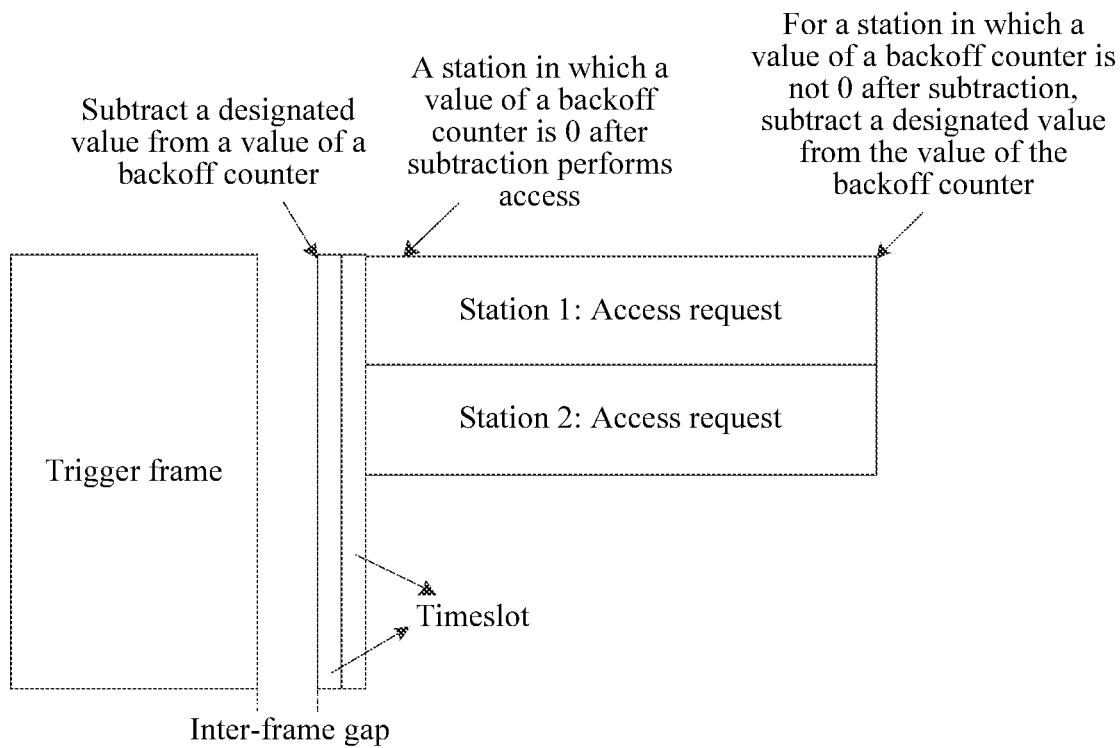
FIG. 17 is a schematic diagram showing that a station succeeding in access backs off in advance according to an embodiment of the present disclosure.

As shown in FIG. 17, FIG. 17 is a schematic diagram showing that a station succeeding in access backs off in advance according to an embodiment of the present disclosure. After the first trigger frame, the station 1 and the station 2 perform access successfully, and when detecting access requests sent by the station 1 and the station 2, another station may subtract a designated value from a backoff random number of the station.

It should also be noted that except solutions that can be implemented in parallel, solutions in the foregoing embodiments may be combined and implemented as different embodiments. For example, when an access manner pre-agreed between the access point and the station is P-probability access, the access point may require the station to report a bandwidth requirement of a designated service priority, or may designate, for a station, a resource block that can be selected by the station during uplink access, or may restrict, according to a matching rule, a station that can perform uplink access, or may restrict a probability P when a station performs uplink access, or may restrict that a station listens to a designated resource block during uplink access. Correspondingly, the station performs uplink access according to the restriction of the access point. For another example, when the access rule is time-frequency two-dimensional backoff access, the access point may require the station to report a bandwidth requirement of a designated service priority, or may designate, for the station, a resource block that the station can select during uplink access, or may restrict, according to a matching rule, a station that can perform uplink access, or may restrict a contention window range that is required by a station to generate a backoff random number during uplink access, or may restrict a manner of adjusting, by a station, a contention window range, or may adjust a contention window range. Correspondingly, the station performs uplink access according to the restriction of the access point. I addition to the foregoing combination manner, some or a part of the foregoing embodiments may be combined according to another requirement. This is not enumerated herein.

Figure 18:
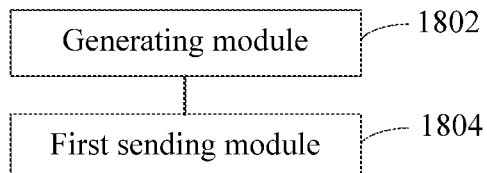
FIG. 18 is a schematic structural diagram of a multi-station access apparatus according to an embodiment of the present disclosure.

As shown in FIG. 18, FIG. 18 is a schematic structural diagram of a multi-station access apparatus according to an embodiment of the present disclosure. The multi-station access apparatus may be implemented as a part or all of an access point in a form of software, hardware, or a combination of software and hardware. The multi-station access apparatus may include a generating module 1802 and a first sending module 1804.

The generating module 1802 is configured to generate a matching rule and an access rule according to a current network feature, where the matching rule is used to restrict a station that is allowed to access a channel, and the access rule is used to restrict an access parameter of the station when the station accesses the channel.

The first sending module 1804 is configured to send a trigger frame to the station, where the trigger frame carries the matching rule and the access rule that are generated by the generating module 1802.

In conclusion, in the multi-station access apparatus provided in this embodiment of the present disclosure, an access point obtains a current network feature and generates a matching rule and an access rule, so that a station performs uplink access according to the matching rule and the access rule. Because the access point may generate the matching rule and the access rule according to the current network feature, an accessing station and an access manner can be controlled flexibly. This resolves a prior-art problem of reduced quality of service of a high-priority service because in an EDCA protocol, when there are relatively many low-priority service nodes, the high-priority service has difficulty in obtaining a resource through contention, or a conflict occurs between a low-priority packet and a high-priority packet. Effects of ensuring quality of service and user experience are achieved.

Figure 19:
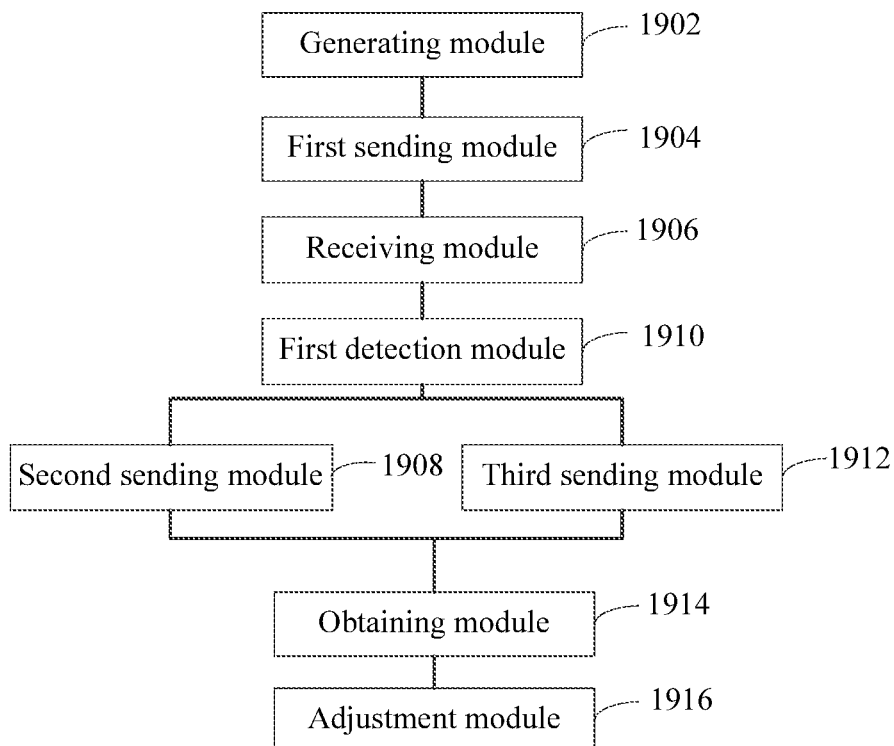
FIG. 19 is a schematic structural diagram of a multi-station access apparatus according to another embodiment of the present disclosure.

As shown in FIG. 19, FIG. 19 is a schematic structural diagram of a multi-station access apparatus according to another embodiment of the present disclosure. The multi-station access apparatus may be implemented as a part or all of an access point in a form of software, hardware, or a combination of software and hardware. The multi-station access apparatus may include a generating module 1902 and a first sending module 1904.

The generating module 1902 is configured to generate a matching rule and an access rule according to a current network feature, where the matching rule is used to restrict a station that is allowed to access a channel, and the access rule is used to restrict an access parameter of the station when the station accesses the channel.

The first sending module 1904 is configured to send a trigger frame to the station, where the trigger frame carries the matching rule and the access rule that are generated by the generating module 1902.

In a possible implementation, the matching rule is a rule defined by one matching element or a logical combination of at least two matching elements, and the matching element includes but is not limited to a station group identifier, a traffic category, channel quality, a service priority, a signal strength expected to be received, a data packet size, a distance between a station and the access point, or a time delay requirement.

In a possible implementation, the multi-station access apparatus may further include a receiving module 1906 and a second sending module 1908.

The receiving module 1906 is configured to receive an access request that is sent by the station on a selected resource block, where the resource block is a resource block selected from a designated resource block according to the access rule after the station is matched successfully according to the matching rule, the designated resource block is a resource block that is provided by the access point for the station for access, when a channel is divided according to a time domain and a frequency domain, the resource block is a time-frequency resource block, and when a channel is divided only according to a frequency domain, the resource block is a sub-channel.

The second sending module 1908 is configured to send, to the station, an access response used to allow the station to perform access on the resource block.

In a possible implementation, the multi-station access apparatus may further include a first detection module 1910 and a third sending module 1912.

The first detection module 1910 is configured to detect whether the access point satisfies a sending condition of continuing to send a next trigger frame, where the sending condition includes at least one of the following the access point still has a receiving capability, a quantity of times of sending trigger frames is less than a predetermined quantity of times, or a quantity of stations sending access requests does not reach a predetermined quantity.

The third sending module 1912 is configured to when the first detection module 1910 detects that the access point satisfies the sending condition of continuing to send a next trigger frame, send the next trigger frame.

The second sending module 1908 is further configured to when the first detection module 1910 detects that the access point does not satisfy the sending condition of continuing to send a next trigger frame, send, to the station, the access response that is used to allow the station to perform access on the resource block.

In a possible implementation, the multi-station access apparatus may further include an obtaining module 1914 and an adjustment module 1916.

The obtaining module 1914 is configured to obtain a quantity of designated resource blocks having conflicts, a quantity of idle designated resource blocks, and a quantity of designated resource blocks on which the access request is received successfully in the designated resource block that are obtained when each station performs uplink access after a trigger frame is sent previously.

The adjustment module 1916 is configured to adjust a contention window range carried in the previously sent trigger frame by using the quantity of the designated resource blocks having conflicts, the quantity of the idle designated resource blocks, and the quantity of the designated resource blocks on which the access request is received successfully that are obtained by the obtaining module 1914, determine an adjusted contention window range as a contention window range carried in a trigger frame to be sent currently, and send the current trigger frame to the station.

In a possible implementation manner, the obtaining unit 1914 is further configured to for each designated resource block, detect whether a physical layer using the access point receives, on the designated resource block, a start indication used to indicate that transmission of a payload part in an access request starts; and if the start indication is not received, determine the designated resource block as an idle designated resource block, and add 1 to the quantity of the idle designated resource blocks; or if the start indication is received, detect whether a reception completion indication corresponding to the start indication is received; if the reception completion indication corresponding to the start indication is received, continue to detect whether a payload part in the access request is not received successfully on the designated resource block; and if the payload part in the access request is received successfully on the designated resource block, determine the designated resource block as a designated resource block on which the access request is received successfully, and add 1 to the quantity of the designated resource blocks on which the access request is received successfully; or if the payload part in the access request is not received successfully on the designated resource block, determine the designated resource block as a designated resource block having a conflict, and add 1 to the quantity of the designated resource blocks having conflicts.

In conclusion, in the multi-station access apparatus provided in this embodiment of the present disclosure, an access point obtains a current network feature and generates a matching rule and an access rule, so that a station performs uplink access according to the matching rule and the access rule. Because the access point may generate the matching rule and the access rule according to the current network feature, an accessing station and an access manner can be controlled flexibly. This resolves a prior-art problem of reduced quality of service of a high-priority service because in an EDCA protocol, when there are relatively many low-priority service nodes, the high-priority service has difficulty in obtaining a resource through contention, or a conflict occurs between a low-priority packet and a high-priority packet. Effects of ensuring quality of service and user experience are achieved.

Figure 20:
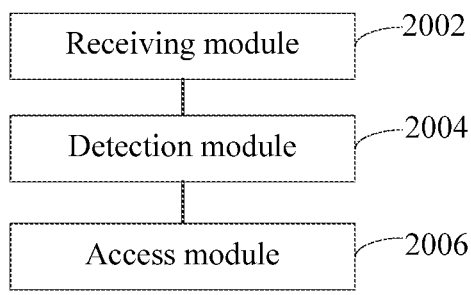
FIG. 20 is a schematic structural diagram of a multi-station access apparatus according to still another embodiment of the present disclosure.

As shown in FIG. 20, FIG. 20 is a schematic structural diagram of a multi-station access apparatus according to still another embodiment of the present disclosure. The multi-station access apparatus may be implemented as a part or all of a station in a form of software, hardware, or a combination of software and hardware. The multi-station access apparatus may include a receiving module 2002, a detection module 2004, and a receiving module 2006.

The receiving module 2002 is configured to receive a trigger frame sent by an access point, where the trigger frame carries a matching rule used to restrict a station that is allowed to access a channel, and an access rule used to restrict an access parameter of the station when the station accesses the channel.

The detection module 2004 is configured to detect whether the station satisfies the matching rule received by the receiving module 2002.

The access module 2006 is configured to when the detection module 2004 detects that the station satisfies the matching rule, perform uplink access according to the access rule.

In conclusion, the multi-station access apparatus provided in this embodiment of the present disclosure receives a trigger frame sent by an access point, and performs uplink access according to a matching rule and an access rule in the trigger frame. Because the matching rule and the access rule are generated by the access point according to a current network feature and a service feature, the access point can control the matching rule and the access rule flexibly. This resolves a prior-art problem of reduced quality of service of a high-priority service because in an EDCA protocol, when there are relatively many low-priority service nodes, the high-priority service has difficulty in obtaining a resource through contention, or a conflict occurs between a low-priority packet and a high-priority packet. Effects of ensuring quality of service and user experience are achieved.

Figure 21:
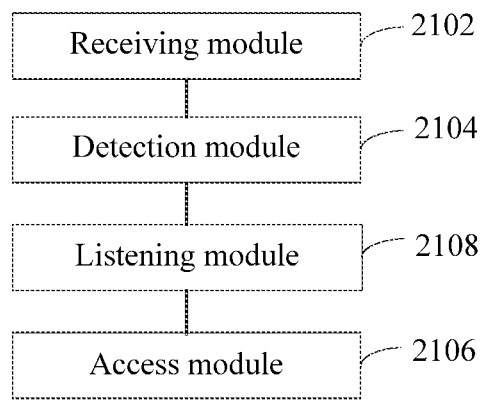
FIG. 21 is a schematic structural diagram of a multi-station access apparatus according to still another embodiment of the present disclosure.

As shown in FIG. 21, FIG. 21 is a schematic structural diagram of a multi-station access apparatus according to still another embodiment of the present disclosure. The multi-station access apparatus may be implemented as a part or all of a station in a form of software, hardware, or a combination of software and hardware. The multi-station access apparatus may include a receiving module 2102, a detection module 2104, and a receiving module 2106.

The receiving module 2102 is configured to receive a trigger frame sent by an access point, where the trigger frame carries a matching rule used to restrict a station that is allowed to access a channel, and an access rule used to restrict an access parameter of the station when the station accesses the channel.

The detection module 2104 is configured to detect whether the station satisfies the matching rule received by the receiving module 2102.

The access module 2106 is configured to when the detection module 2104 detects that the station satisfies the matching rule, perform uplink access according to the access rule.

In a possible implementation, the matching rule is a rule defined by one matching element or a logical combination of at least two matching elements, and the matching element includes but is not limited to a station group identifier, a traffic category, channel quality, a service priority, a signal strength expected to be received, a data packet size, a distance between a station and the access point, or a time delay requirement.

In a possible implementation, the access rule is time-domain backoff access or time-frequency two-dimensional backoff access, and the access module 2106 may be further configured to back off according to the access rule, and select a resource block from a designated resource block after backing off successfully; send an access request to the access point on the selected resource block; and receive an access response that is sent by the access point and that is used to instruct the station to perform access on the resource block, where the designated resource block is a resource block that is provided by the access point for the station for access, when a channel is divided according to a time domain and a frequency domain, the resource block is a time-frequency resource block, and when a channel is divided only according to a frequency domain, the resource block is a sub-channel.

In a possible implementation, the access parameter defines a contention window range, and the access module 2106 is further configured to generate a backoff random number that is within the contention window range, and back off according to the backoff random number; and after the backoff ends, randomly select a resource block from the designated resource block.

In a possible implementation, the access parameter defines a contention window range, and the access module 2106 is further configured to back off by using a backoff random number that is generated during previous backoff; and after the backoff ends, randomly select a resource block from the designated resource block.

In a possible implementation, the access unit 2106 is further configured to if access fails when a resource block is accessed previously by using a backoff random number that is generated within a contention window range, increase the contention window range, generate a backoff random number that is within the increased contention window range, back off by using the backoff random number, and after the backoff ends, randomly select a resource block from the designated resource block.

In a possible implementation, the pre-agreed access manner is the time-frequency two-dimensional backoff access, the access parameter defines a round marker and a contention window range, and the access module 2106 is further configured to if the round marker is used to mark a total quantity of times that trigger frames need to be sent, generating a backoff random number that is within the contention window range, and if the backoff random number is less than a designated resource block quantity, selecting a resource block having a number the same as the backoff random number from the designated resource block; and if the round marker is used to mark that a current trigger frame is not a last trigger frame in a trigger frame needing to be sent, when a backoff random number generated during previous backoff access is greater than the designated resource block quantity, subtract the designated resource block quantity from the backoff random number generated during previous backoff access, and when an obtained difference is less than the designated resource block quantity, select a resource block having a number the same as the obtained difference from the designated resource block; or generate a backoff random number that is within the contention window range, and if the backoff random number is less than the designated resource block quantity, select a resource block having a number the same as the backoff random number from the designated resource block, or if the backoff random number is greater than the designated resource block quantity, subtract the designated resource block quantity from the backoff random number, and when an obtained difference is less than the designated resource block quantity, select a resource block having a number the same as the obtained difference from the designated resource block, where the designated resource block quantity is a quantity of the designated resource blocks.

In a possible implementation, the access rule is the time-frequency two-dimensional backoff, and the access point requires the station to listen to a channel access status at a first time period and a second time period in duration used to send the access request, where the first time period corresponds to duration used to send a packet header in a data packet corresponding to the access request, and the second time period corresponds to duration used to send non-packet header content in the data packet corresponding to the access request, and the access module 2106 is further configured to generate a backoff random number, and perform time-frequency two-dimensional backoff according to the backoff random number; listen to, at the first time period, whether a signal is transmitted on each designated resource block; and if it is detected at the first time period that no signal is transmitted, set a difference of subtracting a quantity of the designated resource block from the backoff random number as an updated backoff random number; and at a starting moment of the second time period, if the updated backoff random number is less than the designated resource block quantity, select a resource block having a number the same as the backoff random number from the designated resource block; or if it is detected at the first time period that a signal is transmitted, set a difference of subtracting a quantity of the designated resource block from the backoff random number as an updated backoff random number; and at an ending moment of the second time period, if the updated backoff random number is less than the designated resource block quantity, select a resource block having a number the same as the backoff random number from the designated resource block; or if it is detected at the first time period that no signal is transmitted and it is detected at the second time period that a signal is transmitted, set a difference of subtracting a quantity of the designated resource block from the backoff random number as an updated backoff random number; and after predetermined duration from an ending moment of the second time period, if the updated backoff random number is less than the designated resource block quantity, select a resource block having a number the same as the backoff random number from the designated resource block, where the predetermined duration is the same as duration of the first time period, where the designated resource block quantity is a quantity of the designated resource blocks.

In a possible implementation, the apparatus further includes a listening module 2108.

The listening module 2108 is configured to if access fails during backoff access and a backoff random number obtained during current backoff is used as a backoff random number for next backoff access, after an access request sent by another station is detected, subtract a designated value from the backoff random number.

When the access manner is the time-domain backoff access, the designated value is 1, and when the access manner is the time-frequency two-dimensional backoff access, the designated value is a quantity of the designated resource blocks.

In a possible implementation, the access rule is P-probability access, the access parameter defines a probability range, and the access module 2106 is further configured to generate a probability that is within the probability range, perform access contention by using the generated probability, and randomly select a resource block from a designated resource block after the contention succeeds; send an access request to the access point on the selected resource block; and receive an access response that is sent by the access point and that is used to instruct the station to perform access on the resource block, where the designated resource block is a resource block that is provided by the access point for the station for access, when a channel is divided according to a time domain and a frequency domain, the resource block is a time-frequency resource block, and when a channel is divided only according to a frequency domain, the resource block is a sub-channel.

In a possible implementation, the access rule is P-probability access and a probability is adjustable, the access parameter defines a probability P, a value of the probability P is greater than 0 and less than 1, and the access module 2106 is further configured to if the probability P is used to perform access contention previously and a sub-channel is accessed successfully, increase the probability P, and perform access contention by using the increased probability P; if the probability P is used to perform access contention previously and a sub-channel is not accessed successfully, decrease the probability P, and perform access contention by using the decreased probability P; and if the probability P is not used to perform access contention previously, perform access contention by using the probability P; after the contention succeeds, randomly select a resource block from a designated resource block; send an access request to the access point on the selected resource block; and receive an access response that is sent by the access point and that is used to instruct the station to perform access on the resource block, where the designated resource block is a resource block that is provided by the access point for the station for access, when a channel is divided according to a time domain and a frequency domain, the resource block is a time-frequency resource block, and when a channel is divided only according to a frequency domain, the resource block is a sub-channel.

In a possible implementation, when the matching rule defines a designated service priority for which a bandwidth requirement needs to be reported, the access module 2106 is further configured to when a service priority of data needing to be sent by the station includes the designated service priority, obtain a bandwidth requirement of the designated service priority in the station, and add the bandwidth requirement to the access request; or obtain a bandwidth requirement of each service priority greater than or equal to the designated service priority in the station, and add the bandwidth requirement of each service priority to the access request; or obtain a bandwidth requirement of each service priority in the station, and add the bandwidth requirement of each service priority to the access request; or obtain a total bandwidth requirement of all service priorities in the station, and add the total bandwidth requirement to the access request; and send the access request to the access point on the selected resource block, where the designated service priority is at least one designated service priority.

In a possible implementation, when the matching rule defines a designated service priority for which a bandwidth requirement needs to be reported, and the access parameter defines at least one resource block that is provided for a station having the designated service priority for access, the access module 2106 is further configured to after backing off successfully, select a resource block from the at least one resource block defined for the designated service priority.

In a possible implementation, the matching rule defines a signal strength that the access point expects to receive, and the detection module 2104 is further configured to determine, according to a loss of a channel during signal transmission, whether a signal strength when a signal sent by using an adjusted transmit power reaches the access point reaches the signal strength that the access point expects to receive, and whether the adjusted transmit power is less than a listening threshold of a neighboring station; and if a power of the signal strength when the signal sent by using the adjusted transmit power used to send a signal reaches the access point reaches a power of the signal strength that the access point expects to receive, and the adjusted transmit power is less than the listening threshold of the neighboring station, adjusting the transmit power used to send a signal.

In conclusion, the multi-station access apparatus provided in this embodiment of the present disclosure receives a trigger frame sent by an access point, and performs uplink access according to a matching rule and an access rule in the trigger frame. Because the matching rule and the access rule are generated by the access point according to a current network feature and a service feature, the access point can control the matching rule and the access rule flexibly. This resolves a prior-art problem of reduced quality of service of a high-priority service because in an EDCA protocol, when there are relatively many low-priority service nodes, the high-priority service has difficulty in obtaining a resource through contention, or a conflict occurs between a low-priority packet and a high-priority packet. Effects of ensuring quality of service and user experience are achieved.

It should be noted that when the multi-station access apparatus provided in the foregoing embodiment performs multi-station access, only divisions of the foregoing functional modules are described by using an example. In some embodiments, the foregoing functions may be allocated to different functional modules for execution according to requirements, that is, internal structures of the access point and the station are divided into different functional modules, to complete all or a part of the foregoing described functions. Besides, the multi-station access apparatus provided in the foregoing embodiment and the embodiments of the multi-station access method belong to one concept. For the implementing procedure, refer to the method embodiment, and details are not described herein again.

Figure 22:
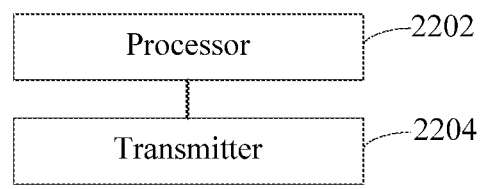
FIG. 22 is a schematic structural diagram of an access point according to an embodiment of the present disclosure.

As shown in FIG. 22, FIG. 22 is a schematic structural diagram of an access point according to an embodiment of the present disclosure. The access point includes a processor 2202 and a transmitter 2204.

The processor 2202 is configured to generate a matching rule and an access rule according to a current network feature, where the matching rule is used to restrict a station that is allowed to access a channel, and the access rule is used to restrict an access parameter of the station when the station accesses the channel.

The transmitter 2204 is configured to send a trigger frame to the station, where the trigger frame carries the matching rule and the access rule that are obtained by the processor 2202.

In conclusion, in the access point provided in this embodiment of the present disclosure, the access point obtains a current network feature and generates a matching rule and an access rule, so that a station performs uplink access according to the matching rule and the access rule. Because the access point may generate the matching rule and the access rule according to the current network feature, an accessing station and an access manner can be controlled flexibly. This resolves a prior-art problem of reduced quality of service of a high-priority service because in an EDCA protocol, when there are relatively many low-priority service nodes, the high-priority service has difficulty in obtaining a resource through contention, or a conflict occurs between a low-priority packet and a high-priority packet. Effects of ensuring quality of service and user experience are achieved.

Figure 23:
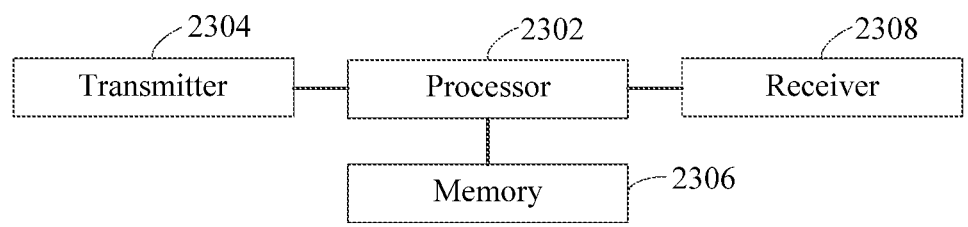
FIG. 23 is a schematic structural diagram of an access point according to another embodiment of the present disclosure.

As shown in FIG. 23, FIG. 23 is a schematic structural diagram of an access point according to another embodiment of the present disclosure. The access point includes a processor 2302, a transmitter 2304, and a memory 2306. The processor 2302 is coupled to the transmitter 2304 and the memory 2306. The memory 2306 stores at least one computer software. The processor 2302 may use the computer software stored in the memory 2306, to perform corresponding operations.

The processor 2302 is configured to generate a matching rule and an access rule according to a current network feature, where the matching rule is used to restrict a station that is allowed to access a channel, and the access rule is used to restrict an access parameter of the station when the station accesses the channel.

The transmitter 2304 is configured to send a trigger frame to the station, where the trigger frame carries the matching rule and the access rule that are obtained by the processor 2302.

In a possible implementation, the matching rule is a rule defined by one matching element or a logical combination of at least two matching elements, and the matching element includes but is not limited to a station group identifier, a traffic category, channel quality, a service priority, a signal strength expected to be received, a data packet size, a distance between a station and the access point, or a time delay requirement.

In a possible implementation, the access point further includes a receiver 2308. The receiver 2308 is coupled to the processor 2302.

The receiver 2308 is configured to receive an access request that is sent by the station on a selected resource block, where the resource block is a resource block selected from a designated resource block according to the access rule after the station is matched successfully according to the matching rule, the designated resource block is a resource block that is provided by the access point for the station for access, when a channel is divided according to a time domain and a frequency domain, the resource block is a time-frequency resource block, and when a channel is divided only according to a frequency domain, the resource block is a sub-channel.

The transmitter 2304 is further configured to send, to the station, an access response used to allow the station to perform access on the resource block.

In a possible implementation, the processor 2302 is further configured to detect whether the access point satisfies a sending condition of continuing to send a next trigger frame, where the sending condition includes at least one of the following the access point still has a receiving capability, a quantity of times of sending trigger frames is less than a predetermined quantity of times, or a quantity of stations sending access requests does not reach a predetermined quantity; and the transmitter 2304 is further configured to when the processor determines that the access point satisfies the sending condition of continuing to send a next trigger frame, send the next trigger frame; or the transmitter 2304 is further configured to when the processor determines that the access point does not satisfy the sending condition of continuing to send a next trigger frame, send, to the station, the access response that is used to allow the station to perform access on the resource block.

In a possible implementation, the processor 2302 is further configured to obtain a quantity of designated resource blocks having conflicts, a quantity of idle designated resource blocks, and a quantity of designated resource blocks on which the access request is received successfully in the designated resource block that are obtained when each station performs uplink access after a trigger frame is sent previously; and the processor 2302 is further configured to adjust a contention window range carried in the previously sent trigger frame by using the quantity of the designated resource blocks having conflicts, the quantity of the idle designated resource blocks, and the quantity of the designated resource blocks on which the access request is received successfully that are obtained by the obtaining module, determine an adjusted contention window range as a contention window range carried in a trigger frame to be sent currently, and send the current trigger frame to the station.

In a possible implementation, the processor 2302 is further configured to for each designated resource block, detect whether a physical layer using the access point receives, on the designated resource block, a start indication used to indicate that transmission of a payload part in an access request starts; and the processor 2302 is further configured to if the start indication is not received, determine the designated resource block as an idle designated resource block, and add 1 to the quantity of the idle designated resource blocks; or the processor 2302 is further configured to if the start indication is received, detect whether a reception completion indication corresponding to the start indication is received; if the reception completion indication corresponding to the start indication is received, continue to detect whether a payload part in the access request is not received successfully on the designated resource block; and if the payload part in the access request is received successfully on the designated resource block, determine the designated resource block as a designated resource block on which the access request is received successfully, and add 1 to the quantity of the designated resource blocks on which the access request is received successfully; or if the payload part in the access request is not received successfully on the designated resource block, determine the designated resource block as a designated resource block having a conflict, and add 1 to the quantity of the designated resource blocks having conflicts.

In conclusion, in the access point provided in this embodiment of the present disclosure, the access point obtains a current network feature and generates a matching rule and an access rule, so that a station performs uplink access according to the matching rule and the access rule. Because the access point may generate the matching rule and the access rule according to the current network feature, an accessing station and an access manner can be controlled flexibly. This resolves a prior-art problem of reduced quality of service of a high-priority service because in an EDCA protocol, when there are relatively many low-priority service nodes, the high-priority service has difficulty in obtaining a resource through contention, or a conflict occurs between a low-priority packet and a high-priority packet. Effects of ensuring quality of service and user experience are achieved.

Figure 24:
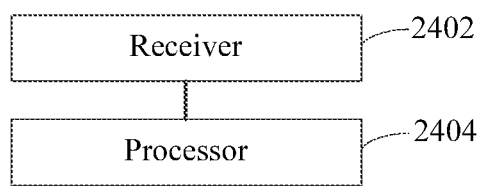
FIG. 24 is a schematic structural diagram of a station according to an embodiment of the present disclosure.

As shown in FIG. 24, FIG. 24 is a schematic structural diagram of a station according to an embodiment of the present disclosure. The station includes a receiver 2402 and a processor 2404.

The receiver 2402 is configured to receive a trigger frame sent by an access point, where the trigger frame carries a matching rule used to restrict a station that is allowed to access a channel, and an access rule used to restrict an access parameter of the station when the station accesses the channel.

The processor 2404 is configured to detect whether the station satisfies the matching rule.

The processor 2404 is further configured to when the station satisfies the matching rule, perform uplink access according to the access rule.

In conclusion, the station provided in this embodiment of the present disclosure receives a trigger frame sent by an access point, and performs uplink access according to a matching rule and an access rule in the trigger frame. Because the matching rule and the access rule are generated by the access point according to a current network feature and a service feature, the access point can control the matching rule and the access rule flexibly. This resolves a prior-art problem of reduced quality of service of a high-priority service because in an EDCA protocol, when there are relatively many low-priority service nodes, the high-priority service has difficulty in obtaining a resource through contention, or a conflict occurs between a low-priority packet and a high-priority packet. Effects of ensuring quality of service and user experience are achieved.

Figure 25:
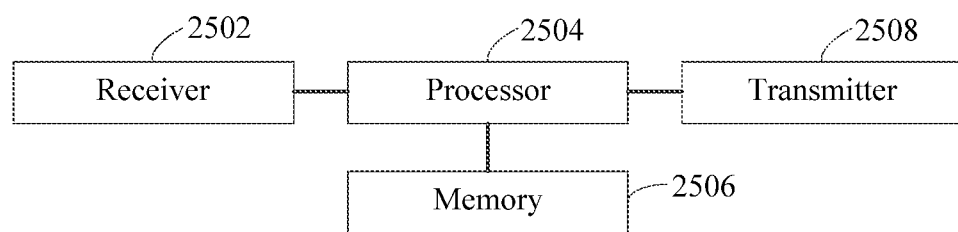
FIG. 25 is a schematic structural diagram of a station according to another embodiment of the present disclosure.

As shown in FIG. 25, FIG. 25 is a schematic structural diagram of a station according to another embodiment of the present disclosure. The station includes a receiver 2502, a processor 2504, and a memory 2506. The processor 2504 is coupled to the receiver 2502 and the memory 2506. The memory 2506 stores at least one computer software. The processor 2504 may use the computer software stored in the memory 2506, to perform corresponding operations.

The receiver 2502 is configured to receive a trigger frame sent by an access point, where the trigger frame carries a matching rule used to restrict a station that is allowed to access a channel, and an access rule used to restrict an access parameter of the station when the station accesses the channel.

The processor 2504 is configured to detect whether the station satisfies the matching rule.

The processor 2504 is further configured to when the station satisfies the matching rule, perform uplink access according to the access rule.

In a possible implementation, the matching rule is a rule defined by one matching element or a logical combination of at least two matching elements, and the matching element includes but is not limited to a station group identifier, a traffic category, channel quality, a service priority, a signal strength expected to be received, a data packet size, a distance between a station and the access point, or a time delay requirement.

In a possible implementation, the access rule is time-domain backoff access or time-frequency two-dimensional backoff access, the station further includes a transmitter 2508, and the transmitter 2508 is coupled to the processor 2504.

The processor 2504 is further configured to back off according to the access rule, and select a resource block from a designated resource block after backing off successfully.

The transmitter 2508 is configured to send an access request to the access point on the selected resource block.

The receiver 2502 is further configured to receive an access response that is sent by the access point and that is used to instruct the station to perform access on the resource block.

The designated resource block is a resource block that is provided by the access point for the station for access, when a channel is divided according to a time domain and a frequency domain, the resource block is a time-frequency resource block, and when a channel is divided only according to a frequency domain, the resource block is a sub-channel.

In a possible implementation, the access parameter defines a contention window range.

The processor 2504 is further configured to generate a backoff random number that is within the contention window range, and back off according to the backoff random number.

The processor 2504 is further configured to after the backoff ends, randomly select a resource block from the designated resource block.

In a possible implementation, the access parameter defines a contention window range.

The processor 2504 is further configured to back off by using a backoff random number that is generated during previous backoff.

The processor 2504 is further configured to after the backoff ends, randomly select a resource block from the designated resource block.

In a possible implementation, the processor 2504 is further configured to if access fails when a resource block is accessed previously by using a backoff random number that is generated within a contention window range, increase the contention window range, generate a backoff random number that is within the increased contention window range, back off by using the backoff random number, and after the backoff ends, randomly select a resource block from the designated resource block.

In a possible implementation, the pre-agreed access manner is the time-frequency two-dimensional backoff access, and the access parameter defines a round marker and a contention window range.

The processor 2504 is further configured to if the round marker is used to mark a total quantity of times that trigger frames need to be sent, generate a backoff random number that is within the contention window range, and if the backoff random number is less than a designated resource block quantity, select a resource block having a number the same as the backoff random number from the designated resource block.

The processor 2504 is further configured to if the round marker is used to mark that a current trigger frame is not a last trigger frame in a trigger frame needing to be sent, when a backoff random number generated during previous backoff access is greater than the designated resource block quantity, subtract the designated resource block quantity from the backoff random number generated during previous backoff access, and when an obtained difference is less than the designated resource block quantity, select a resource block having a number the same as the obtained difference from the designated resource block; or generate a backoff random number that is within the contention window range, and if the backoff random number is less than the designated resource block quantity, select a resource block having a number the same as the backoff random number from the designated resource block, or if the backoff random number is greater than the designated resource block quantity, subtract the designated resource block quantity from the backoff random number, and when an obtained difference is less than the designated resource block quantity, select a resource block having a number the same as the obtained difference from the designated resource block.

The designated resource block quantity is a quantity of the designated resource blocks.

In a possible implementation, the access rule is the time-frequency two-dimensional backoff, and the access point requires the station to listen to a channel access status at a first time period and a second time period in duration used to send the access request, where the first time period corresponds to duration used to send a packet header in a data packet corresponding to the access request, and the second time period corresponds to duration used to send non-packet header content in the data packet corresponding to the access request, the processor 2504 is further configured to generate a backoff random number, and perform time-frequency two-dimensional backoff according to the backoff random number; the processor 2504 is further configured to listen to, at the first time period, whether a signal is transmitted on each designated resource block; and the processor 2504 is further configured to if it is detected at the first time period that no signal is transmitted, set a difference of subtracting a quantity of the designated resource block from the backoff random number as an updated backoff random number; and at a starting moment of the second time period, if the updated backoff random number is less than the designated resource block quantity, select a resource block having a number the same as the backoff random number from the designated resource block; or the processor 2504 is further configured to if it is detected at the first time period that a signal is transmitted, set a difference of subtracting a quantity of the designated resource block from the backoff random number as an updated backoff random number; and at an ending moment of the second time period, if the updated backoff random number is less than the designated resource block quantity, select a resource block having a number the same as the backoff random number from the designated resource block; or the processor 2504 is further configured to if it is detected at the first time period that no signal is transmitted and it is detected at the second time period that a signal is transmitted, set a difference of subtracting a quantity of the designated resource block from the backoff random number as an updated backoff random number; and after predetermined duration from an ending moment of the second time period, if the updated backoff random number is less than the designated resource block quantity, select a resource block having a number the same as the backoff random number from the designated resource block, where the predetermined duration is the same as duration of the first time period, where the designated resource block quantity is a quantity of the designated resource blocks.

In a possible implementation, the processor 2504 is further configured to if access fails during backoff access and a backoff random number obtained during current backoff is used as a backoff random number for next backoff access, after an access request sent by another station is detected, subtract a designated value from the backoff random number.

When the access manner is the time-domain backoff access, the designated value is 1, and when the access manner is the time-frequency two-dimensional backoff access, the designated value is a quantity of the designated resource blocks.

In a possible implementation, the access rule is P-probability access, the access parameter defines a probability range, and the station further includes a transmitter 2508.

The processor 2504 is further configured to generate a probability that is within the probability range, perform access contention by using the generated probability, and randomly select a resource block from a designated resource block after the contention succeeds.

The transmitter 2508 is configured to send an access request to the access point on the selected resource block.

The receiver 2502 is further configured to receive an access response that is sent by the access point and that is used to instruct the station to perform access on the resource block.

The designated resource block is a resource block that is provided by the access point for the station for access, when a channel is divided according to a time domain and a frequency domain, the resource block is a time-frequency resource block, and when a channel is divided only according to a frequency domain, the resource block is a sub-channel.

In a possible implementation, the access rule is P-probability access, a probability is adjustable, the access parameter defines a probability P and a value of the probability P is greater than 0 and less than 1, and the station further includes a transmitter 2508.

The processor 2504 is further configured to if the probability P is used to perform access contention previously and a sub-channel is accessed successfully, increase the probability P, and perform access contention by using the increased probability P; if the probability P is used to perform access contention previously and a sub-channel is not accessed successfully, decrease the probability P, and perform access contention by using the decreased probability P; and if the probability P is not used to perform access contention previously, perform access contention by using the probability P.

The processor 2504 is further configured to after the contention succeeds, randomly select a resource block from a designated resource block.

The transmitter 2508 is configured to send an access request to the access point on the selected resource block.

The receiver 2502 is further configured to receive an access response that is sent by the access point and that is used to instruct the station to perform access on the resource block.

The designated resource block is a resource block that is provided by the access point for the station for access, when a channel is divided according to a time domain and a frequency domain, the resource block is a time-frequency resource block, and when a channel is divided only according to a frequency domain, the resource block is a sub-channel.

In a possible implementation, when the matching rule defines a designated service priority for which a bandwidth requirement needs to be reported, the processor 2504 is further configured to when a service priority of data needing to be sent by the station includes the designated service priority, obtain a bandwidth requirement of the designated service priority in the station, and add the bandwidth requirement to the access request; or obtain a bandwidth requirement of each service priority greater than or equal to the designated service priority in the station, and add the bandwidth requirement of each service priority to the access request; or obtain a bandwidth requirement of each service priority in the station, and add the bandwidth requirement of each service priority to the access request; or obtain a total bandwidth requirement of all service priorities in the station, and add the total bandwidth requirement to the access request; and the transmitter 2508 is further configured to send the access request to the access point on the selected resource block, where the designated service priority is at least one designated service priority.

In a possible implementation, when the matching rule defines a designated service priority for which a bandwidth requirement needs to be reported, and the access parameter defines at least one resource block that is provided for a station having the designated service priority for access, the processor 2504 is further configured to after backing off successfully, select a resource block from the at least one resource block defined for the designated service priority.

In a possible implementation, the matching rule defines a signal strength that the access point expects to receive.

The processor 2504 is further configured to determine, according to a loss of a channel during signal transmission, whether a signal strength when a signal sent by using an adjusted transmit power reaches the access point reaches the signal strength that the access point expects to receive, and whether the adjusted transmit power is less than a listening threshold of a neighboring station.

The processor 2504 is further configured to if a power of the signal strength when the signal sent by using the adjusted transmit power used to send a signal reaches the access point reaches a power of the signal strength that the access point expects to receive, and the adjusted transmit power is less than the listening threshold of the neighboring station, adjust the transmit power used to send a signal.

In conclusion, the station provided in this embodiment of the present disclosure, receives a trigger frame sent by an access point, and performs uplink access according to a matching rule and an access rule in the trigger frame. Because the matching rule and the access rule are generated by the access point according to a current network feature and a service feature, the access point can control the matching rule and the access rule flexibly. This resolves a prior-art problem of reduced quality of service of a high-priority service because in an EDCA protocol, when there are relatively many low-priority service nodes, the high-priority service has difficulty in obtaining a resource through contention, or a conflict occurs between a low-priority packet and a high-priority packet. Effects of ensuring quality of service and user experience are achieved.

Figure 26:
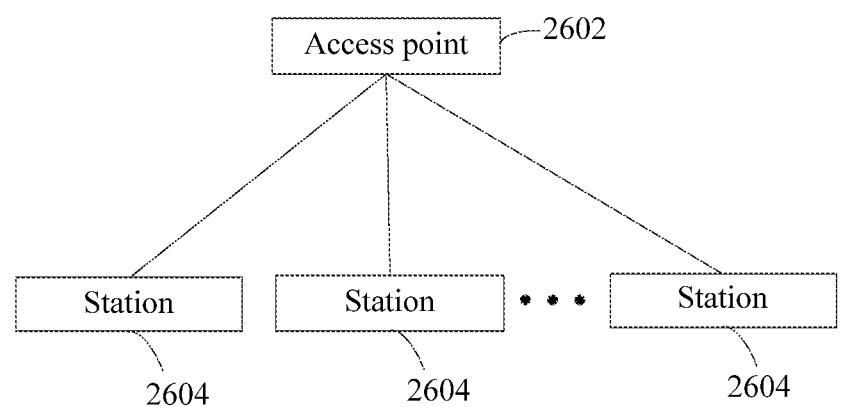
FIG. 26 is a schematic structural diagram of a multi-station access system according to an embodiment of the present disclosure.

As shown in FIG. 26, FIG. 26 is a schematic structural diagram of a multi-station access system according to an embodiment of the present disclosure. The multi-station access system may include an access point 2602 and at least two stations 2604.

The access point 2602 may include the multi-station access apparatus described in FIG. 18 and FIG. 19, or the access point 2602 may be the access point described in FIG. 22 or FIG. 23.

The station 2604 may include the multi-station access apparatus described in FIG. 20 or FIG. 21, or the station 2604 may be the station described in FIG. 24 or FIG. 25.

In conclusion, in the multi-station access system provided in this embodiment of the present disclosure, an access point obtains a current network feature and generates a matching rule and an access rule, so that a station performs uplink access according to the matching rule and the access rule. Because the access point may generate the matching rule and the access rule according to the current network feature, an accessing station and an access manner can be controlled flexibly. This resolves a prior-art problem of reduced quality of service of a high-priority service because in an EDCA protocol, when there are relatively many low-priority service nodes, the high-priority service has difficulty in obtaining a resource through contention, or a conflict occurs between a low-priority packet and a high-priority packet. Effects of ensuring quality of service and user experience are achieved.

A person of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, refer to a corresponding process in the foregoing method embodiments, and details are not described.

In the several embodiments provided in this application, it should be understood that the disclosed system, apparatus, and method may be implemented in other manners. For example, the described apparatus embodiment is merely an example. For example, the unit division may merely be logical function division and may be other division in implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to needs to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to some approaches, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present disclosure. The foregoing storage medium includes any medium that can store program code, such as a USB flash drive, a removable hard disk, a read-only memory (ROM), a random access memory (RAM), a magnetic disk, or an optical disc.

The foregoing descriptions are implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A multi-station access method comprising:
    generating, by an access point, a trigger frame comprising a matching rule a service priority and information of an allocated resource block, wherein the matching rule is that a data packet is less than 50 kilobytes and a signal-to-noise ratio is greater than 20 decibels, wherein the service priority is used to restrict a station allowed to randomly access a channel, wherein the information of the allocated resource block is used to designate a resource block on which the station randomly accesses the channel, and wherein the resource block is a sub channel; and
    sending, by the access point, the trigger frame to the station.

2. The method of claim 1, further comprising receiving, by the access point, an access request from the station on a selected resource block, wherein the resource block is randomly selected from at least one designated resource block based on the information of the allocated resource block.

3. The method of claim 1, wherein the service priority is used to restrict a station that is allowed to randomly access a channel such that a station with service priority that is greater than or equal to the designated service priority is allowed to randomly access a channel.

4. A multi-station access method comprising:
    receiving, by a station, a trigger frame comprising a matching rule, a service priority, and information of an allocated resource block, wherein the matching rule is that a data packet is less than 50 kilobytes and s signal-to-noise ratio is greater than 20 decibels, wherein the service priority is used to restrict a station that is allowed to randomly access a channel, wherein the information of the allocated resource block designates a resource block on which the station randomly accesses the channel, and wherein the resource block is a sub channel;
detecting whether the station satisfies the matching rule; and
performing processing, by the station, based on the trigger frame.

5. The method of claim 4, wherein performing the processing comprises:
detecting, by the station, whether the service priority of the station satisfies the service priority of the trigger frame; and
performing, by the station, random uplink access on a designated resource block when the service priority of the station satisfies the service priority of the trigger frame.

6. The method of claim 5, wherein performing random uplink access on the designated resource block comprises:
backing off;
randomly selecting one resource block from the designated resource block after backing off successfully; and
sending an access request to the access point on the one resource block.

7. The method of claim 6, wherein backing off comprises:
generating a backoff random number within the contention window range; and
backing off based on the backoff random number.

8. The method of claim 6, wherein backing off comprises backing off using a backoff random number generated during a previous backoff.

9. The method of claim 6, wherein when random access fails when a resource block is accessed previously using a backoff random number that is generated within a contention window range, backing off comprises:
increasing the contention window range;
generating a backoff random number that is within the increased contention window range; and
backing off using the backoff random number.

10. An apparatus comprising:
a processor configured to generate a trigger frame comprising a matching rule, a service priority and information of an allocated resource block, wherein the matching rule is that a data packet is less than 50 kilobytes and a signal-to-noise ratio is greater than 20 decibels, wherein the service priority is used to restrict a station that is allowed to randomly access a channel, wherein the information of the allocated resource block designates a resource block on which the station randomly accesses the channel, and wherein the resource block is a sub channel; and
a transmitter coupled to the processor and configured to send the trigger frame.

11. The apparatus of claim 10, further comprising a receiver configured to receive an access request from the station on a randomly selected resource block randomly selected from a designated resource block based on the information of the allocated resource block.

12. The apparatus of claim 10, wherein the service priority is used to restrict a station that is allowed to randomly access a channel such that a station with service priority that is greater than or equal to the designated service priority is allowed to access a channel.

13. An apparatus comprising:
a receiver configured to receive a trigger frame comprising a matching rule, a service priority and information of an allocated resource block, wherein the matching rule is that a data packet is less than 50 kilobytes and a signal-to-noise ratio is greater than 20 decibels, wherein the service priority is used to restrict a station that is allowed to access a channel, wherein the information of the resource block allocated designates a resource block on which the station randomly accesses the channel, and wherein the resource block is a sub channel; and
a processor coupled to the receiver and configured to:
detect whether the station satisfies the matching rule; and
perform processing based on the trigger frame.

14. The apparatus of claim 13, wherein the processor is further configured to randomly perform uplink access on a designated resource block when the service priority of the station satisfies the service priority of the trigger frame, and wherein the processor is further configured to:
back off;
randomly select a resource block from the designated resource block after backing off successfully; and
send an access request to the access point on the resource block.

15. The apparatus of claim 14, wherein the processor is further configured to:
generate a backoff random number within the contention window range; and
back off based on the backoff random number.

16. The apparatus of claim 14, wherein the processor is further configured to back off using a backoff random number generated during a previous backoff.

17. The apparatus of claim 14, wherein when random access fails when a resource block is accessed previously using a backoff random number that is generated within a contention window range, the processor is further configured to:
increase the contention window range;
generate a backoff random number that is within the increased contention window range; and
back off using the backoff random number.

18. The apparatus of claim 13, wherein the processor is further configured to:
detect whether the service priority of the station satisfies the service priority of the trigger frame; and
perform random uplink access on a designated resource block when the service priority of the station satisfies the service priority of the trigger frame.

* * * * *

UNITED STATES PATENT AND TRADEMARK OFFICE
CERTIFICATE OF CORRECTION

PATENT NO. : 11,071,168 B2
APPLICATION NO. : 15/717267
DATED : July 20, 2021
INVENTOR(S) : Mao Yang, Zhongjiang Yan and Yanchun Li It is certified that error appears in the above-identified patent and that said Letters Patent is hereby corrected as shown below:

In the Claims

Claim 1, Column 64, Line 42: "matching rule a service" should read "matching rule, a service"

Claim 4, Column 65, Line 1: "kilobytes and s" should read "kilobytes and a"

Signed and Sealed this
Fourteenth Day of September, 2021

Drew Hirshfeld
*Performing the Functions and Duties of the
Under Secretary of Commerce for Intellectual Property and
Director of the United States Patent and Trademark Office*